United States Patent [19]
Saito et al.

[11] Patent Number: 5,245,528
[45] Date of Patent: Sep. 14, 1993

[54] PROCESS CONTROL APPARATUS AND METHOD FOR ADJUSTMENT OF OPERATING PARAMETERS OF CONTROLLER OF THE PROCESS CONTROL APPARATUS

[75] Inventors: Tadayoshi Saito, Hitachiohta; Kohji Tachibana, Katsuta; Susumu Takahashi, Ibarakimachi; Nobuyuki Yokokawa, Mito; Masahide Nomura, Hitachi; Hiroshi Matsumoto, Ibaraki; Makoto Shimoda, Katsuta; Hisanori Miyagaki, Hitachiohta; Eiji Tohyama, Ibaraki, all of Japan

[73] Assignee: Hitachi, Ltd., Tokyo, Japan

[21] Appl. No.: 435,911

[22] Filed: Mar. 20, 1990

[30] Foreign Application Priority Data

| Mar. 20, 1989 | [JP] | Japan | 1-67983 |
| Mar. 31, 1989 | [JP] | Japan | 1-78249 |
| Aug. 25, 1989 | [JP] | Japan | 1-217365 |
| Sep. 8, 1989 | [JP] | Japan | 1-231605 |

[51] Int. Cl.$^5$ ............................................. G05B 13/02
[52] U.S. Cl. .............................. 364/161; 364/157; 364/162; 364/177; 318/561
[58] Field of Search ............... 364/160, 161, 162, 163, 364/157, 158, 159, 149–151, 176, 177; 318/561, 609, 610; 395/3, 61, 900

[56] References Cited

U.S. PATENT DOCUMENTS

| 3,767,900 | 10/1973 | Chao et al. | 364/151 |
| 4,675,804 | 6/1987 | Wiemer | 364/161 |
| 4,718,012 | 1/1988 | Oshiage | 364/161 X |
| 4,881,160 | 11/1989 | Sakai et al. | 364/161 |
| 4,882,526 | 11/1989 | Iino et al. | 364/161 X |
| 4,903,192 | 2/1990 | Saito et al. | 364/162 X |
| 4,918,584 | 4/1990 | Goff | 364/161 X |
| 4,999,557 | 3/1991 | Inoue | 364/161 X |

*Primary Examiner*—Joseph Ruggiero
*Attorney, Agent, or Firm*—Antonelli, Terry, Stout & Kraus

[57] ABSTRACT

A process control apparatus and a process control system for observing the waveform of the deviation between a set point which controls the process in a control loop and the process controlled variable transmitted from the process so that the operating parameters are adjusted in accordance with a predetermined adjustment rule by using the deviation based upon the absolute value of a wave for every half cycle of the wave. Therefore, even if the process controlled variable is influenced, the area of the wave cannot be changed significantly. As a result, the operating parameters can be adjusted correctly, causing the process controlled variable to quickly coincide with the set point.

48 Claims, 30 Drawing Sheets

FIG. 5
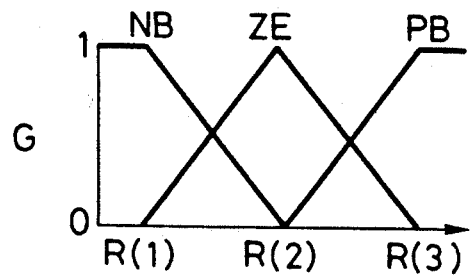
FIG. 6
| RULE | E | D | R | CKP | CTI | CTD |
|---|---|---|---|---|---|---|
| 1 | PB | PB | — | NB | ZE | NB |
| 2 | PB | PM | PB | NB | NB | ZE |
| 3 | PB | PM | ZE | ZE | ZE | PB |
| 4 | PB | PM | NB | PB | PB | PB |
| 5 | PB | ZE | PB | NB | ZE | ZE |
| 6 | PB | ZE | ZE | ZE | PB | ZE |
FIG. 7
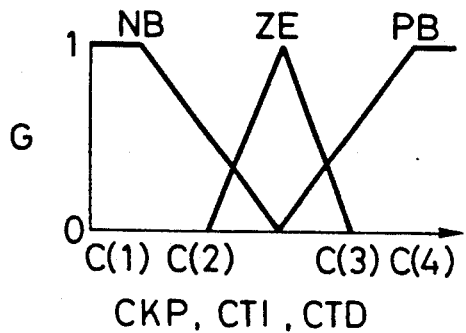

F I G. 10
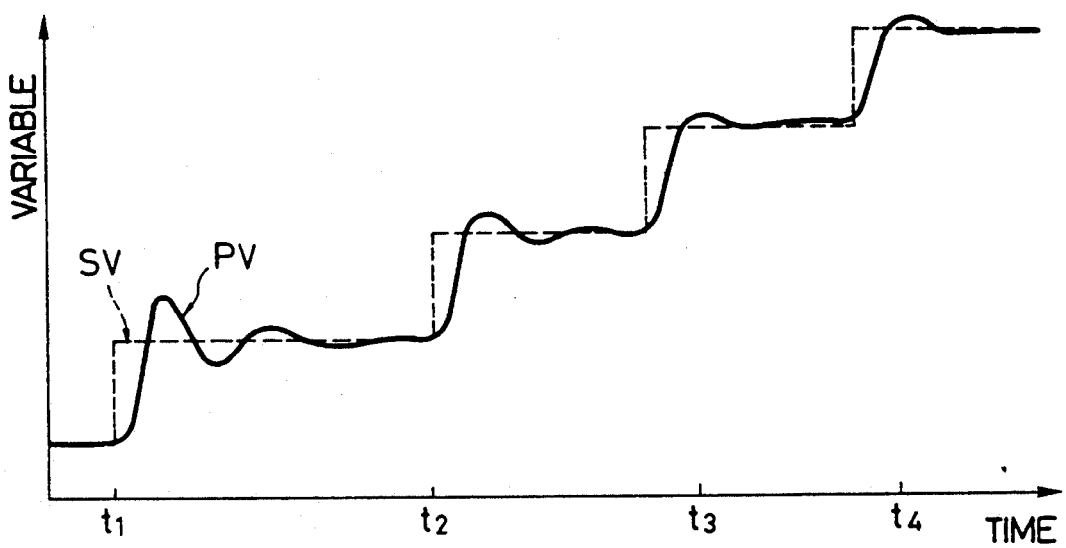
F I G. 11
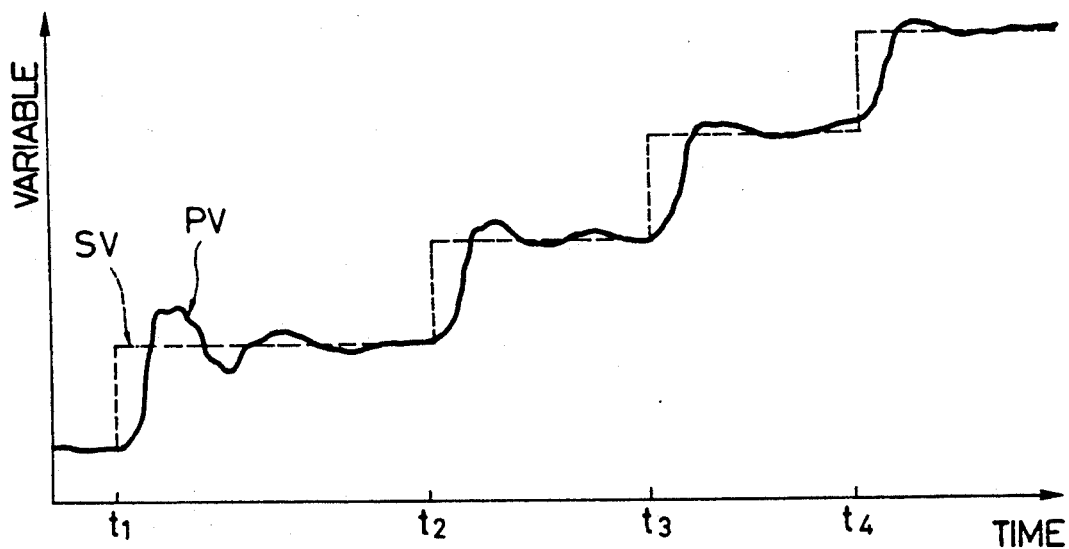

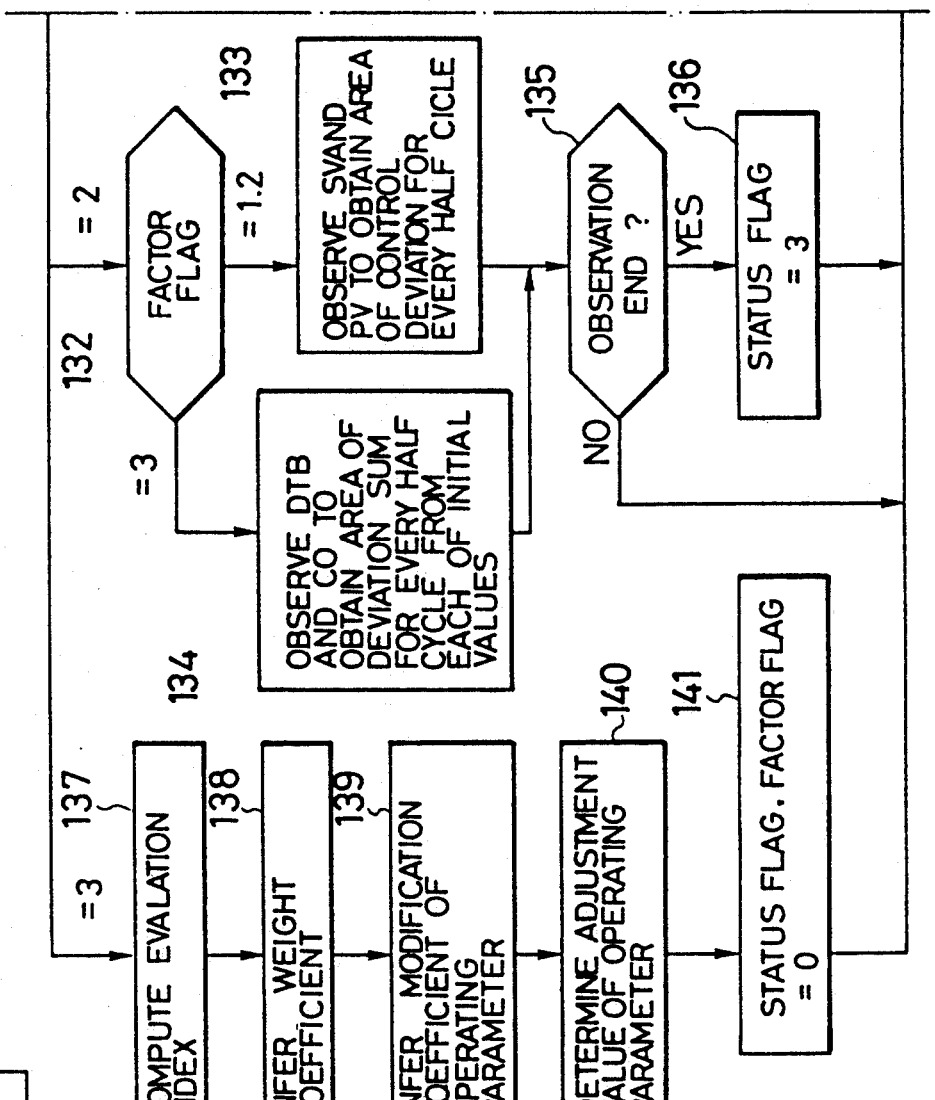

| n | MINIMAL POINT | | INFLECTION POINT | | MAXIMAL POINT | |
|---|---|---|---|---|---|---|
| | $\sigma$ (>0) | $f(\sigma)$(<0) | $\sigma$ (>0) | $f(\sigma)$(>0) | $\sigma$ (>0) | $f(\sigma)$(>0) |
| 1 | 2.0295L | $-0.0735L^3$ | 13.333L | $14.370L^3$ | 24.637L | $28.814L^3$ |
| 2 | 1.8350L | $-0.0266L^3$ | 10.000L | $54.167L^3$ | 18.165L | $10.860L^3$ |
| 3 | 1.7311L | $-0.0143L^3$ | 8.8889L | $3.6529L^3$ | 16.047L | $7.3202L^3$ |
| 4 | 1.6667L | $-0.0093L^3$ | 8.3333L | $2.9537L^3$ | 15.000L | $5.9167L^3$ |
| 10 | 1.5215L | $-0.0027L^3$ | 7.3333L | $1.9604L^3$ | 13.145L | $3.9235L^3$ |
| $\infty$ | 1.3962L | $-0.0011L^3$ | 6.6667L | $1.4630L^3$ | 11.937L | $2.9270L^3$ |

FIG. 30

| No. | $\sigma_0$ | $f(\sigma_0)$ | $f'(\sigma_0)$ | MINIMUM POSITIVE REAL ROOT $\sigma$ (APPROXIMATE EXPRESSION) |
|---|---|---|---|---|
| 1 | 0 | $(\frac{1}{6} + \frac{1}{2n})L^3$ | $-0.5(\frac{1}{2} + \frac{1}{n})L^2$ | $\dfrac{2(1+\frac{3}{n})}{3(1+\frac{2}{n})}L$ |
| 2 | L | $(0.0116666 + \frac{0.1}{n})L^3$ | $-(0.065 + \frac{0.3}{n})L^2$ | $\dfrac{0.0766666 + \frac{0.4}{n}}{0.065 + \frac{0.3}{n}}L$ |
| 3 | 1.2L | $(0.0020266 + \frac{0.044}{n})L^3$ | $-(0.0316 + \frac{0.26}{n})L^2$ | $\dfrac{0.0399466 + \frac{0.356}{n}}{0.0316 + \frac{0.26}{n}}L$ |
| 4 | 1.3L | $(-0.0003184 + \frac{0.019}{n})L^3$ | $-(0.01535 - \frac{0.24}{n})L^2$ | $\dfrac{0.0196366 + \frac{0.331}{n}}{0.01535 + \frac{0.24}{n}}L$ |
| 5 | 1.4L | $-(0.00010534 + \frac{0.004}{n})L^3$ | $(0.0006 - \frac{0.22}{n})L^2$ | $\dfrac{0.0018934 - \frac{0.304}{n}}{0.0006 - \frac{0.22}{n}}L$ |

FIG. 31

| n | APPROXIMATE EXPRESSION ||||| TRUE VALUE (CALCULATED VALUE) OF MINIMUM POSITIVE REAL ROOT OF f(d)=0 |
| --- | --- | --- | --- | --- | --- | --- |
| | $\sigma_0 = 0$ $\dfrac{2(1+\tfrac{3}{n})}{3(1+\tfrac{2}{n})}L$ | $\sigma_0 = L$ $\dfrac{0.0766666 + \tfrac{0.4}{n}}{0.065 + \tfrac{0.3}{n}}L$ | $\sigma_0 = 1.2L$ $\dfrac{0.0399466 + \tfrac{0.356}{n}}{0.0316 + \tfrac{0.26}{n}}L$ | $\sigma_0 = 1.3L$ $\dfrac{0.0196366 + \tfrac{0.321}{n}}{0.01535 + \tfrac{0.24}{n}}L$ | $\sigma_0 = 1.4L$ $\dfrac{0.0018934 + \tfrac{0.0304}{n}}{0.0006 + \tfrac{0.22}{n}}L$ | |
| 0 | L | 1.3333333L | 1.3692307L | 1.3791666L | 1.3818181L | — |
| 0.01 | 0.9983416L | 1.3300006L | 1.3691031L | 1.3791027L | 1.3817697L | 1.382L |
| 0.05 | 0.9918699L | 1.3316845L | 1.3685959L | 1.3788481L | 1.3815762L | 1.382L |
| 0.1 | 0.9841269L | 1.3300706L | 1.3679687L | 1.3785317L | 1.3813342L | 1.382L |
| 0.5 | 0.9333333L | 1.3182956L | 1.3632099L | 1.3760706L | 1.3793959L | 1.380L |
| 1 | 0.8888888L | 1.3059358L | 1.3578415L | 1.3731607L | 1.3769671L | 1.377L |
| 2 | 0.8333333L | 1.2868213L | 1.3486794L | 1.3678359L | 1.3720895L | 1.373L |
| 3 | 0.8L | 1.2727266L | 1.3411495L | 1.3630823L | 1.3671853L | 1.369L |
| 4 | 0.7777777L | 1.2619042L | 1.3348509L | 1.3588135L | 1.3622536L | 1.365L |
| 5 | 0.7619047L | 1.2533328L | 1.3295047L | 1.3549581L | 1.3572949L | 1.361L |
| 10 | 0.7222222L | 1.2280694L | 1.3115729L | 1.3401931L | 1.3320841L | 1.345L |
| ∞ | 0.6666666L | 1.1794861L | 1.2641329L | 1.2792573L | 3.1556666L | — |

F I G. 37

| REFERENCE MODEL NAME | COEFFICIENT | | |
|---|---|---|---|
| | $\alpha_2$ | $\alpha_3$ | $\alpha_4$ |
| KITAMORI | 0.5 | 0.15 | 0.03 |
| Butte Sworth | 0.5030 | 0.1479 | 0.02188 |
| ITAE minimum | 0.4664 | 0.1067 | 0.01882 |
| Binomial | 0.3750 | 0.06250 | 0.003906 |
| TRANSFER FUNCTION Wr(S) OF REFERENCE MODEL | $\dfrac{1}{1+\sigma s + \alpha_2 \sigma^2 s^2 + \alpha_3 \sigma^3 s^3 + \alpha_4 \sigma^4 s^4 + \cdots}$ | | |

PROCESS CONTROL APPARATUS AND METHOD FOR ADJUSTMENT OF OPERATING PARAMETERS OF CONTROLLER OF THE PROCESS CONTROL APPARATUS

BACKGROUND OF THE INVENTION

1. Field of the Invention

The present invention relates to a process control apparatus having at least a control loop for feedback-controlling a process controlled variable of a process to a set point by at least its proportional-integral or proportional-integral-derivative operation. More particularly, the present invention relates to a process control apparatus capable of automatically tuning the operating parameters and a method for adjustment of the operating parameters of a controller for use in a process control apparatus.

2. Description of the Prior Art

In the past, the tuning of PID control parameters in the PID controller of a process control apparatus is effected manually by the operator who is observing variations in control variables. This raises problems that the adjustment work becomes time-consuming and tuning results are differently affected by individuality of the operators.

On the other hand, a variety of systems based on control theory have been proposed wherein a setting test signal is applied to an object to be controlled so as to set a dynamic characteristics of the process and control parameters are turned to optimum values on the basis of setting results. In these proposals, however, it is expected that because of fluctuation of control variables due to the application of the setting test signal, quality is degraded or, particularly in a plant of high nonlinearity, abnormal states disadvantageously take place. Further, unless the setting test is performed each time the dynamic characteristics of the controllable object is changed, optimum values of operating parameters can not be obtained, thus leading to troublesome handling operations.

As described in "Expert Self-tuning Controller", Measurement Technology, pp 66–72, Nov., 1986, "PID-Self-Tuning Based on Expert Method" Measurement Technology, pp 52–59, Nov., 1986, JP-A-62-108306 and JP-A-61-245203, heuristic methods are also known wherein the tuning of control parameters is effected in consideration of the shape of responses of controlled variables.

Each of the above-described methods is arranged to modify the operating parameters in a predetermined relationship and based upon the overshoot amount for evaluating the controllability or the amplitude damping ratio by using the external values of the actual control response shape obtained by a detection. It is considered feasible for the above-described methods to involve a disadvantage in that, if the process controlled variable is disordered by noise, the external value of the actual control response shape is erroneously detected, causing the overshoot amount or the amplitude damping ratio to be obtained incorrectly. This leads to a problem that the operating parameters cannot be modified correctly.

A proposal relating to a PID controller having a function capable of tuning the PID operating parameter has been disclosed by the inventor of the present invention in Japanese Patent Laid-Open No. 63-247801. In accordance with the above-described PID controller, the control response waveform is observed, and an evaluating index computed from the result of the observation is used to tune the PID operating parameter in accordance with an adjustment rule corresponding to a plurality of control response waveforms and based upon fuzzy inference processing. According to the automatic tuning means of the above-described PID controller, the set point and the process controlled variable are arranged to be entered and only the set value or response waveform of the process controlled variable generated due to change in the disturbance is observed so as to tune the PID operating parameter.

However, the optimum value of the operating parameter tuned by observing the control response waveform generated due to change in the set point and the optimum value of the operating parameter tuned by observing the control response waveform generated due to the application of disturbance become different from each other. Therefore, according to the above-described PID controller, the tuning in a control loop in which change in the set point and application of disturbance exist together cannot sometimes be converged, resulting in the necessity of selecting a proper tuning.

However, the control response generates, due to change in the set point, an application of known disturbance and an interference from the other control loop (to be called "a unknown disturbance") in the case where a multi-variable process is the process to be controlled. Therefore, a multi-variable process control apparatus, having an automatic tuning means capable of stably converging the turning to a proper control response even when the above-described factors are mixed with one another, has been desired.

A method of adjusting the operating parameters of a controller of a process control apparatus has been disclosed in "Automatic Tuning System for a PID controller and based on Fuzzy Inference", 13-th System Symposium, Measurement Technology, Nov., 1987. The above-described method is arranged in such a manner that the feature quantity, such as overshoot amount E, damping ratio D, oscillation period ratio R or the like, are extracted from the response waveform of the process controlled variable at the time of step-changing the set point, and then operating parameters are determined from the thus obtained feature quantity on the basis of fuzzy inference. The fuzzy inference expresses the following adjustment rule about the qualitative expression in a fuzzy rule and determines operating parameters from the feature quantity by fuzzy operation using the fuzzy rule: "if the overshoot amount E and the damping ratio D are large, the proportion gain $K_p$ and the derivative time $Tc_1$ are made small" (an example of the adjustment rule).

Hitherto, several tens of fuzzy rules have been needed in the conventional technology and the fuzzy rules, that is, the adjustment rules, must be constituted without involving any inconsistency. Therefore, a problem arises in that it takes too long a time to constitute the adjustment rules.

As a method of adjusting the operating parameters of a PID controller for a process control apparatus, there is available a partial model matching method as described in, for example, "Design Method for Control System Based on Partial Knowledge of Controllable Object", Transactions of the Society of Instrument and Control Engineers, Vol. 5, No. 4, pp 549/555, Aug., 1979.

The above-described partial model matching method is a method for determining the operating parameters of a PID controller so as to provide a closed loop transfer function W(s) of process controlled variable y(s) with respect to set point r (s) s: Laplacean partially coincide with the transfer function $W_r(s)$ of a reference model showing a satisfactory response. Then, a case in which a transfer function $G_p(s)$ of a process can be approximated by primary delay + dead time will now be considered.

$$G_p(s) = \frac{K}{1 + Ts} e^{-Ls} \quad (1)$$

where K: gain, T: time constant, L: dead time.

The transfer function $G_c(s)$ of the PID controller can be expressed by:

$$G_c(s) = K_p \left( 1 + \frac{1}{T_i s} + T_d s \right) \quad (2)$$

The closed-loop transfer function W(s) of the process controlled variable y(s) with respect to the set point r(s) can be expressed as:

$$W(s) = \frac{G_c(s)G_p(s)}{1 + G_c(s)G_p(s)} \quad (3)$$

Substitution of equations (1) and (2) into equation (3) gives $$W(s) = \frac{K_p\left(1 + \frac{1}{T_i s} + T_d s\right) \cdot \frac{1}{1 + Ts} e^{-Ls}}{1 + K_p\left(1 + \frac{1}{T_i s} + T_d s\right) \cdot \frac{K}{1 + Ts} e^{-Ls}} \quad (4)$$

Maclaurin's-expansion of the dead time transfer function $e^{-Ls}$ gives $$e^{-Ls} = \frac{1}{1 + Ls + \frac{1}{2!}(Ls)^2 + \frac{1}{3!}(Ls)^3 + \ldots} \quad (5)$$

On the other hand, the transfer function $W_r(s)$ of the reference model can be given from the following equation:

$$W_r(s) = \frac{1}{1 + \sigma s + a_2(\sigma s)^2 + a_3(\sigma s)^3 + a_4(\sigma s)^4 + \ldots} \quad (6)$$

where $a_i$: coefficient, $\sigma$: time scale factor.

In order to make the closed-loop transfer function W(s) of the process controlled variable y(s) with respect to the set point r(s) obtained by substituting equation (5) into equation (4) partially agree with the transfer function W(s) of the reference model expressed by equation (6), the following equation must be satisfied:

$$\left. \begin{array}{l} T_i = KK_p\sigma \\ T_i(L + T) = KK_p a_2\sigma^2 + KK_p T_i\sigma \\ T_i\left(\frac{L^2}{2!} + TL\right) = KK_p a_3\sigma^3 + KK_p T_i a_2\sigma^2 + KK_p T_i T_d\sigma \\ T_i\left(\frac{L^3}{3!} + \frac{TL^2}{2!}\right) = KK_p a_4\sigma^4 + KK_p T_i a_3\sigma^3 + \\ \qquad\qquad\qquad\qquad KK_p T_i T_d a_2\sigma^2 \end{array} \right\} \quad (7)$$

The following equations (8) to (11) are obtained from equation (7) so that the operating parameters $K_p$, $T_i$ and $T_d$ and the time scale factor $\sigma$ of the PID controller are determined.

$$K_p = \frac{T_i}{K\sigma} \quad (8)$$

$$T_i = L + T - a_2\sigma \quad (9)$$

$$T_d = \frac{1}{T_i}\left\{ \frac{L^2}{2!} + TL - (L + T)a_2\sigma + (a_2^2 - a_3)\sigma^2 \right\} \quad (10)$$

$$f(\sigma) = (2a_2 a_3 - a_2^3 - a_4)\sigma^3 + (L + T)(a_2^2 - a_3)\sigma^2 - \quad (11)$$

$$\left(\frac{L^2}{2!} + TL\right)a_2\sigma + \left(\frac{L^3}{3!} + \frac{TL^2}{2!}\right) = 0$$

Since equation (11) is a cubic equation, complicated calculations are necessary to determine the minimum positive real root as the time scale factor $\sigma$ by solving the cubic equation. Therefore, a problem arises in that it takes too long a time to solve the above-described calculations by using a microcomputer. Therefore, a simple equation becomes necessary. As a result of the study of the results of calculations of minimum positive real roots of equation (11) about a variety of primary delay + dead time of a Kitamori model ($a_2 = 0.5$, $a_3 = 0.15$, $a_4 = 0.03$, ...), it has been found that the time scale factor $\sigma$ can be approximated as follows:

$$\sigma \approx 1.37L \quad (12).$$

However, a problem arises in that the approximate accuracy of equation (12) becomes unsatisfactory in a region in which the ratio L/T between the dead time L and the time constant T is small and in another region in which it is large.

Furthermore, according to the above-described conventional technology, the rise time of the control response cannot be adjusted.

SUMMARY OF THE INVENTION

An object of the present invention is to provide a process control apparatus capable of correctly and automatically tuning the operating parameters without placing a burden on the operator, without a necessity of applying an identifying test signal to the process to be controlled, and without any influence from noise.

Another object of the present invention is to provide a multi-variable process control apparatus formed by a plurality of control loops and having automatic tuning means capable of stably tuning the operating parameters of a controller in each of control loops without placing a burden on the operator, without a necessity of applying an identifying test signal to the process to be controlled, and even if change in the set point and applications of a known disturbance and unknown disturbance exist.

A further object of the resent invention is to provide a method of adjusting a controller in which time taken for the structure of an adjustment rule to be constituted can be shortened.

A still further object of the present invention is to provide a method of adjusting the operating parameters of a PID controller by using an approximate solution of a cubic equation (11) obtained accurately in a wide range of a ratio L/T between the dead time L and the time constant T.

A further object of the present invention is to provide a method of adjusting the operating parameters of a PID controller capable of adjusting the rise time of the control response of the PID controller, the rise time of the control response being capable of defining the operating parameters.

In order to achieve the above-described objects, a process control apparatus is provided according to the present invention for feedback-controlling the process controlled variable of a process to a set point and performing at least proportional-integral control operation, the process control apparatus comprising: control response observation means for observing the waveform of a control deviation between the set point and the process controlled variable which takes place due to change in the set point or an application of disturbance and for computing an area value by time-integrating the absolute value of the control deviation at every half cycle; evaluation index computing means for computing an evaluation index from the area value after a control response has been set; operating parameter modification coefficient inference means for receiving the evaluation index and inferring a modification coefficient of the operating parameters in accordance with an adjustment rule qualitatively expressing the relationship between the degree of the evaluation index and the value of the operating parameter and based upon a fuzzy inference; and operating parameter adjustment value computing means for computing the adjustment value of the operating parameter by means of the product of the modification coefficient and the present value of the operating parameter.

According to the process control apparatus according to the present invention, the observation of the control response is started by the control response observation means when the control deviation exceeds a predetermined value so that the dynamic characteristic change of the process can be quickly detected. Furthermore, even if the process controlled variable is disordered by noise, the evaluation index can be always and correctly obtained by obtaining the area value of the control deviation. The operating parameter modification coefficient inference means tunes the operating parameter in a manner similar to a skilled operator by employing fuzzy inference processing. Therefore, the adjustment value of the operating parameters can be obtained by obtaining the modification coefficient of each of the operating parameters by quantitatively evaluating the area overshoot amount and the area damping ratio which expresses, by the area value, the overshoot amount of the control response, the damping ratio of the same and the sum of the area values for evaluating the quick response of the process controlled variable.

The above-described objects can be achieved by providing an automatic tuning means capable of adjusting, in the most suitable way, the operating parameters for each of the controllers such as the PID controllers in such a manner that each of the provided automatic tuning means acts automatic. Furthermore, the automatically tuning involves response generating factor discriminating means for receiving the set point, the process controlled variable, an output from the controller and a known disturbance added to the output for discriminating that the response generating factor is any of the set point, the known disturbance and an unknown disturbance; waveform observing means for observing the set point and the process controlled variable and computing an area value of the control deviation for a half cycle when the response generating factor is the set point and the unknown disturbance, the waveform computing the area value for every half cycle of the sum of deviations from the value of each of the controller output and the known disturbance when the response generating factor is the known disturbance; an evaluating index computing function for obtaining the area overshoot amount, the area damping ratio and the area ratio between the previous sum of the area values and the present sum of the same for every half cycle; an operating parameter modification coefficient inference function for quantitatively evaluating the evaluation indexes and inferring the modification coefficient of the operating parameters in accordance with a plurality of adjustment rules corresponding to the response waveform based upon fuzzy inference; a control performance satisfaction degree evaluating function for obtaining the weight coefficient corresponding to the satisfaction degree with respect to the desired control specification in accordance with the fuzzy inference; and an operating parameter adjustment value computing function for obtaining the adjustment value of the operating parameter by adding the present value of the operating parameter to the product of the modification coefficient of the operating parameter and the weight coefficient and the present value of the operating parameter.

According to the multi-variable process control apparatus according to the present invention, the response generating factor discriminating function starts observing the response waveform of the process controlled variable when the change in the set point or the control deviation exceeds a predetermined value, while, it starts observation of the response waveform of the output from the controller when the known disturbance exceeds a predetermined value. As a result, the automatic tuning means for the operating parameters of each of the controllers can automatically act. Furthermore, the dynamic characteristic change of the process to be controlled can be quickly detected. Since the waveform observing function obtains the area value by time-integrating, for example, the control deviation, the evaluation index can be always and correctly obtained even if the process controlled variable is disordered by noise. The evaluation index computing function employs the area overshoot amount, the area damping ratio by means of area value, and the ratio between the previous total area value and the present total area value as an alternative to the conventional evaluation indexes such as the overshoot amount using the extermal value and the amplitude damping ratio. The operating parameter modification coefficient inference function employs fuzzy inference processing for the purpose of tuning the operating parameters in a manner similar to that of a skilled operator and evaluates the evaluation index quantitatively for the purpose of inferring the modification coefficient of the operating parameter. As a result, the operating parameter can be tuned preferably similarly to the result of the skilled operator. The control performance satisfaction degree evaluating function evaluates the degree of the satisfaction obtained from the present control performance with respect to the desired control specification. It further obtains the weight coefficient in accordance with the fuzzy inference so as to be used for compensating the modification coefficient of the operating parameters. Thus, the operating parameters can be stable converged.

In order to achieve the above-described objects, the control system is approximated by a standard quadratic system model, the step response of the control system is measured, and damping coefficient $\xi$ of the control system and the intrinsic angular frequency $\omega_n$ are inferred from the result of the measurement, and the parameter of the controller is adjusted so as to make the above-described values reach a preferred level. Since the control system is approximated by a standard quadratic system model, the step response of the control system is measured, and the damping coefficient $\xi$ of the control system and the intrinsic angular frequency $\omega_n$ are inferred from the result of the measurement and the parameter of the controller is adjusted so as to make the above-described values reach a preferred level, quantitative prediction can be conducted in spite of the error caused from the approximation. Therefore, the construction of the adjustment rule can be achieved in a short time.

In order to achieve the above-described objects, the schematic shape of f(s) defined by Equation (11) is determined, the approximate solution of Equation (11) is obtained in accordance with the schematic shape, and the operating parameters of the PID controller are determined by using the approximate solution.

Furthermore, in order to provide the method of adjusting the operating parameters of the PID controller capable of adjusting the rise time of the control response which defines the operating parameters in accordance with Equations (8), (9) and (10), time scale factor s is expressed by the function of L, and the coefficient of this function is increased/decreased so as to quicken/delay the rise of the control response.

The true value of the minimum positive real root of Equation (11) becomes the ratio L/T of the dead time L and the time constant T and the function of the dead time L.

Therefore, the approximate solution of the minimum positive real root of Equation (11) is also obtained as L/T and the function of the dead time L. Therefore, the accuracy of the approximate solution of Equation (11) can be improved.

When the time scale factor s is changed, the rise time of the control response changes. The time scale factor $\sigma$ is expressed by the function of the dead time L which is a critical parameter expressing the characteristics of the process which can be approximated by the first delay+- the dead time. When the time scale factor s is increased/decreased by increase/decrease of the function, the characteristics of the dead time L are reflected to the operating parameters Kp, Ti and Td. Therefore, the response rise time can be quickened or delayed while stable control response is maintained.

Other and further objects, features and advantages of the invention will be appear more fully from the following description.

BRIEF DESCRIPTION OF THE DRAWINGS

FIGS. 3 to 5 illustrate a membership function for evaluating the area overshoot amount, a membership function for evaluating the area damping ratio and a membership function for evaluating the overall area ratio;

FIG. 6 illustrates an example of an adjustment rule;

FIG. 7 illustrates a membership function for an operating parameter modification coefficient;

FIGS. 10 and 11 illustrate the automatic tuning process according to the present invention;

FIGS. 16, 16A, and 16B comprise a schematic flow chart which illustrates the automatic tuning means according to the present invention as shown in FIGS. 16A and 16B;

FIGS. 28, 29, 30 and 31 illustrate the process of obtaining an approximate expression of a time scale factor $\sigma$ according to the present invention;

FIG. 37 illustrates a transfer function of variable reference models.

DETAILED DESCRIPTION OF THE PREFERRED EMBODIMENTS

A first embodiment of the present invention will now be described with reference to FIGS. 1 to 12.

Figure 1:
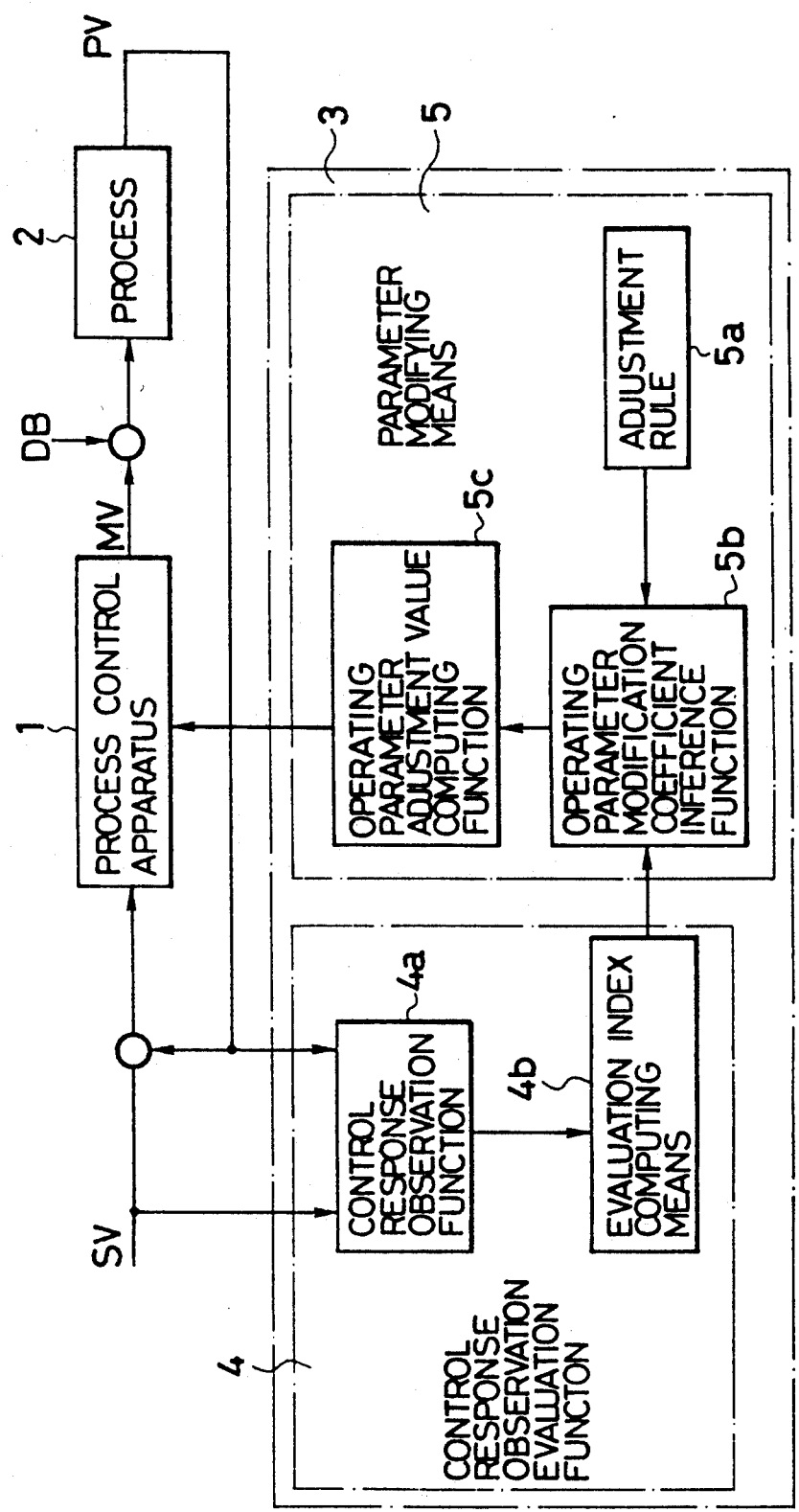
FIG. 1 illustrates the structure of the functions (means) of a system for automatically tuning operating parameters according to an embodiment of the present invention.

Referring to a control loop shown in FIG. 1, a process control apparatus 1, for example, PID (Proportional-Integral-Derivative)-operates on a control deviation signal obtained from a comparison made between set point SV and process controlled variable PV so as to supply the result as a manipulated variable to a process 2 to be controlled. An automatic function (means) 3 of the process control apparatus 1 comprises a control response observation evaluation function (means) 4 and an operating parameter modifying function (means) 5. The control response observation evaluation function 4 comprises a control response observation function (means) 4a and an evaluation index computing function (means) 4b. The variable parameter modifying function (means) 5 comprises an adjustment rule 5a, an operating parameter modification coefficient inference function (means) 5b and an operating parameter adjustment value computing function (means) 5c.

The functions (means) will be respectively described. The control response observation function (means) 4a always supervises the set point SV and the process controlled variable PV so as to start observing the control response when a control deviation signal between the set point SV and the process controlled variable PV exceeds a predetermined value after the process controlled variable has been set to the set point SV. Simultaneously with the observation start, the values of the area obtained by time-integrating the absolute value of the control deviation are successively obtained whenever the polarity of the control deviation changes, that is, at every half cycle, the values of the area being successively obtained in only the period in which a homopolar control deviation is continued. When the process controlled variable PV has been set to the set point SV, the above-described observation operation is ended. At this time, the evaluation index computing function 4b obtains, from a plurality of values of the area obtained, the area overshoot amount, the area damping ratio and the total area ratio which is the ratio between the previous sum of the values of the area and the present sum of the same. Then, the way to obtain the area overshoot amount, the area damping ratio and the total area ratio will be described with reference to FIG. 2.

Figure 2:
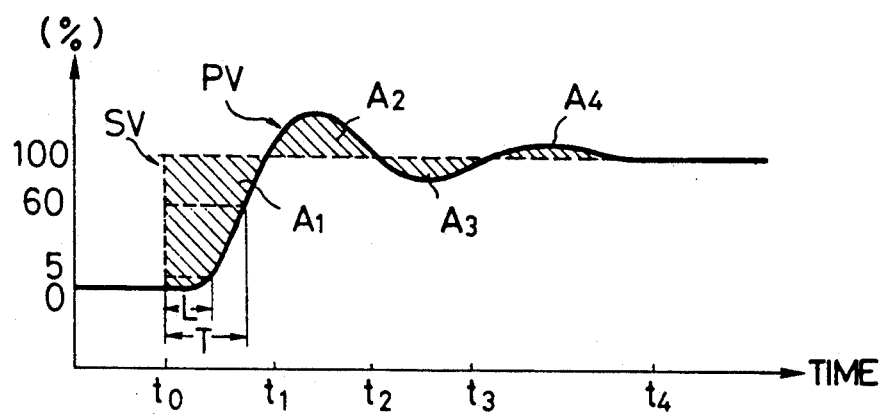
FIG. 2 illustrates an observation of the process controlled variable response shape at the time of a step change of a set point.

FIG. 2 illustrates an example of the time response of the process controlled variable when the set point SV has been step-changed from $Y_0$ to $Y_1$. FIG. 2 illustrates a case in which the polarity of the control deviation signal which is the difference between the set point SV and the process controlled variable PV is altered at time $t_1$, $t_2$ and $t_3$ and it is set at time $t_4$. In this case, area values A1, A2, A3 and A4 (the first, second, third and fourth values of the area) are obtained by time-integrating the absolute value of the control deviation at every half cycle. The evaluation index of each of the area overshoot amount E, the area damping ratio D and the total area ratio R are obtained from the following equations:

$E = A1/A1$ (the first evaluation index)

$D = A3/A2$ (the second evaluation index)

$R = \Sigma Ai, n - 1/\Sigma Ai, n$ (the third evaluation index)

where $n-1$ and $n$ respectively represent the previous tuning trial and the present tuning trial. If A2 cannot be obtained, a negative pseudovalue is set to D, while, for example, 1 is set to R at the first trial.

Figure 3:
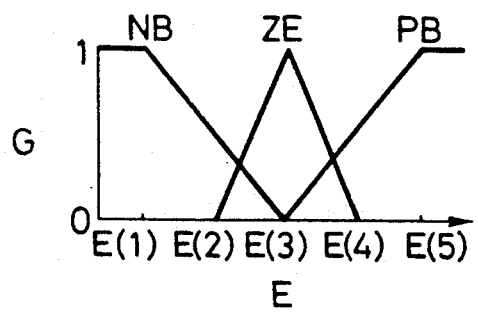
Figure 4:
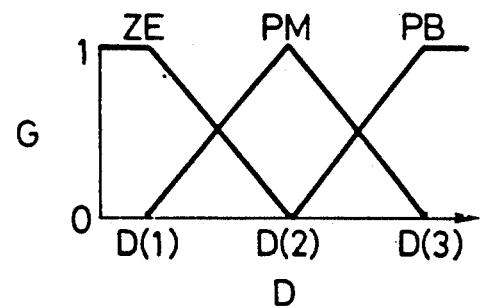

Then, the operating parameter modification coefficient inference function 5b using fuzzy inference will be described. In order to qualitatively evaluate the overshoot amount E, the magnitude of the area damping ratio D and that of the total area ratio R, membership functions shown in FIGS. 3 to 5 are defined here. Referring to the drawings, symbols E(i) (i=1 to 5), D(i) (i=1 to 3) and R(i) (i=1 to 3) represent constants for defining the corresponding membership functions. Symbols PB, PM, ZE and NB are names given to the membership functions for the purpose of qualitatively evaluating the magnitude, the names have the following meanings:

PB: Positive Big (large)
PM: Positive Medium (medium)
ZE: Zero (proper)
NB: Negative Big (small).

The axes of ordinates of the drawings represent the membership value G which shows the qualitative degrees. FIG. 6 illustrates an example of the adjustment rule 5a of each of the operating parameters of P, I and D with respect to variable control responses made by the process control apparatus 1 by using the above-described membership functions and making the PID controller a subject.

Figure 8:
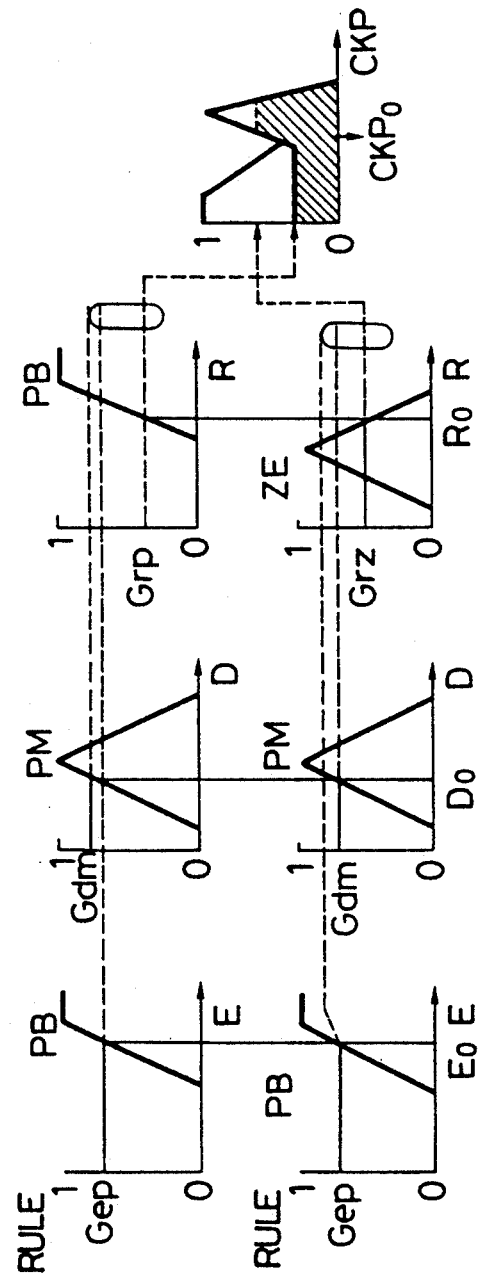
FIG. 8 illustrates the way to obtain the operating parameter modification coefficient based upon fuzzy inference.

For example, a rule 2 means "if (E is PB and D is PM and R is PB, that is, E is PB, D is PM and R is PB) then (CKP is NB and CTI is NB and CTD is ZE, that is, CKP is NB, CTI is NB and CTD is ZE). The portion following "if" is called "a conditional portion", while the portion following "then" is called "a conclusion portion". Symbol CKP represents a proportional gain, CTI represents the modification coefficient of integral time and CTD represents that of derivative time. FIG. 7 illustrates the membership functions for converting the modification coefficients of the operating parameters which have been qualitatively decided into quantitative values. Symbols C(i)(i=1 to 4) shown in FIG. 7 represent constants for defining the shape of the membership functions. Symbols PB, ZE and NB are names given to the membership functions for the purpose of qualitatively expressing the magnitude of each of the operating parameter modification coefficients, symbols PB, ZE and NB corresponding to the names used in FIGS. 3 to 5. Referring to the drawing, the axis of ordinate denotes the membership value G. Then, the way to obtain the modification coefficient of the operating parameters will be described with reference to the cases in which the rules 2 and 3 shown in FIG. 6 are applied. FIG. 8 shows the determining method of the modification coefficient CKP of the proportional gain based upon fuzzy inference. The degree of each of the area overshoot amount $E_0$, the area damping ratio $D_0$ and the total area ratio $R_0$ obtained by the process controlled variable response observation function 4 is obtained by each of the membership functions shown in FIGS. 3 to 5. According to the rule 2, the values become Gep, Gdm and Grp, while the values become Gep, Gdm and Grz according to the rule 3. Each of the values according to the corresponding rules is subjected to a product set (the minimum value) operation so that the goodness of fit of each of the rules is obtained. As a result, Grp is obtained as the goodness of fit for the rule 2, while Grz is obtained for the rule 3. Then, the membership function of the conclusion portion of each of the rules is weighted in accordance with the goodness of fit for each of the rules. Then, their sums of sets (the maximum value) are calculated so that the value of the center of gravity is made the proportional gain modification coefficient $CKP_0$. Also, the modification coefficient CTI and CTD for the integral time and the derivative time are similarly obtained.

The operating parameter adjustment value computing function 5c multiplies the modification coefficient of the operating parameter obtained by the operating parameter modification coefficient inference function 5b by the present value of the operating parameter so that each of the adjustment values of the PID operating parameter is determined.

Figure 9:
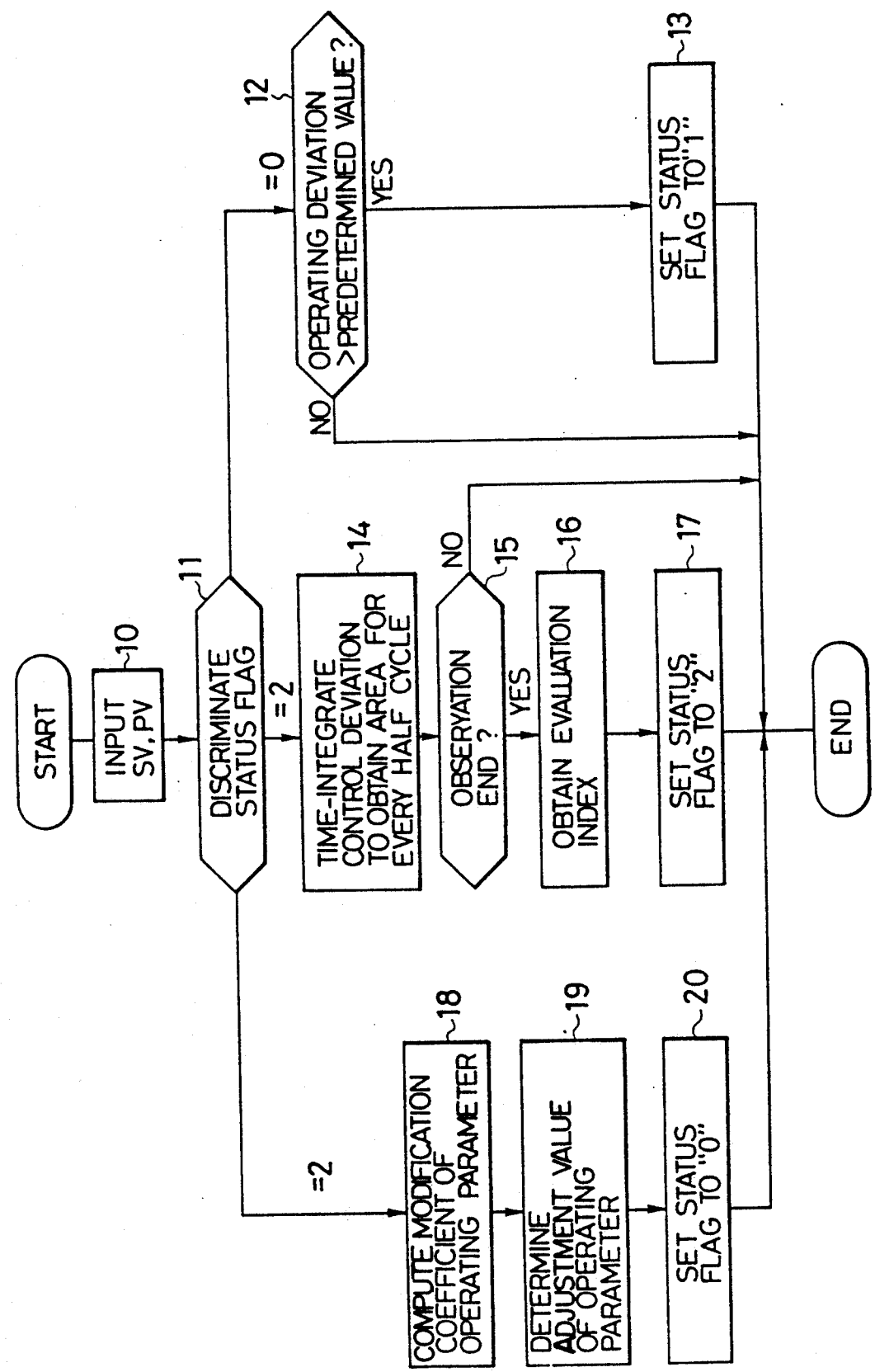
FIG. 9 is a flow chart which illustrates the automatic tuning function according to the present invention.

FIG. 9 is a flow chart which illustrates the schematic process performed by the automatic tuning function 3. According to a block 10, SV and PV are supplied at a predetermined period and a status flag showing the state of the processing performed by the automatic tuning function 3 is determined at every supplication as described above. When the status flag is zero, it is shown that the control response is in the supervisory state, when the status flag is 1, it is shown that the control response is in the observation evaluation state, and when the status flag is 2, the operating parameter computing state is shown. When the status flag is zero, it is determined whether or not the control deviation signal has exceeded a predetermined level according to block 12. If the control deviation signal has exceeded the predetermined level, the status flag is set to 1 according to block 13 so that a state in which the control response is being observed is realized. If the control deviation signal does not exceed the predetermined level, the state in which the control response is being supervised is maintained. If it is determined in block 11 that the status flag is 1, the flow advances to block 14 in which the time-integration processing of the absolute value of the control deviation is continued when the polarity of the control deviation is the same as the previous state. If the polarity is different from the previous state, the time integration result of the previous state is stored as the value of the area. The above-described processing is continued until PV is set to SV (until the observation ends). The above-described processing flow corresponds to the control response observation function 4a. When the observation has been ended, the evaluation indexes (the area overshoot amount, the area damping ratio and the total area ratio) are obtained in block 16 (the evaluation index computing function 4b), and the flow advances to block 17 in which the status flag is set to 2 in which a state in which the operating parameter is being computed is realized. If it has been determined in block 11 that the status flag is 2, the flow advances to block 18 (the operating parameter modification coefficient inference function 5b) in which the modification of the operating parameter is obtained and in block 19 (the operating parameter adjustment value computing function 5c), the adjustment value of the operating parameter is successively obtained. The obtained adjustment value of the operating parameter is used in the control operation performed by the process control apparatus 1. After the processings in block 19 have been ended, the flow advances to block 20 in which the status flag is reset to 0 so that the state for supervising control response is again realized.

FIGS. 10 and 11 show the process of the automatic tuning when the step-changing of the set point SV is repeated in the case where the process control apparatus according to the present invention is applied to the secondary delay and dead time characteristics to be controlled. FIG. 10 shows a case in which the process controlled variable PV is not disordered by noise, and FIG. 11 shows a case in which the process controlled variable PV is disordered by noise. As is shown from FIGS. 10 and 11, a target control specification (the area overshoot amount of 5 to 10% and the area damping ratio of 0 to 0.5) has been satisfied in a short time in three trials.

As described above, according to this embodiment, even if the process controlled variable is disordered by noise, correct automatic tuning can be achieved.

Figure 12:
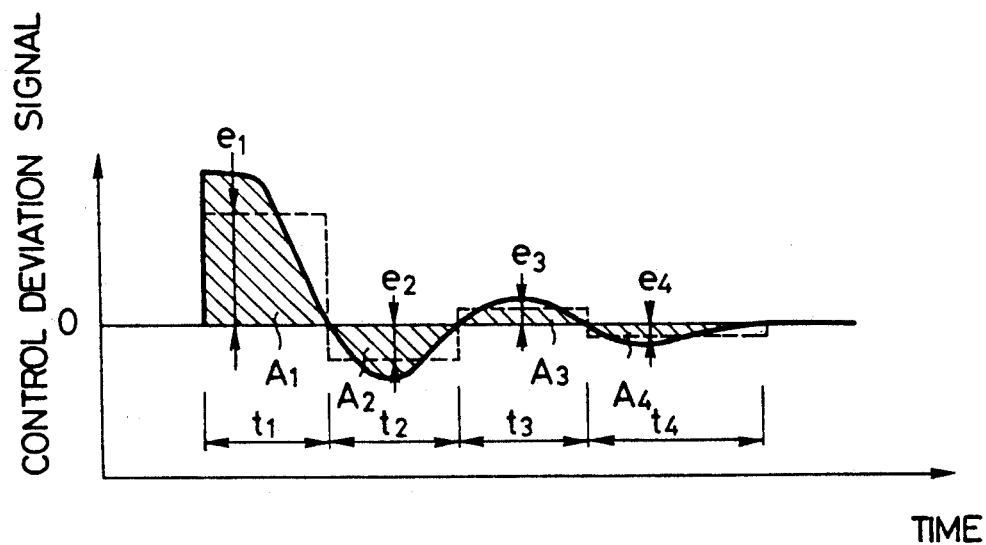
FIG. 12 illustrates the relationship between the control deviation at the step change of the set point and the average deviation.

The control response observation function (means) according to this embodiment, obtains the value of the area for every half cycle of the control deviation signal to be used as the evaluation index. As shown in FIG. 12, an arrangement may be employed so as to obtain a similar effect, the arrangement being constituted in such a manner that average deviations $e_1, e_2, \ldots$ for every half cycle obtained by dividing the area values $A_1, A_2, \ldots$ for every half cycle by each of the continuation times $\tau_1, \tau_2, \ldots$ are used and the overshoot amount E and the damping ratio D are obtained as the first and the second evaluation indexes.

$$E = \frac{e2}{e1}$$

$$D = \frac{e3}{e2}$$

According to the above-described embodiment, the total area ratio is used as the third evaluation index for evaluating the quick response characteristic of the control response. However, another arrangement may be employed in which time taken for the process controlled variable PV to reach a first threshold value (about 5% of the SV changeable range) and a second threshold value (about 60% of the same) with respect to, for example, the step change of the set point shown in FIG. 2 is detected as dead time L and the rise time T. Furthermore, the rise time ratio which is a ratio between a target rise time obtained by multiplying the dead time L by a predetermined value and the detected rise time T may be used. Alternatively, a setting time ratio which is the ratio between the previous value of the setting time $t_4$ of the control response and the present value of the same may be used.

According to the above-described embodiment, the area overshoot amount, the area damping ratio and the total area ratio are used as the evaluation indexes. However, either the area overshoot amount only or the area damping ratio only may be used. In this case, although the quick response characteristics deteriorate to a certain degree, the essence of the present invention can be maintained.

In the case where the value of the area is used as the second evaluation index for the control response observation evaluation function 4, the essence of the present invention can be maintained if it is arranged that $D=(A3+A4)/(A2+A3)$. In the case where the average deviation is used, the essence of the present invention can be maintained it is arranged that $D=(e_3+e_4)/(e_2+e_3)$. Furthermore, not only the form of the membership function, but also the number of it may be optionally determined when the same effect is desired.

According to the process control apparatus according to the present invention, since the operating parameters can be automatically tuned, the extent of the adjustment work performed by a worker can be significantly reduced. Furthermore, the individual difference in the results in the adjustment can be eliminated. Furthermore, since no identification signal is used, the operating parameters can be tuned as desired without disordering the process to be controlled. In addition, since dynamic characteristic changes which takes place in the process to be controlled can be quickly detected without necessitating human labor, the most suitable control characteristics can always be maintained. Furthermore, since the status of the control response can be evaluated based upon the area value of the control deviation, the tuning can be automatically conducted without an influence from noise.

Figure 13:
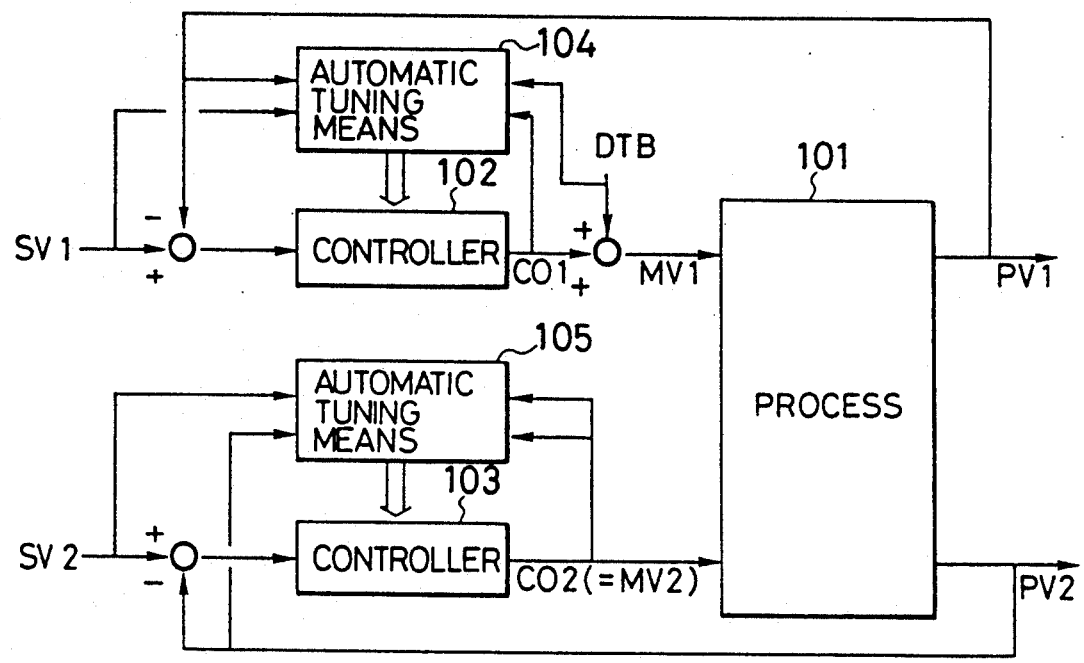
FIG. 13 illustrates a multi-variable process control apparatus according to the present invention.

Then, a second embodiment of the present invention will be described with reference to FIGS. 13 to 15. FIG. 13 illustrates a multi-variable process control apparatus comprising two control loops according to the present invention. The PID controller 2 PID-calculates the control deviation obtained by a comparison made between the set point SV1 and the process controlled variable of the process 1. Then, a known disturbance DTB, such as a load, is added to an output CO1 of the result of the PID calculation so that the manipulated variable MV1 then may be supplied to a process 101. The PID controller 103 PID-calculates the control deviation obtained by a comparison made between a set value SV 102 and a process 101 so that an output CO2 (a manipulated variable MV2) from the PID calculation is supplied to the process 1. The automatic tuning means 104 supplies the set point SV1, the process controlled variable PV1, the known disturbance DTB, and the output CO1 from the PID controller 102 and transmits the adjustment value of the operating parameters to the PID controller 102. The automatic tuning means 105 supplies the set point SV 102, the process controlled variable PV 102, the output CO 102 (in the case where there is no known disturbance, the output CL 102 is used so as to be supplied to the automatic turning means 105 as the known disturbance) from the PID controller 103, and it transmits the adjustment value of the operating parameters to a PID controller 103.

Figure 14:
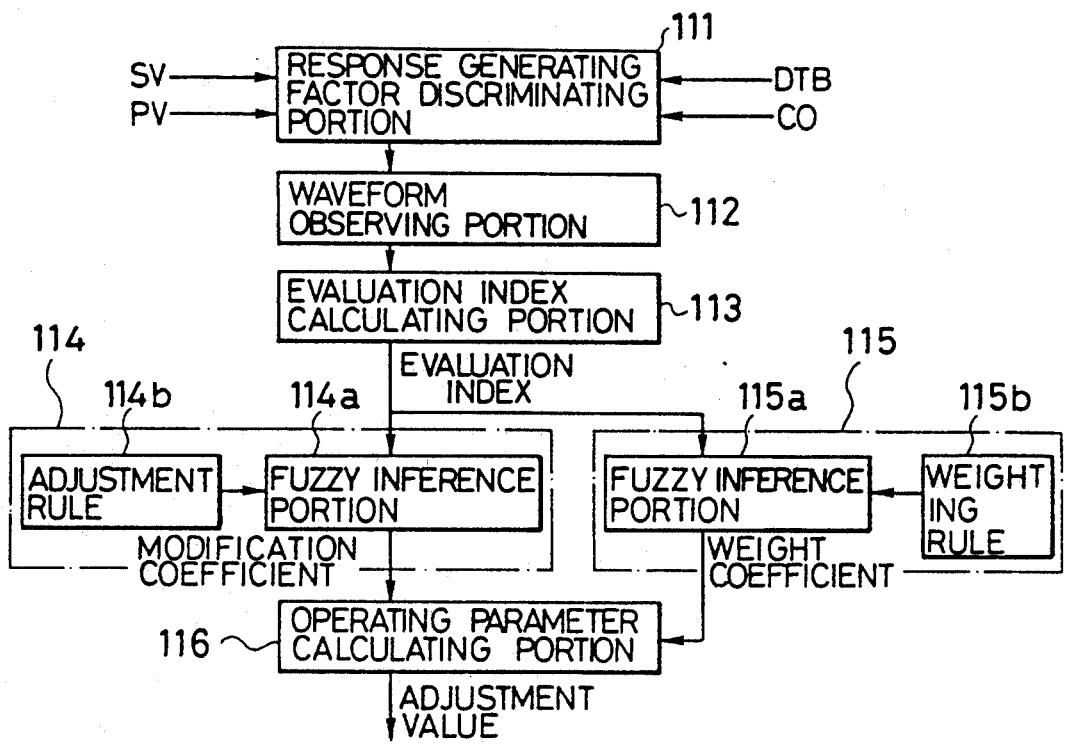
FIG. 14 illustrates the function and the structure of the automatic tuning means provided for the multi-variable process control apparatus according to the present invention.
Figure 15:
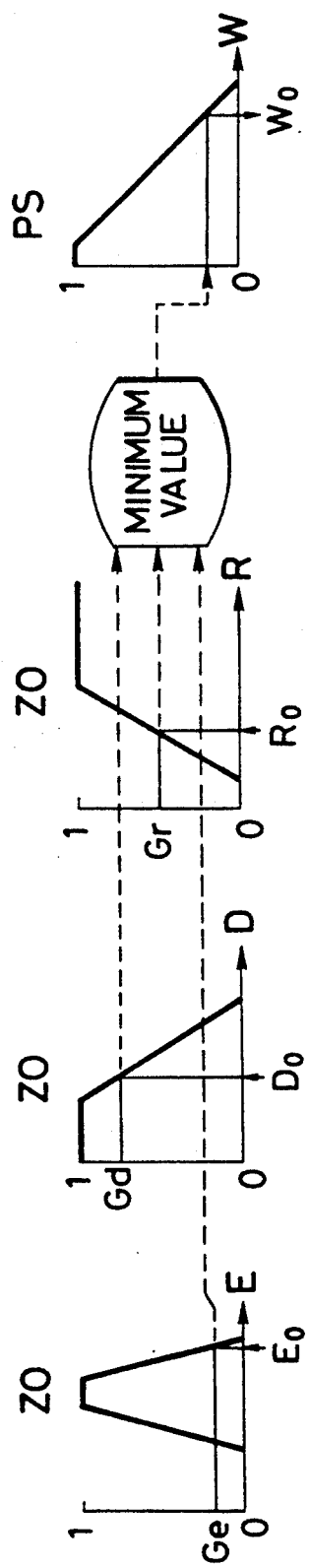
FIG. 15 illustrates the way to obtain the weight coefficient based upon the fuzzy inference.

FIG. 14 illustrates the functions and the structures of the automatic tuning means 104 and 105. The automatic tuning means 104 and 105 comprise: a response generating factor discriminating function 111, a waveform observation function 112, an evaluation index computing function 113, an operating parameter modification coefficient inference function 114, a control performance satisfaction degree evaluating function 115 and an operating parameter adjustment value computing function 116. The operating parameter modification coefficient inference function 114 comprises a fuzzy inference function 114a and an adjustment rule 114b. The control performance satisfaction degree evaluating function 115 comprises a fuzzy inference function 115a and a weighting rule.

Now, the above-described functions will be described. The response generating factor discriminating function 111 always supervises the set point SV, the process controlled variable PV, the known disturbance DTB and the output CO from the controller and stores the set point SV, the process controlled variable PV, the known disturbance DTB and the output CO as the values before the generation of the response (each initial value) when the process control value PV and the output CO from the controller have been set to each other. Then, whether or not the change width of each of the set point SV, the control deviation and the known disturbance DTB has exceeded a predetermined value is supervised in the above-described order so that the response generating factor is discriminated. The waveform observing function starts on the observation when the response generating factor has been defined. In the case where the response generating factor is the set point SV or the known disturbance (in the case where the control deviation exceeds a predetermined value), the control deviation which is the difference between the set point SV and the process controlled variable PV is observed in accordance with the waveform. The area value obtained by time-integrating the absolute values of the control deviation is successively obtained whenever the polarity of the control deviation changes, that is at every half cycle in only a period in which the homopolar control deviation continues. When the control deviations are then set to each other, the observation is completed. On the other hand, in the case where the control deviation is the known disturbance DTB, the sum of the deviations from each of the initial values of the output CO from the controller and the known disturbance DTB is observed in accordance with their waveforms so as to obtain the area value for every half cycle in a manner similar to that described above. When the sum of the deviations has been set, the observation is completed. The evaluation index computing function 13 obtains the area overshoot amount, the area damping ratio and the ratio between the previous total area and the present total area. Since each of the methods to obtain the above-described factors are the same as those according to the first embodiment shown in FIGS. 3 to 8, their descriptions are omitted here.

Then, the control performance satisfaction degree evaluating function 15 will be described. The weight coefficient W is obtained from the area overshoot amount E, the area damping ratio D and the area ratio R obtained by the evaluation index computing function 113 based upon the fuzzy inference function 115a in accordance with the weighting rule 115b. As shown in FIG. 15, in order to qualitatively evaluate the satisfaction degree of the target control specification of the area overshoot amount E, the area damping ratio D and the area ratio R, a membership function named ZO (satisfied) is defined. Furthermore, in order to qualitatively evaluate the weight coefficient, a membership function named PS (small) is defined, and as the weighting rule, the following rule is provided:

if (E is ZO and D is ZO and R is ZO) then W is PS

That is; if all of E, D and R are ZO, W is made PS. FIG. 10 illustrates a method of determining the weight coefficient according to the fuzzy inference. Each of the satisfaction degrees Ge, Gd and Gr of the evaluation indexes $E_0$, $D_0$ and $R_0$ obtained by the evaluation index computing function 13 is obtained from the membership function so that a weight coefficient Wo is obtained as a value weighted by the minimum value Ge of the above-described satisfaction degrees. Therefore, the weight coefficient becomes smaller in inverse proportion to the satisfaction degree of each of the evaluation index.

Similarly to the first embodiment, the operating parameter adjustment value computing function 116 adds the present operating parameters to the product modification coefficient and the weight coefficient obtained by the operating parameter modification coefficient inference function 114 and the operating parameters so that each adjustment value of the PID operating parameters is determined.

Figure 16B:
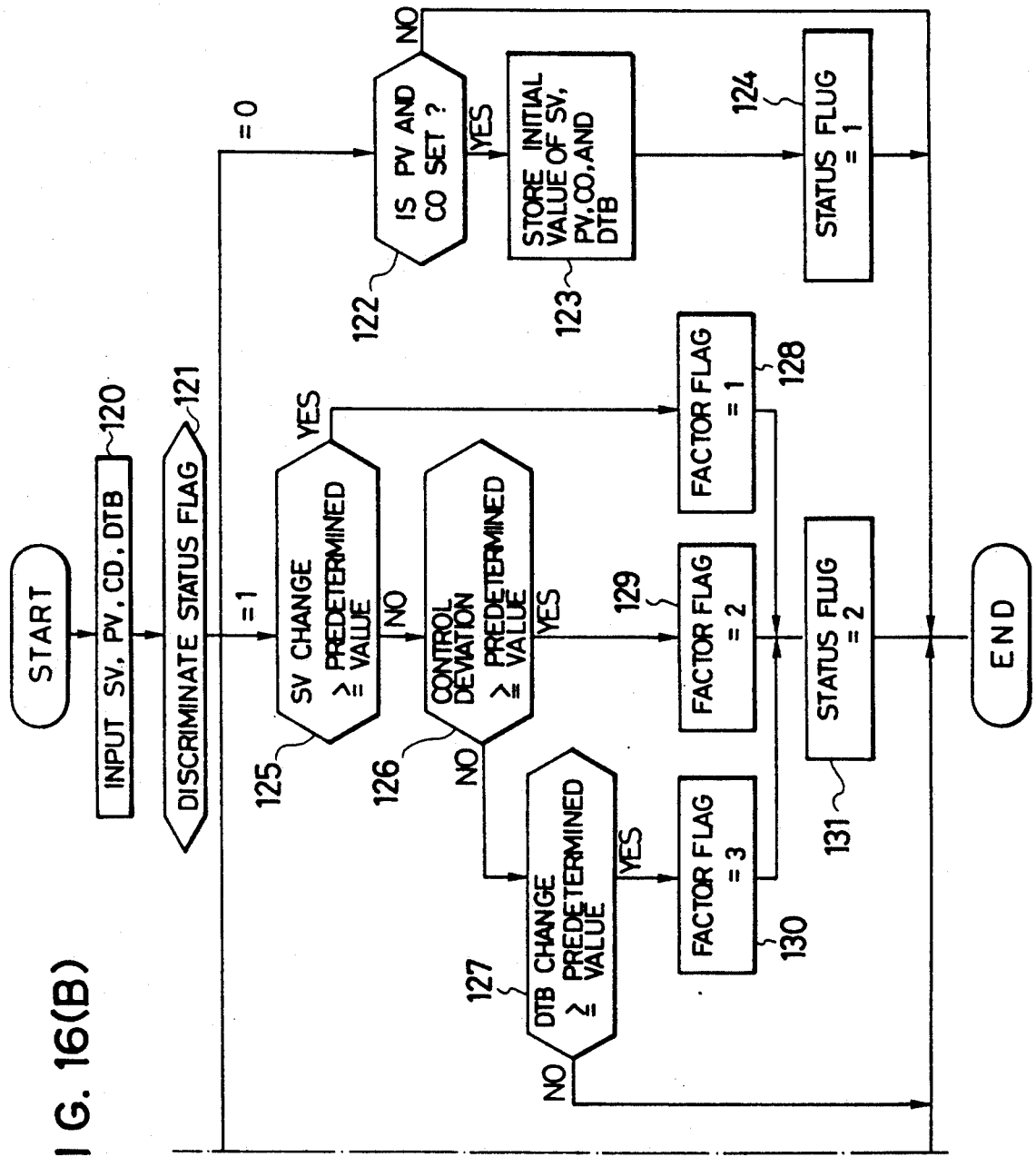

FIG. 16 is a schematic process flow chart which illustrates the automatic tuning means 104 and 106. First, the status flag and the factor flag are respectively initialized to 0 (omitted from illustration). In block 120, SV, PV, DTB and CO are supplied at a predetermined cycle. Then, the status flag representing the processing status performed by the automatic tuning means 104 is determined in block 21 whenever the above-described supplication is conducted. The state in which the status flag is 0 refers to the supervisory state before the setting of the control response. The state in which the status flag is 1 refers to the supervisory state before the response generating factor. The state in which the status flag is 2 refers to the observation evaluation state of the control response. The state in which the status flag is 3 refers to the control parameter computing state. When the status flag is 0, it is determined, in block 122, whether or not the PV and CO have been set to each other. When they have been set to each other, the initial value of each of SV, PV, DTB and CO is stored in blocks 23 and 24, and then the status flag is set to 1. When the status flag is 1, it is determined, in block 125, whether or not the change width of SV has exceeded a predetermined value. If it has exceeded the predetermined value, the factor flag is set to 1 and the status flag is set to 2 in blocks 128 and 131. If it has not exceeded the predetermined value, it is determined, in block 126, whether or not the control deviation has exceeded a predetermined value. If it has exceeded the predetermined value, the factor flag is set to 1 and the status flag is set to 2 in blocks 129 and 131. If it has not exceeded the predetermined value, it is determined, in block 127, whether or not the change width of DTB has exceeded a predetermined value. If it has exceeded the predetermined value, the factor flag is set to 1 and the status flag is set to 2 in blocks 130 and 131. It it has not exceeded the predetermined value, the processings are continued as it is. The above-described processing flow corresponds to the above-described response generating factor discriminating function 111. When the status flag has been changed to 2, the processings in block 133 are conducted when the factor flag is 1 or 2 in block 132. When the factor flag is 3, the processings in block 134 are conducted. In block 133, SV and PV are observed. If it has determined that the polarity of the control deviation is the same as that at the previous state, the time-integrating processing of the absolute value of the control deviation signal is continued. When the polarity at this state is different from the previous state, the previous time-integration result is stored as the area value so that the area value for every half cycle is obtained. This processing is continued until the PV is set to SV (observation completion) in block 135. In block 134, DTB and CO are observed so that the area value for every half cycle is obtained by processing the sum of the deviation of each of the initial value of DTB and CO in the manner similar to the above-made description. When the observation has been completed, the status flag is set to 3 in block 136. The above-described processing flow corresponds to the above-described waveform observation function 112. Then, if it has been determined in block 121 that the status flag is 3, an evaluation index (the area overshoot amount, the area damping ratio and area ratio) is obtained in block 137 by using the area value obtained in block 133 or 134. In block 138 (the above-described control performance satisfaction degree evaluation function 15), the weight coefficient is obtained. In block 139 (the operating parameter modification coefficient inference function 114), the modification coefficient of the operating parameters are obtained. In block 140 (the operating parameter adjustment value computing function 116), the adjustment value of the operating parameters is obtained. After the processings have been conducted successively, the status flag and the factor flag are reset to 0 in block 141. Then, the supervisory state of the control response before the setting is realized again. The obtained adjustment value of the operating parameters is used for the control operations performed by the above-described controllers 2 and 3.

The waveform observation function according to the second embodiment obtains the area value of the control deviation for every half cycle is obtained so as to use it as the evaluation index similarly to the control response observing function according to the first embodiment.

However, as described referring to FIG. 12 in the description of the first embodiment, a similar effect can be obtained from an arrangement constituted in such a manner that the average deviations $e_1, e_2, \ldots$ for every half cycle obtained by dividing the area values $A_1, A_2, \ldots$ for every half cycle by each of the continuation times $\tau_1, \tau_2, \ldots$ are used and the overshoot amount E and the damping ratio D are obtained as the first and the second evaluation indexes.

$$E = \frac{e_2}{e_1}$$

$$D = \frac{e_3}{e_2}$$

The area ratio is used as the third evaluation index for evaluating the quick-response of the control response according to the first and the second embodiments, for example, a setting time ratio between the previous value of the setting time $t_4$ of the control response and the present value of the same shown in FIG. 12 may be employed.

According to the above-described two embodiments, the area overshoot amount, the area damping ratio and the total area ratio are used as the evaluation indexes. However, either the area overshoot amount only or the area damping ratio only may be used as the evaluating index. In this case, although the quick response characteristics deteriorate to a certain degree, the essence of the present invention can be maintained.

In the case where the value of the area is used as the second evaluation index for the evaluation index computing function 13 similarly to the control response observation evaluation function according to the first embodiment, the essence of the present invention can be maintained if it is arranged that $D=(A_3+A_4)/(A_2+A_3)$ or $D=(A_3+A_5)/(A_2+A_4)$. In the case where the average deviation is used, the essence of the present invention can be maintained if it is arranged that $D=(e_3+e_4)/(e_2+e_3)$. According to the operating parameter modification coefficient inference function 114, the triangle membership function is employed. However, the present invention is not limited to this description. For example, a quadratic curve or an expotential curve may be employed, with the result that the essence of the present invention can be maintained. Furthermore, not only the form of the membership function, but also the number of it may be optionally determined when the same effect is desired.

According to this embodiment, since the operating parameters in a plurality of control loops can be automatically tuned in parallel, the extent of the adjustment work performed by a worker can be significantly reduced. Furthermore, since no identification signal is used, the operating parameters can be tuned as desired without disordering the process to be controlled. In addition, since dynamic characteristic changes which takes place in the process to be controlled can be quickly detected without necessitating human labor, the most suitable control characteristics can always be maintained. Furthermore, since the status of the control response can be evaluated based upon the area value (integral processing), the tuning can be automatically correctly conducted without an influence from noise.

Figure 17:
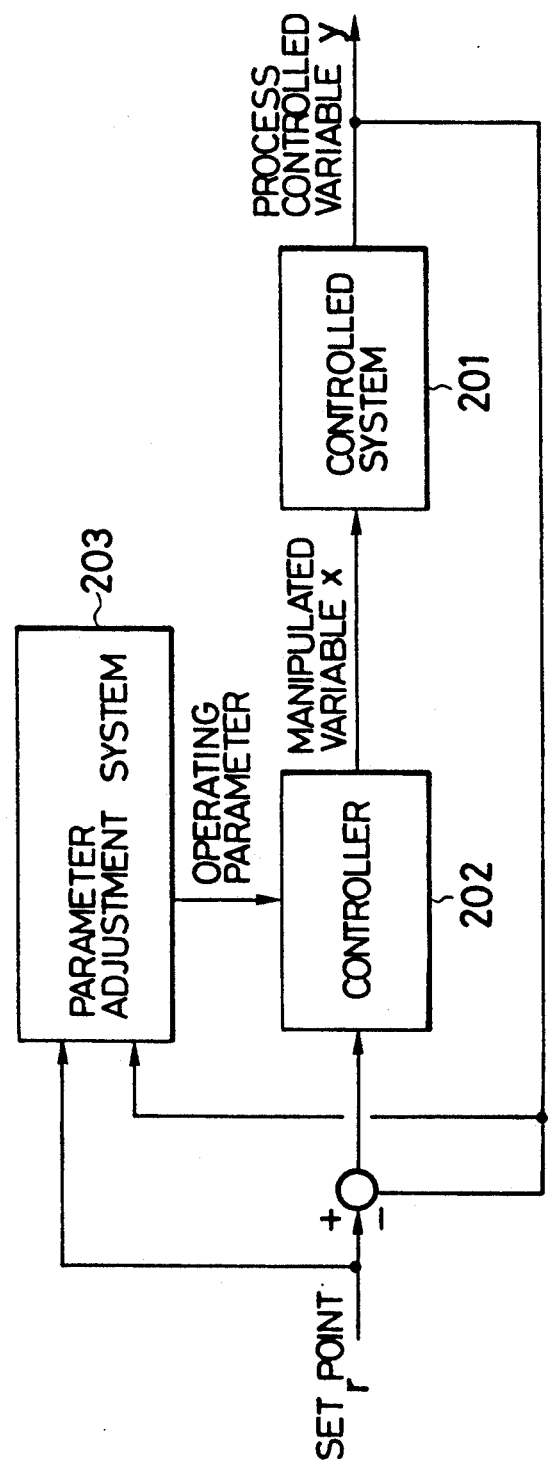
FIGS. 17, 18, 19 and 20 illustrate the characteristics of an embodiment of the present invention.

FIG. 17 illustrates a third embodiment of the present invention. According to the third embodiment, time taken for constituting the adjustment rule for constituting the operating parameters of the controller can be shortened. This embodiment comprises a controller 202 for controlling a process 201 and a parameter adjustment system 203 for adjusting the operating parameters of the controller 202.

Then, a case in which a PI (a proportional-integral) controller is used as the controller 202 will be described. The transfer function Gc(S) of the PI controller is given from the following equation:

$$Gc(S) = Kp\left(1 + \frac{1}{TiS}\right) \quad (1A)$$

where
Kp: proportional gain
Ti: integration time
S: Laplace operator.

Then, a case in which the transfer function $G_p(S)$ of the process 1 can be approximated by primary delay+dead time expressed by the following equation will be described:

$$Gp(S) = \frac{K}{1 + Ts} e^{-Ls} \quad (2A)$$

where
K: process . gain
T: time constant
L: dead time.

The parameter adjustment system 203 approximates a process control system formed by combining the controller 202 and the process 201 in a loop by a standard quadratic system model and measures the step response of the process control system. The parameter adjustment system 203 further infers the damping coefficient $\xi$ of the process control system and intrinsic angular frequency $\omega n$. It further adjusts the operating parameters of the controller 202 in such a manner that the above-described inferred damping coefficient $\xi$ of the process control system and intrinsic angular frequency $\omega n$ become satisfactory values. Then, the processing in this state will be described.

The transfer function $G_r(S)$ of the standard quadratic system model is expressed by the following equation:

$$Gr(S) = \frac{Kr\omega n^2}{S^2 + 2\zeta\omega nS + wn^2} \quad (3A)$$

where
Kr: constant
wn: intrinsic angular frequency
$\xi$: damping coefficient.

Figure 18:
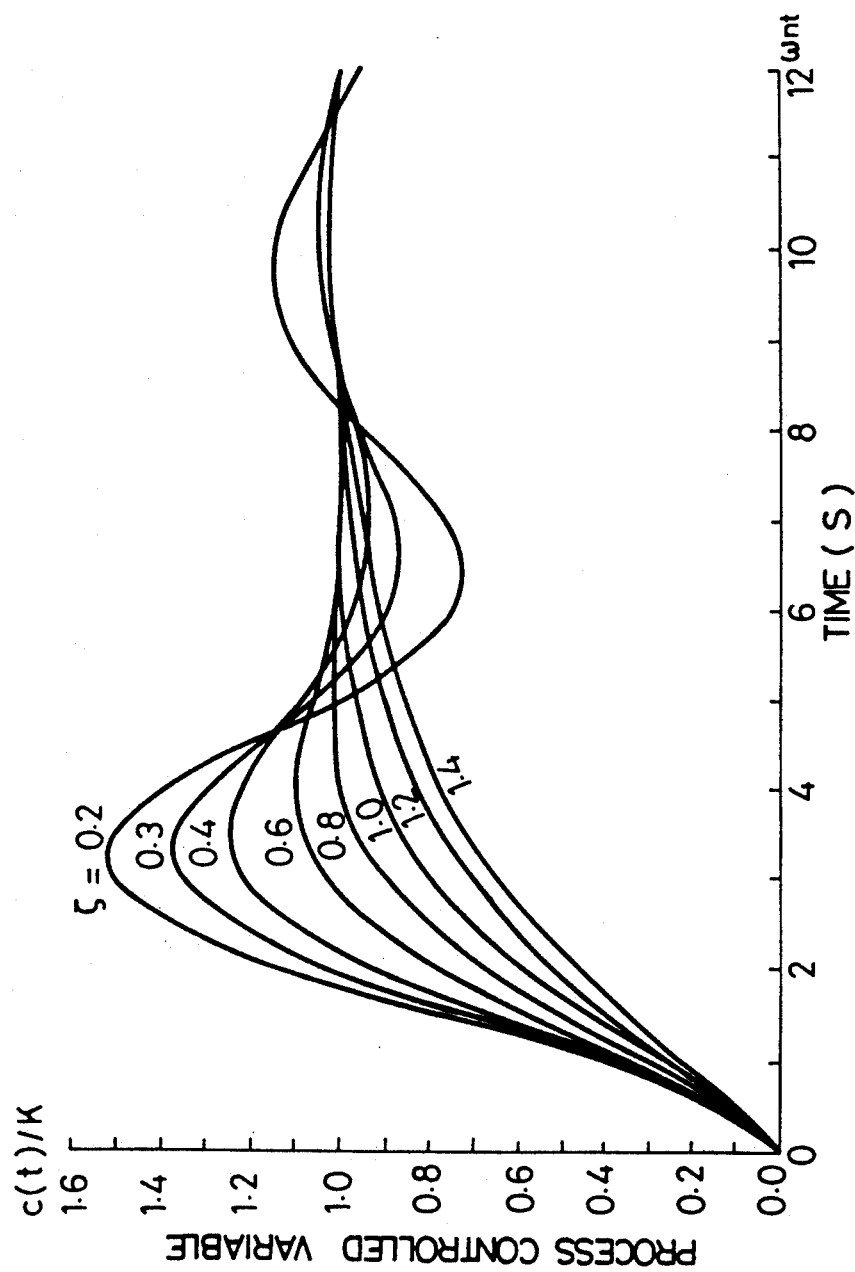

The step response of this model is expressed as shown in FIG. 18 and by the following equation:

(a) when $1 < \xi$ (aperiodic)

$$x(t) = Kr\left(1 - \frac{1}{T1 - T2}(T1e^{-\frac{t}{T1}} - T2e^{-\frac{t}{T2}})\right) \times u(t) \quad (4A)$$

$$\text{where } T1 = \frac{1}{\omega n(\zeta - \sqrt{\zeta^2 - 1})} \quad (5A)$$

$$T2 = \frac{1}{\omega n(\zeta + \sqrt{\zeta^2 - 1})} \quad (6A)$$

(b) when $0 < \xi < 1$ (periodic)

$$x(t) = Kr\left\{1 - \frac{e^{-\zeta\omega nt}}{\sqrt{1 - \zeta^2}} \cos\left(\sqrt{1 - \zeta^2}\omega nt - \tan^{-1}\frac{\zeta}{\sqrt{1 - \zeta^2}}\right)\right\}u(t) \quad (7A)$$

(c) when $\xi = 1$ (critical damping)

$$x(t) = Kr\{1 - (1 + \omega nt)e^{-\omega nt}\}u(t) \quad (8A)$$

The shape of the step response of a system involving a time delay can be described depending upon a variety of feature quantities.

Figure 19:
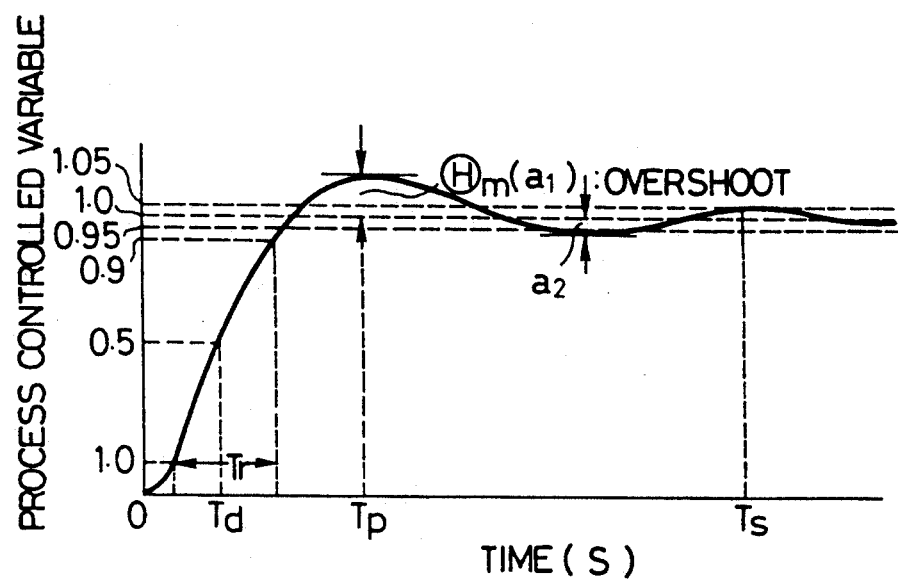
Figure 20:
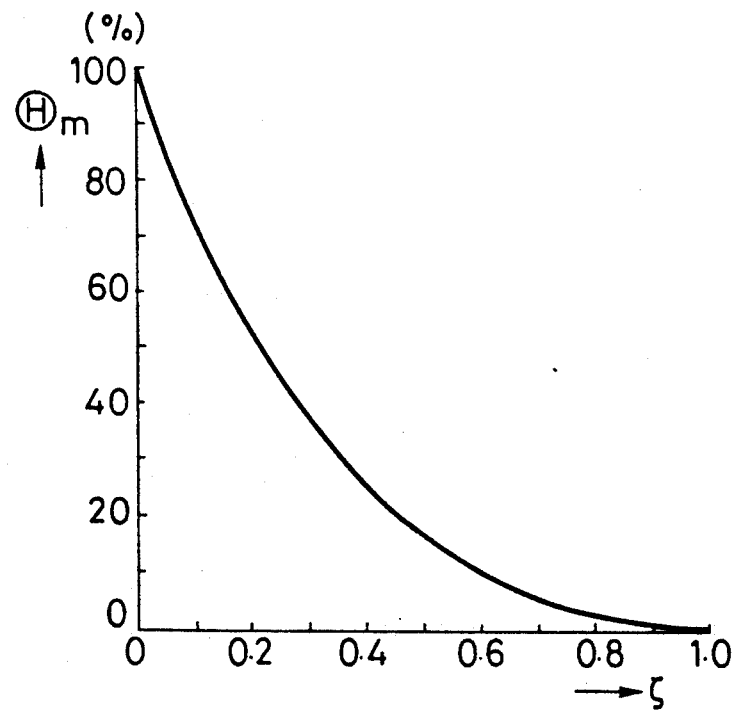

The feature quantity can be exemplified by the overshoot amount $O_m$, overshoot time $T_p$, the amplitude damping ratio $\epsilon 2/\epsilon 1$, rise time $T_r$, delay time $T_d$, setting time $T_s$ or the like whose definitions are shown in FIG. 19. In the case of the standard quadratic system model, the above-described feature quantity has a great correlation with the damping coefficient $\xi$ of the process control system and intrinsic angular frequency $\omega n$ as shown in FIG. 18. For example, the overshoot amount $\theta_m$ and the damping coefficient $\xi$ has the relationship as shown in FIG. 20 and Table 1.

TABLE 1

| No. | Damping Coefficient $\zeta$ | Overshoot Amount $\Theta m$ |
|---|---|---|
| 1 | 0.2 | 50% |
| 2 | 0.4 | 25% |
| 3 | 0.6 | 10% |
| 4 | 0.8 | 3% |

Then, the relationship among a portion of the above-described feature quantity, the damping coefficient $\xi$ and the intrinsic angular frequency $\omega n$ is expressed as follows:

$$\Theta_m = e^{-\frac{\pi\zeta}{\sqrt{1-\zeta^2}}} \quad (9A)$$

$$Tp = \frac{\pi}{\omega n\sqrt{1 - \zeta^2}} \quad (10A)$$

$$\frac{\epsilon 2}{\epsilon 1} = \quad (11A)$$

$$Ts = \frac{4}{\zeta \omega n} \quad (12A)$$

Then, the process of adjusting the operating parameters by a partial model-matching method in the case where a process shown in FIG. 21, that is, a system in which the process 1 which can be approximated by primary delay+dead time is controlled by the PI controller 2 is subjected to the above-described method will be described. The partial model-matching method is a method for adjusting the controller so as to make the characteristics of the control system partially coincide with a reference model. As the reference model, a standard quadratic system model is employed here. First, the transfer function of the process controlled variable y with respect to the set point r in the control system shown in FIG. 21 can be given by the following equation from Equations (1A) and (2A):

$$G(S) = \frac{Kp\left(1 + \frac{1}{TiS}\right)\frac{K}{1+Ts}e^{-LS}}{1 + Kp\left(1 + \frac{1}{TiS}\right)\frac{K}{1+Ts}e^{-LS}} \quad (13A)$$

$$= \frac{KpK(1+TiS)}{KpK(1+TiS) + TiS(1+Ts)e^{LS}}.$$

The Maclaurin's expansion expression can be shown by the following equation:

$$e^{LS} = 1 + \frac{LS}{1!} + \frac{(LS)^2}{2!} + \frac{(LS)^3}{3!} + \ldots \quad (14A)$$

Substitution of Equation (14A) into (13A) and arrangement give the following equation:

$$G(S) = \frac{KpK(1+TiS)}{KpK(1+TiS) + TiS(1+Ts)\left\{1 + \frac{LS}{1!} + \frac{(LS)^2}{2!} + \frac{(LS)^3}{3!} + \ldots\right\}}$$

$$= \frac{KpK(1+TiS)}{\left\{KpK + (KpKTi + Ti)S + (TiL + TiT)S^2 + \left(\frac{TiL^2}{2} + TiTL\right)S^3 + \left(\frac{TiL^3}{6} + \frac{TiTL^2}{2}\right)S^4 + \ldots\right\}} \quad (15A)$$

When it is arranged that $K_r = 1$ of Equation (3) for the purpose of arranging the steady gain to be 1 and the denominator of Equation (3) is divided by $\omega_n^2$, the following equation can be obtained:

$$G_r(S) = \frac{1}{1 + \frac{2\zeta}{\omega n}S + \frac{1}{\omega n^2}S^2} \quad (16A)$$

In order to apply the partial model-matching method, Equation (15A) must coincide with Equation (16). Therefore, the following equation must be held.

$$KpK + (KpKTi + Ti)S + (TiL + TiT)S^2 + \quad (17A)$$

$$\left(\frac{TiL^2}{2} + TiTL\right)S^3 + \left(\frac{TiL^3}{6} + \frac{TiTL^2}{2}\right)S^4 + \ldots =$$

$$KpK(1+TiS)\left(1 + \frac{2\zeta}{\omega n}S + \frac{1}{\omega n^2}S^2\right) =$$

$$KpK + \left(KpK\frac{2\zeta}{\omega n} + KpKTi\right)S +$$

$$\left(KpK\frac{1}{\omega n^2} + KpKTi\frac{2\zeta}{\omega n}\right)S^2 + KpKTi\frac{1}{\omega n^2}S^3$$

Referring to Equation (17A), in order to make cubic or lower coefficients of the two sides coincide to correspond to the number of the undetermined parameters $K_p$, $T_i$, $\xi$ and $\omega_n$, the following equation must be held:

$$KpKTi + Ti = KpK\frac{2\zeta}{\omega n} + KpKTi \quad (18A)$$

$$TiL + TiT = KpK\frac{1}{\omega n^2} + KpKTi\frac{2\zeta}{\omega n} \quad (19A)$$

$$\frac{TiTL^2}{2} + TiTL = KpKTi\frac{1}{\omega n^2} \quad (20A)$$

In this case, since the number of the parameters is larger than the number of the equations, a satisfactory value must be given to a parameter, for example, the damping coefficient $\xi$.

Arrangements of Equations (18A) to (20A) give the following equations:

$$Kp = \frac{Ti}{K\frac{2\zeta}{\omega n}} \quad (21A)$$

$$Ti = L + T - \frac{1}{2\zeta \omega n} \quad (22A)$$

$$\left(\frac{L^2}{2} + TL\right)(2\zeta \omega n)^2 - (L + T)(2\zeta \omega n) + 1 = 0 \quad (23A)$$

The proportional gain $K_p$ and the integration time $T_i$ can be obtained from Equations (21A) to (23A). That is, in the case where the parameters K, T and L of the process 1 have been acknowledged previously, $(2\xi \omega_n)$ is obtained in accordance with Equation (23A), the intrinsic angular frequency $\omega_n$ is obtained from the satisfactory value of the damping coefficient $\xi$ and Kp and Ti are obtained from the thus obtained $\xi$ and $\omega_n$ in accordance with Equations (21A) and (22A).

Thus, the adjustment equations (21A) to (23A) of the PI controller are deduced in accordance with the partial model-matching method in the case where the parameters K, T and L of the process 1 have previously been acknowledged. Equations (21A) to (23A) show the correspondence between the damping coefficient $\xi$ and the intrinsic angular frequency $\omega_n$ in the case where the approximation is made with the operating parameters $K_p$ and $T_i$ and the standard quadratic system model. As described above, equations (9A) and (10A) show the correspondence among the feature quantity, the damping coefficient $\zeta$ and the intrinsic angular frequency $\omega_n$ of the step response of the standard quadratic system model such as the overshoot amount $O_m$, the overshoot time $T_p$. Therefore, in the case where the operating parameters Kp and Ti have previously acknowledged though the parameters K, T and L of the process 201 have not been acknowledged, it might be considered feasible to employ a method arranged in such a manner that the feature quantity is obtained from the step response of the control system and the operating parameters are modified so as to obtain a satisfactory control response. Then, the method of modifying the operating parameters established basing upon the above-described idea will be described.

First, the process of the control parameter modifying method will be described.

(1) The step response of the control system is measured.
(2) The feature quantity of the step response is extracted.
(3) The damping coefficient $\zeta$ and the intrinsic angular frequency $\omega_n$ are inferred from the feature quantity of the step response.
(4) A satisfactory value of the feature quantity of the step response is determined.
(5) The damping coefficient $\zeta'$ and the intrinsic angular frequency $\omega_n'$ with respect to the satisfactory value of the feature quantity are obtained.
(6) Operating parameters $K_p'$ and $T_i'$ after the modification are obtained from the present operating parameters $K_p$ and $T_i$, the damping coefficients $\zeta$ and $\zeta'$ and the intrinsic angular frequencies $\omega_n$ and $\omega_n'$.
(7) The step response of the control system is measured.
(8) The feature quantity of the step response is extracted.
(9) If the extracted feature quantity is a value which is near the satisfactory value, the modification process is terminated. If it is a value of a degree away from the satisfactory value, the flow returns to (3).

Figure 22:
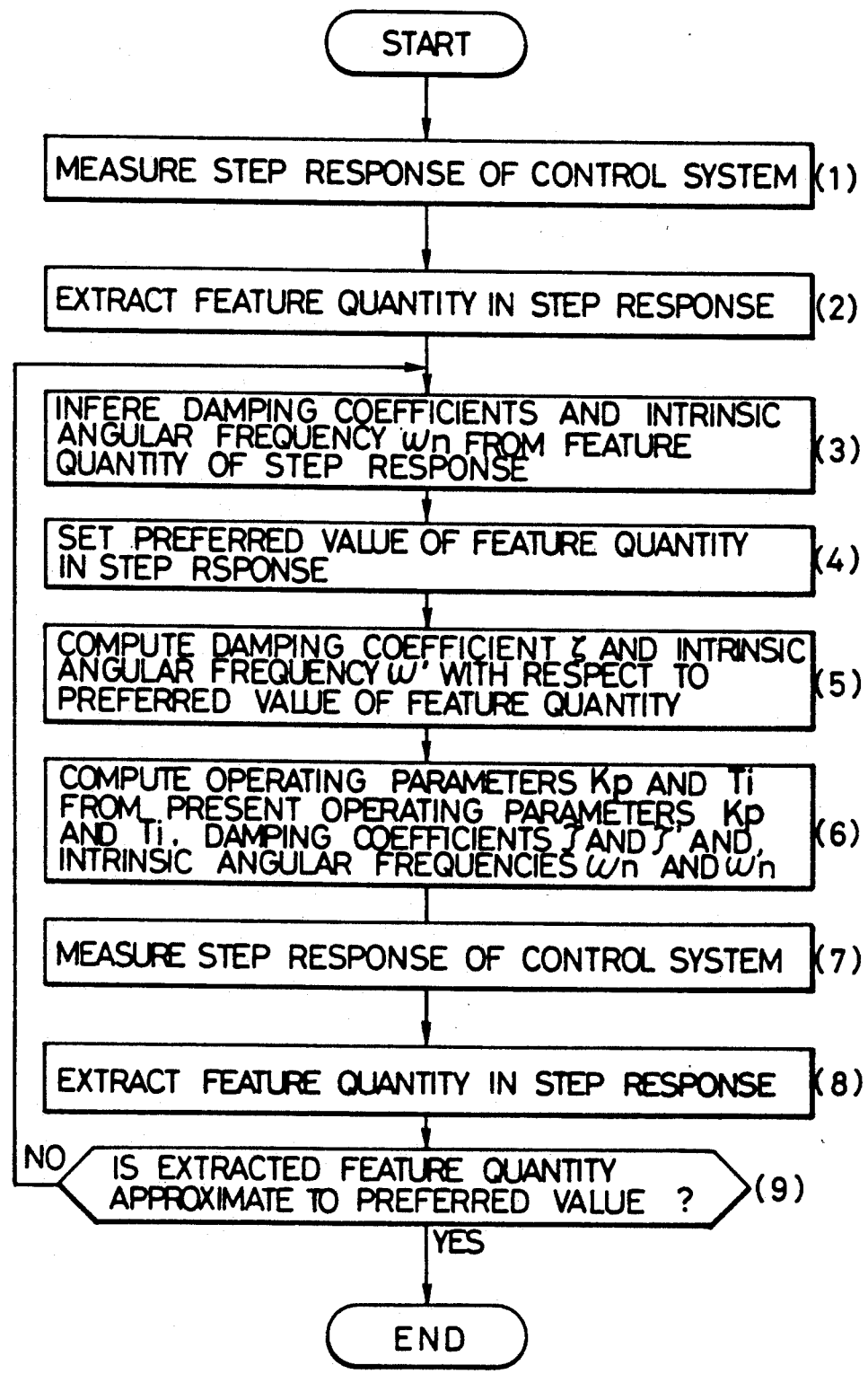

The above-described processing procedure can be expressed by the flow chart as shown in FIG. 22.

In order to confirm the validity of the designed operating parameter modification method, a simulation was performed, resulting as follows:

In the case where the overshoot amount Om and the overshoot time $T_p$ are used as the feature quantity of the step response will be described. First, a simulation provided that overshoot takes place was performed. Then, the method will be described.

(1) In accordance with the following equation, that is, an adjustment method in accordance with a CHR method ("The Basic Theory of Automatic Control", written by Masubuchi, published by Corna in June, 1977) under condition that there is 20%-overshoot in the response with respect to the set point, the operating parameters $K_p$ and $T_i$ are obtained from the values of the parameters K, T and L of the process to be controlled so as to make them the reference values:

$$Kp = \frac{0.6T}{KL} \tag{24A}$$

$$Ti = T \tag{25A}$$

(2) The step response when the operating parameters $K_p$ and $T_i$ of the reference values is obtained, and the overshoot amount $\hat{\theta}_m$ and the overshoot time $T_p$ are extracted.

(3) The damping coefficient $\hat{\zeta}$ and the intrinsic angular frequency $\hat{\omega}_n$ corresponding to the operating parameters $K_p$ and $T_i$ of the reference values are inferred from the extracted overshoot amount $\hat{\theta}_m$ and the overshoot time $\hat{T}_p$ in accordance with the following equation from Equations (9A) and (10A):

$$\zeta = \frac{1}{\sqrt{1 + \left(\frac{\pi}{\ln\hat{\theta}_m}\right)^2}} \tag{26A}$$

$$\omega n = \frac{\pi}{\hat{T}_p \sqrt{1-\zeta^2}} \tag{27A}$$

(4) The damping coefficient $\hat{\zeta}$ and the intrinsic angular frequency $\hat{\omega}_n$ are changed centering the damping coefficient $\zeta$ and the intrinsic angular frequency $\omega_n$ corresponding to the operating parameters $K_p$ and $T_i$ of the reference values. The operating parameters $K_p'$ and $T_i'$ are obtained from the damping coefficient $\zeta'$ and intrinsic angular frequency $\omega_n'$ at that time in accordance with Equations (21A) and (22A) by using the following equations:

$$Ti' = Ti + \Delta Ti \tag{28A}$$

$$\Delta Ti = -\frac{1}{2}\left(\frac{1}{\zeta'\omega n'} - \frac{1}{\hat{\zeta}\omega\hat{n}}\right) \tag{29A}$$

$$Kp' = Kp \frac{\left(1 + \frac{\Delta Ti}{Ti}\right)\left(1 + \frac{\Delta \omega n}{\hat{\omega}n}\right)}{1 + \frac{\Delta \zeta}{\zeta}} \tag{30A}$$

$$\Delta \omega n = \omega n' - \hat{\omega} n \tag{31A}$$

$$\Delta \zeta = \zeta' - \hat{\zeta} \tag{32A}$$

(5) The overshoot amount $\theta_m'$ and the overshoot time $T_p'$ of the control system when the operating parameters $K_p'$ and $T_i'$ are used are predicted from the damping coefficient $\zeta'$ and the intrinsic angular frequency $\omega_n'$ from Equations (9A) and (10A) in accordance with the following equations:

$$\hat{\theta}m' = e^{-\frac{\pi-\zeta'}{\sqrt{1-(\zeta')^2}}} \tag{33A}$$

$$Tp' = \frac{\pi}{\omega n' \sqrt{1-(\zeta')^2}} \tag{34A}$$

where $\theta_m'$, $T_p'$: the predicted values of $\theta_m'$ and $T_p'$ (6) The step response of the control system is obtained by using the operating parameters $K_p'$ and $T_i'$, and the overshoot amount $\theta_m'$ and the overshoot amount $T_p'$ are measured at that time.

(7) The predicted value and the measured values of the overshoot amount $\theta_m$ and the overshoot time $T_p$ are subjected to a comparison.

Figure 23:
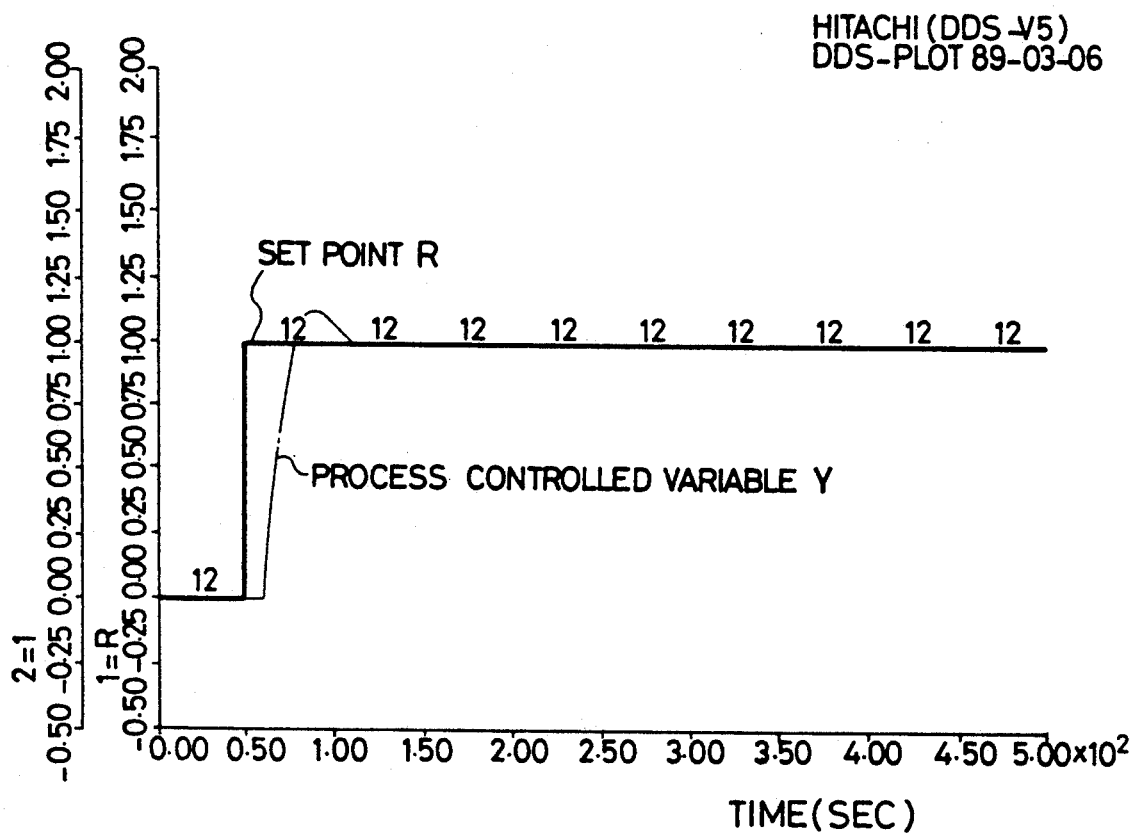
FIGS. 23, 24, 25 and 26 illustrate the charactertistics of another embodiment of the present invention.
Figure 24:
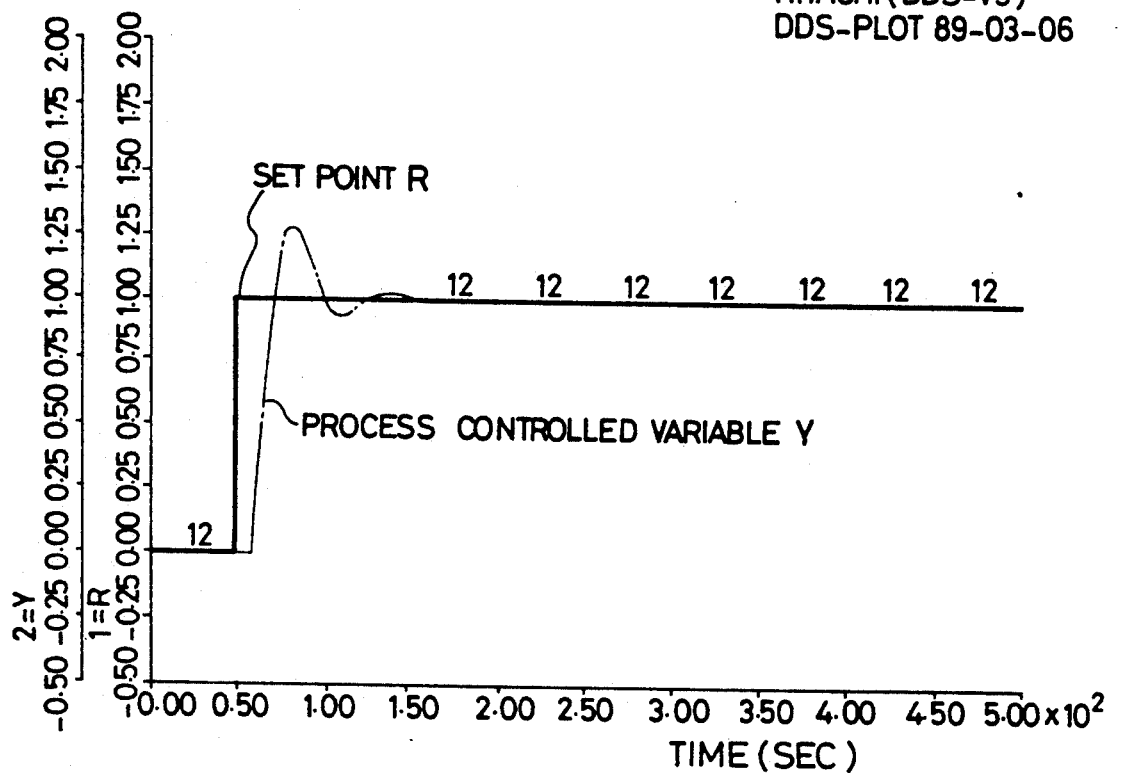

The results of the simulation performed in accordance with the above-described method are shown in Tables 2 and 3. Examples of the step response obtained from the above-described simulation are shown in FIGS. 23 and 24.

The following values were used as the parameters K, T and L for the process to be controlled.

$$K = 1 \quad (35A)$$

$$T = 100S$$

$$L = 10S, \text{ where } L/T = n = 0.1$$

As is shown from Tables 2 and 3, a certain error is involved between the predicted value and the measured result of the overshoot amount $O_m$ and the overshoot time $T_p$.

TABLE 2

| $\zeta$ | Set point r + Overshoot amount $\Theta m$ | | | Overshoot time Tp | | |
|---|---|---|---|---|---|---|
| | Predicted Value | Measured Value | Error | Predicted Value | Measured Value | Error |
| 0.27757 (50%) | 1.40346 | 1.60756 | −12.70% | 33.765 S | 29 S | 16.43% |
| 0.41635 (75%) | 1.23725 | 1.28430 | −3.66% | 35.678 S | 33 S | 8.12% |
| 0.55514 (100%) | — | 1.12285 | — | — | 39 S | — |
| 0.69392 (125%) | 1.04843 | 1.03155 | 1.64% | 45.051 S | 49 S | −8.06% |
| 0.83271 (150%) | 1.00887 | | — | 58.584 S | | — |

TABLE 3

| $\omega_n$ | Set point r + Overshoot amount $\Theta m$ | | | Overshoot time Tp | | |
|---|---|---|---|---|---|---|
| | Predicted Value | Measured Value | Error | Predicted Value | Measured Value | Error |
| 0.07264 (75%) | 1.12285 | 1.01426 | 10.71% | 52.000 S | 61 S | −14.75% |
| 0.08716 (90%) | 1.12285 | 1.06709 | 5.23% | 43.333 S | 44 S | −1.52% |
| 0.09685 (100%) | — | 1.12285 | — | — | 39 S | — |
| 0.10653 (110%) | 1.12285 | 1.17472 | −4.42% | 35.455 S | 36 S | −1.51% |
| 0.12106 (125%) | 1.12285 | 1.26584 | −11.30% | 31.200 S | 34 S | −8.24% |

However, even if the damping coefficient $\zeta$ or the intrinsic angular frequency wn is changed by ±25%, the error can be controlled within ±16%. Therefore, no practical problem takes place. That is, the above-described error arises since the response of the control system shown in FIG. 21 is approximated by the standard quadratic system model, and the rate of change of the damping coefficient $\zeta$ and that of the intrinsic angular frequency $\omega_n$ is proportional to the magnitude of the error. Therefore, since the response can be adjusted to the target control response by adjusting the change rate of $\zeta$ and $\omega_n$ in consideration of the error, no problem takes place.

Although, it is predicted from Equation (9A) that the overshoot amount $\theta_m$ could not be changed when the intrinsic angular frequency $\omega_n$ has been changed, the overshoot amount $\theta_m$ has been changed in actual practice. The reason for this lies in the fact that the response of the control system is approximated by the standard quadratic system model. Therefore, no problem takes place by means of properly adjusting the change in $\omega_n$ in consideration with the approximate error.

Thus, the validity of the operating parameter modifying method designed to be used in the case where there is an overshoot has been confirmed. Now, the processing to be performed in the case where no overshoot exists will be described.

The case where there is no overshoot will be described with reference to a case in which the operating parameters $K_p$ and $T_i$ are obtained in accordance with the following equation, that is, an adjustment method in accordance with a CHR method ("The Basic Theory of Automatic Control", written by Masubuchi, published by Corna in June, 1977) under condition that there is not overshoot in the response with respect to the set point, and the step response at this time is used:

$$Kp = \frac{0.35T}{KL} \quad (36A)$$

$$Ti = 1.2T \quad (37A)$$

Figure 21:
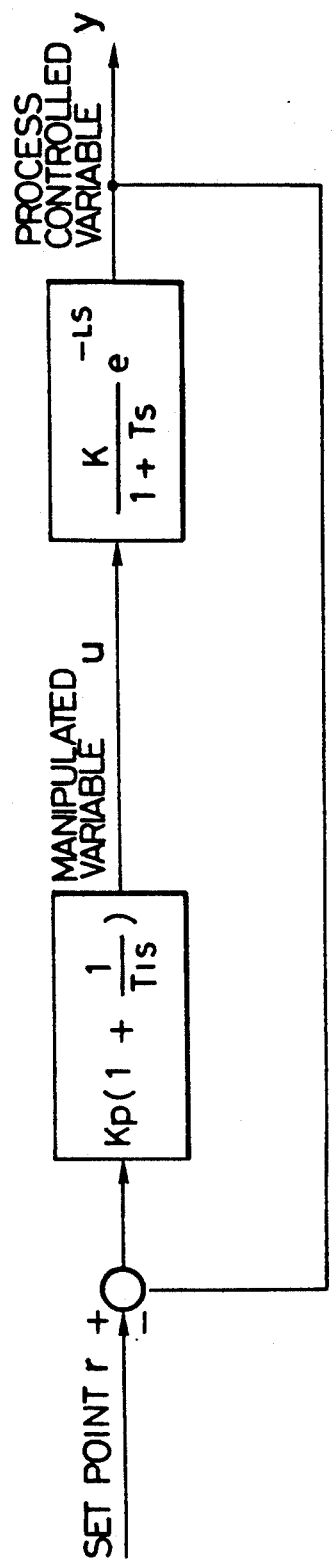
FIGS. 21 and 22 illustrate the system and characteristics of the embodiment of the present invention.
Figure 25:
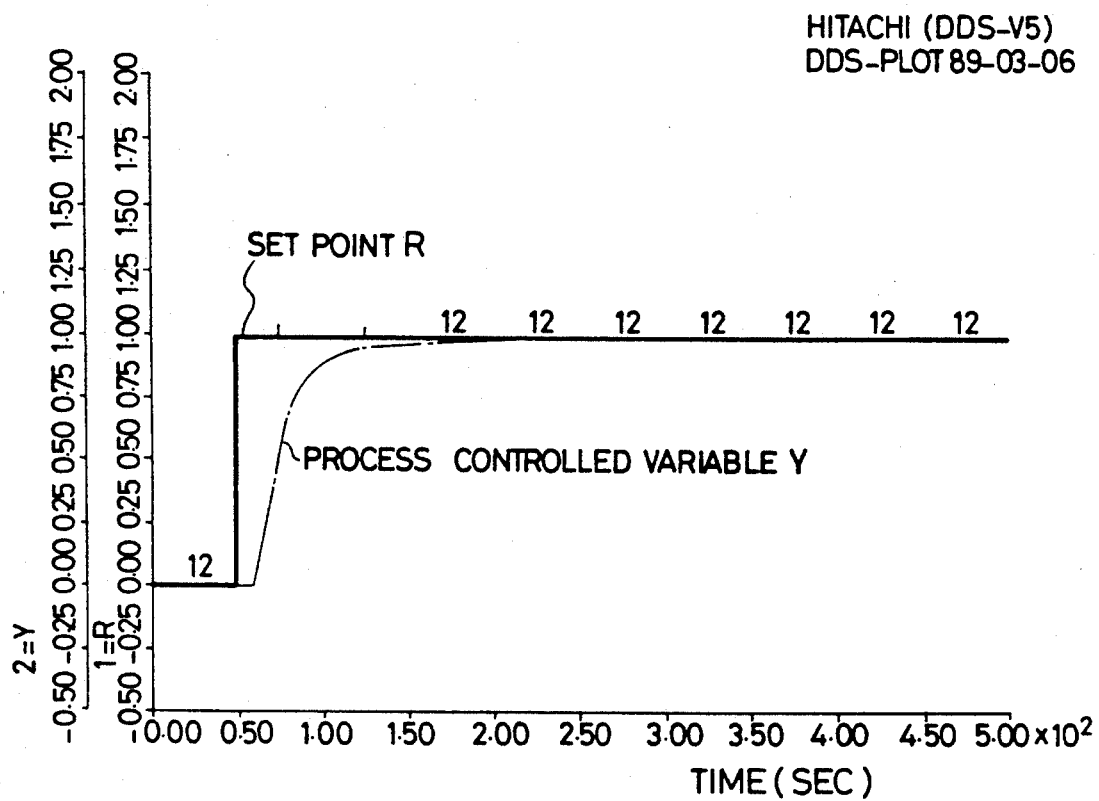

In the case where the parameters K, T and L of the process to be controlled are given by Equation (35), the operating parameters $K_p$ and $T_i$ were obtained from Equations (36A) and (37A) and the step response of the control system shown in FIG. 21 was obtained. As shown in FIG. 25, the response in this case involves no overshoot. In this case, it is preferable that the overshoot is generated in accordance with a simple modification algorithm. Then, only $K_p$ of the operating parameters $K_p$ and $T_i$ is modified in accordance with the following equation so as to generate the overshoot. Then, the modification method arranged to be used in the case where there is an overshoot is used.

$$Kp' = \frac{Ti}{K \frac{2\zeta'}{\omega n'}} = mKp \quad (38A)$$

From Equations (38A) and (21A), the relationship expressed by the following equation can be obtained:

$$\frac{\zeta'}{\omega n'} = \frac{1}{m} \frac{\zeta}{\omega n} \quad (39A)$$

Furthermore, the condition that $T_i$ is not changed, the following equation can be deduced from Equation (29A):

$$\zeta'\omega_n' = \zeta\omega_n \quad (40A)$$

From Equations (39) and (40), the following equations can be deduced:

$$z' = \frac{1}{\sqrt{m}} \zeta \quad (41A)$$

$$\omega n' = \sqrt{m} \, \omega n \quad (42A)$$

Figure 26:
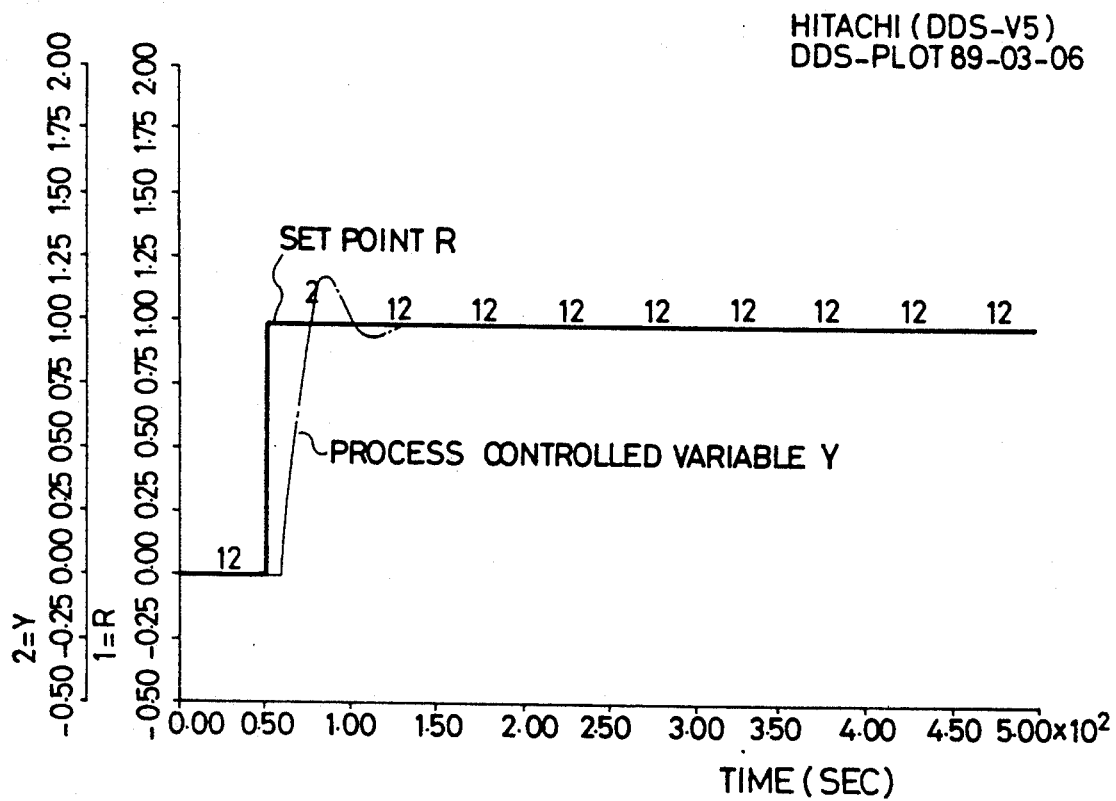

In the case where there is no overshoot, the intrinsic angular frequency $\omega_n$ before the modification must be inferred from the following equation:

$$\tau = \frac{2\zeta}{\omega n} \quad (43A)$$

where $\tau$: time taken for the step response to rise up to 62%, that is time constant expressed by Equation (43A) is obtained from an approximate expression obtained by omitting the quadratic term in the denominator of Equation (16A). According to this equation, in the case where the damping coefficient is 0.6 or more, the error does not reach a considerable degree. In accordance with Equation (38A), the proportional gain $K_p$ was obtained letting $m=2$. Then, the step response when the thus obtained value was used was obtained. The results are shown in FIG. 26. The predicted value of the overshoot amount $O_m$ and that of the overshoot time $T_p$ of the step response shown in FIG. 26 were obtained assuming that the damping coefficient of the step response shown in FIG. 25 is 1. Table 4 shows the comparison between the predicted values and the measured results. As shown from Table 4, there is a certain magnitude error between the predicted values and the measured results. However, $K_p$ can be modified in accordance with Equation (38A) and a response having a desired overshoot amount can be obtained from the case where there is no overshoot.

According to the above-described embodiment of the present invention, Equations (30A) to (32A) are used as the modifying equations for the proportional gain $K_p$. In the case where the parameter K of the process 1 which can relatively simply be identified can be acknowledged, the following equation can be used as is shown from Equation (21):

$$K_p = \frac{T_i'\omega n'}{2K\zeta'} \quad (44A)$$

The results of a simulation performed by using Equation (44A) are shown in Table 5. In a comparison made between Tables 2 and 5, the predicted error of the overshoot amount $O_m$ and that of the overshoot time $T_O$ become larger by a certain degree.

TABLE 4

| $\frac{\zeta}{\omega_n}$ | Set point r + Overshoot amount $\Theta m$ | | | Overshoot time Tp | | |
|---|---|---|---|---|---|---|
| | Predicted Value | Measured Value | Error | Predicted Value | Measured Value | Error |
| 0.70711 (70.7%) | 1.04321 | 1.18308 | −11.82% | 47.124 S | 35 S | 34.64% |
| 0.09428 (141.4%) | — | | | | | |

TABLE 5

| $\zeta$ | Set point r + Overshoot amount $\Theta m$ | | | Overshoot time Tp | | |
|---|---|---|---|---|---|---|
| | Predicted Value | Measured Value | Error | Predicted Value | Measured Value | Error |
| 027757 (50%) | 1.40346 | — | — | 33.765 S | — | — |
| 0.41635 (75%) | 1.23725 | 1.63561 | −24.36% | 35.678 S | 29 S | 23.03% |
| 0.55514 (100%) | — | 1.12285 | — | — | 39 S | — |
| 0.69392 (125%) | 1.04843 | 1.21544 | −13.74% | 45.051 S | 35 S | 28.72% |
| 0.83271 (150%) | 1.00887 | 1.11304 | −9.36% | 58.584 S | 49 S | 19.56% |

However, it exhibits a great utility.

According to the above-described embodiment, the feature quantity is extracted from the step response of the control system, and the operating parameters $K_p$ and $T_i$ are modified based upon the thus extracted feature quantity. However, the parameters K, T and L of the process 1 can be estimated in accordance with the above-described feature quantity. That is, the intrinsic angular frequency $\omega_n$ is estimated from the feature quantity in accordance with Equations (26A) and (27A), and then the parameters K, T and L of the process 1 can be estimated from the above-described estimated values and the operating parameters $K_p$ and $T_i$ in accordance with Equations (21A) and (22A). However, it is necessary for either parameter of T and L, for example, it is necessary for the dead time L to be independently obtained from the step response of the control system. Thereupon, in the cases shown in Tables 2 and 3, the estimated damping coefficient $\zeta$, the intrinsic angular frequency $\omega_n$ and the operating parameters $K_p$ and $T_i$ were substituted into Equations (21A) and (22A), so that the K, T and L of the process to be controlled were estimated. The results are shown in Tables 6 and 7. The dead time L was estimated from the step response. As is shown from the tables, it has been confirmed that K, T and L can be estimated from Equations (21A) and (22A) though there is a certain degree of error. However, the process gain K can also be obtained from the steady gain of the step response of the control system.

TABLE 6

| $\zeta$ | K | | | T | | | L | | |
|---|---|---|---|---|---|---|---|---|---|
| | True value | Estimated value | Error | True value | Estimated value | Error | True value | Estimated value | Error |
| 0.27757 (50%) | 1 | 2.9173 | 191.7% | 100 S | 109.80 S | 9.80% | 10 S | 10 S | 0% |
| 0.41635 (75%) | 1 | 1.7244 | 72.4% | 100 S | 100.02 S | 0.02% | 10 S | 10 S | 0% |
| 0.55514 (100%) | 1 | 1.4538 | 45.4% | 100 S | 99.30 S | −0.70% | 10 S | 10 S | 0% |
| 0.69392 (125%) | 1 | 1.3418 | 34.2% | 100 S | 98.95 S | −1.05% | 10 S | 10 S | 0% |
| 0.83271 (150%) | 1 | — | — | 100 S | — | — | 10 S | — | — |

TABLE 7

| $\omega_n$ | K | | | T | | | L | | |
|---|---|---|---|---|---|---|---|---|---|
| | True value | Estimated value | Error | True value | Estimated value | Error | True value | Estimated value | Error |
| 0.07264 (75%) | 1 | 1.1972 | 19.7% | 100 S | 94.08 S | −5.93% | 10 S | 10 S | 0% |
| 0.08716 (90%) | 1 | 1.3373 | 33.7% | 100 S | 97.11 S | −2.89% | 10 S | 10 S | 0% |
| 0.09685 (100%) | 1 | 1.4538 | 45.4% | 100 S | 99.30 S | −0.70% | 10 S | 10 S | 0% |
| 0.10658 (110%) | 1 | 1.5576 | 55.8% | 100 S | 101.16 S | 1.16% | 10 S | 10 S | 0% |
| 0.12106 (125%) | 1 | 1.7205 | 72.1% | 100 S | 104.69 S | 4.69% | 10 S | 10 S | 0% |

Although the PI controller is used as the controller according to this embodiment, the present invention can be applied to the adjustment of a variety of controllers such as a PID controller (a proportional-integration-derivative) controller, an I-PD (integration-proportional-derivative) controller, an I-P (integration-proportional) controller and the like.

Although the quadratic standard model is used as the standard model according to this embodiment of the present invention, the present invention can be applied to a cubic or higher standard model as expressed by the following equation:

$$G(S) = \frac{KS^l \prod_{i=1}^{k} (1 + T_iS) \prod_{j=1}^{k} (1 + 2\zeta_j S/\omega_j + S^2/\omega_j^2)}{S^p \prod_{i=1}^{q} (1 + T_iS) \prod_{j=1}^{r} (1 + 2\zeta_j S/\omega_j + S^2/\omega_j^2)}$$

Although the step response is used as the time response according to this embodiment of the present invention, the present invention can be applied to cases in which a variety of time responses are employed, for example, a ramp response, a random response, a normal operation and the like.

Although the process which can be approximated by primary delay+dead time is subjected to the control according to the above-described embodiment of the present invention, the present invention can be applied to a variety of processes having a variety of characteristics.

Although the operating parameters of the controller are adjusted so as to make the model parameters of the standard model become a desired value according to the above-described embodiment of the present invention, the present invention can be applied to a case in which the operating parameters of a controller are adjusted so as to establish the characteristics of the frequency band of a standard model, for example, the phase margin and the gain margin.

Although the overshoot amount and the overshoot time or the time taken for the step response to rise up to 62% are used as the feature quantity of the step response according to the above-described embodiment of the present invention, the present invention can be applied to the case in which a feature amount such as the amplitude damping ratio, the rise time, the delay time and the setting time or the like is used.

Figure 27:
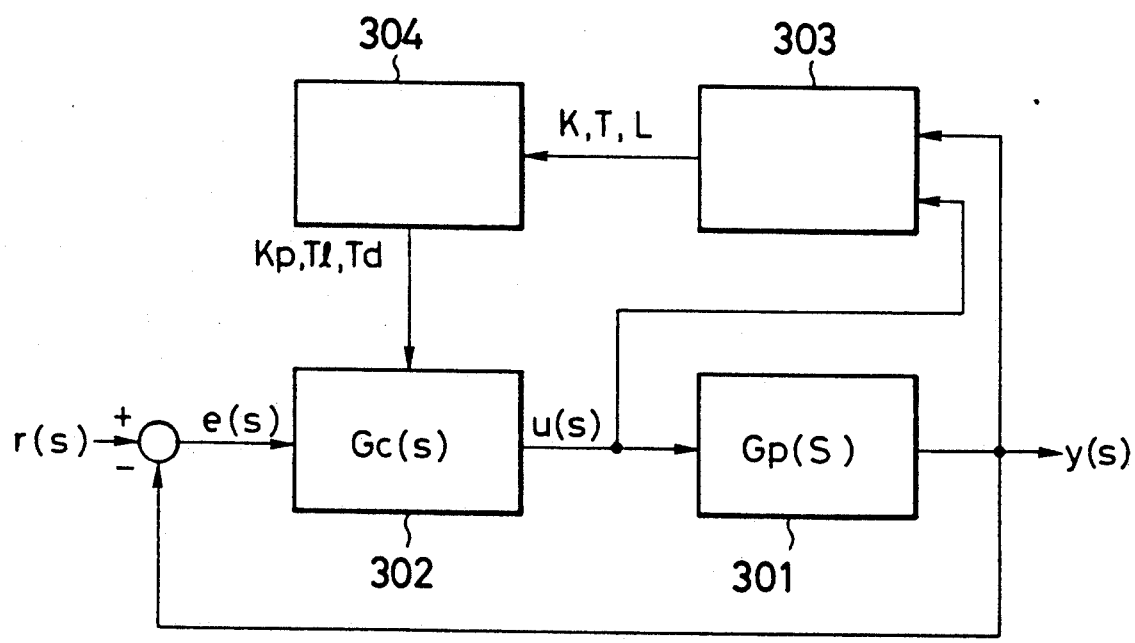
FIG. 27 illustrates an embodiment of the present invention.

FIG. 27 illustrates another embodiment of the present invention. This embodiment comprises a process identifying system 303 for identifying the transfer function $G_p(s)$ of a process 301 and an operating parameter determining system 304 for determining the operating parameters of a PID controller 302 in accordance with the identified transfer function $G_p(s)$ of the process 301.

The process identifying system 303 identifies the transfer function $G_p(s)$ of the process 301 and expresses the result of the identification by primary delay+dead time in an approximate manner as expressed by Equation (1) in the prior art. The operating parameter determining system 304 obtains the time scale factor $\sigma$ in accordance with the parameters of the transfer function $G_p(s)$ of the process 301 approximate-expressed by the primary delay+the dead time that is, in accordance with the gain K, the time constant T and the dead time L. The operating parameter determining system 304 further determines the operating parameters of the PID controller, that is, the proportional gain $K_p$, the integration time $T_i$ and the derivative time $T_d$ by using the thus obtained $\sigma$ from Equations (8), (9) and (10) described in the prior art. The PID controller 302 controls the process 301 by using the determined operating parameters $K_p$, $T_i$ and $T_d$.

The time scale factor $\sigma$ is obtained as the minimum positive real root of Equation (11) described in the prior art, the minimum positive real root being obtained by an approximate expression in order to shorten the computing time. In order to obtain the approximate expression of the above-described root, it is a critical factor to understand the schematic shape of $f(\sigma)$ defined by Equation (11). The control characteristics: the primary delay+the dead time considerably depend upon the ratio L/T between the dead time L and the time constant T. Therefore, L/T is defined by the following equation:

Substitution of Equation (13) and the value of coefficient ai (in the case of the Kitamori Model, $\alpha_2=0.15$, $\alpha_3=0.15$, $\alpha_4=0.03$, ...) into Equation (11) and arrangement performed afterwards give:

$$f(\sigma) = -0.005\sigma^3 + 0.1\left(1 + \frac{1}{n}\right)L\sigma^2 \\ -0.5\left(\frac{1}{2} + \frac{1}{n}\right)L^2\sigma + \left(\frac{1}{6} + \frac{1}{2n}\right)L^3 \quad (14)$$

Since the cubic coefficient of Equation (14) is negative, the following relationship can be given:

$$\lim_{\sigma \to +\infty} f(\sigma) = -\infty, \quad \lim_{\sigma \to -\infty} f(\sigma) = +\infty \quad (15)$$

Furthermore, $f'(\sigma)$ and $f''(\sigma)$ can be expressed as follows from Equation (14):

$$f'(\sigma) = -0.015\sigma^2 + 0.2\left(1 + \frac{1}{n}\right)L\sigma \\ -0.5\left(\frac{1}{2} + \frac{1}{n}\right)L^2 \quad (16)$$

$$f''(\sigma) = -0.03\sigma + 0.2\left(1 + \frac{1}{n}\right)L \quad (17)$$

Figures 28, 29:
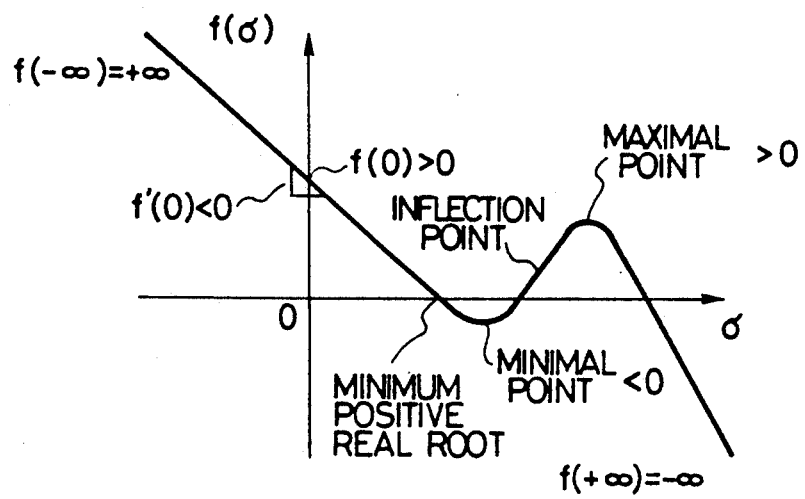

From Equations (14), (16) and (17), the value of $\theta$ with which the value of the external point of $f(\sigma)$ and the extermal point are given and the value of $\sigma$ with which the value of the inflection point of $f(\sigma)$ and the inflection point are obtained, the value of $\sigma$ being shown in FIG. 28. Furthermore, f(0) and f'(0) can be expressed as follows from Equations (14) and (16):

$$f(0) = \left(\frac{1}{6} + \frac{1}{2n}\right)L^3 > 0 \; (\because L, T > 0) \quad (18)$$

$$f'(0) = -0.5\left(\frac{1}{2} + \frac{1}{n}\right)L^2 < 0 \; (\because L, T > 0) \quad (19)$$

As is shown from Equations (15), (18) and (19) and from FIG. 28, the schematic shape of $f(\sigma)$ is as shown in FIG. 29. As shown in FIG. 29, all of the three roots of $f(\sigma)=0$ becomes positive real roots. Furthermore, it is apparent that the minimum positive real root is present between 0 and $\sigma$ which gives the minimal value.

Therefore, some points on $f(\sigma)$ and existing between 0 and $\sigma$ which give the minimal value are selected so as to be subjected to Taylor's expansion approximation. Then, the minimum positive real root of $\sigma$ for which the above-described approximate expressions become zero is obtained as the approximate expression of the minimum positive real root of $f(\sigma)=0$. Taylor's expansion approximate expression in the vicinity of $\sigma_0$ of $f(\sigma)$ can be obtained from the following equation:

$$f(\sigma) = f(\sigma_0) + f'(\sigma)(\sigma - \sigma_0) + \frac{1}{2!}f''(\sigma_0)(\sigma - \sigma_0)^2 + \ldots \quad (20)$$

Termination at the simple term of $\sigma$ gives the following equation:

$$f(\sigma) = f(\sigma_0) + f'(\sigma_0)(\sigma - \sigma_0) \quad (21)$$

Let $\sigma = \sigma_0$ in Equations (14) and (16), substitution of these equations into Equation (21) gives:

$$f(\sigma) = \quad (22)$$

$$\left\{-0.005\sigma_0^3 + 0.1\left(\frac{1}{n} + 1\right)L\sigma_0^2 - 0.5\left(\frac{1}{2} + \frac{1}{n}\right)L^2\sigma_0 + \left(\frac{1}{6} + \frac{1}{2n}\right)L^3\right\} + \left\{-0.015\sigma_0^2 + 0.2\left(\frac{1}{n} + 1\right)L\sigma_0 - 0.5\left(\frac{1}{2} + \frac{1}{n}\right)L^2\right\}(\sigma - \sigma_0)$$

Referring to FIG. 3, approximate expression (22) at each of points $\sigma_0=0$, L, 1.2L and 1.4L is obtained so as to compute the value of $\sigma$ with which Equation (22) becomes zero. As a result, an approximate expression shown in FIG. 30 is deduced. It is apparent from this drawing, the approximate expression of the minimum positive real root of $f(\sigma)$ can be expressed by the function of n and the product of L. Therefore, it is considered that also the true value of the minimum positive real root of $f(\sigma)=0$ can be expressed by the function of n and the product of L.

In order to improve the accuracy of the approximate expression shown in FIG. 30, the minimum positive real roots of $f(\sigma)=0$ with respect to a variety of L and T are actually computed by a computer so that the arranged values obtained in an assumption that the above-described true values can be expressed by the function of n and the product of L and the approximate values obtained from the approximate expression shown in FIG. 30 are shown in FIG. 31. As is shown from this drawing, the approximate expression of the minimum positive real root of $f(\sigma)=0$ at $\sigma_0=1.4L$ expressed by the following equation displayed the most satisfactory accuracy in which three significant digits coincide with the true value in the range of n=0 to 5 which is satisfactory range for practical use.

$$\sigma = \frac{0.0018934 - 0.0304\left(\frac{1}{n}\right)}{0.0006 - 0.22\left(\frac{1}{n}\right)}L \quad (23)$$

In comparison to this equation, Equation (22), as is shown from FIG. 31, involves an error of ±1% in the range of n=0 to 5. Therefore, Equation (23) displayed a further improved accuracy. However, in the case where n is approximated to ∞ in Equation (22), the minimum positive real root is larger than the value of $\sigma$ 1.3962L of the minimal value of $f(\sigma)$ shown in FIG. 28.

There reason for this lies in the fact that the tangent line of a point $\{1.4L, f(1.4L)\}$ on $f(\sigma)$ becomes a positive inclination when n becomes greater than a certain degree and Equation (23) thereby becomes an approximate expression of a positive real root between the minimum positive real root and the maximum positive real root. Therefore, in the ranges in which n exceeds 10, the following Equation (24) which is the approximate expression of the minimum positive real root of $f(\sigma)+0$ at $\sigma o = 1.3L$ displays a further improved accuracy:

$$\sigma = \frac{0.0196366 + \frac{0.331}{n}}{0.01535 + \frac{0.24}{n}} L \tag{24}$$

However, n rarely exceeds 10 in practical use, and an Equation (23) can be employed without a problem.

Although the simple approximate expression of the minimum positive real root of $f(\sigma)=0$ of Equation (14) is first obtained, termination at the quadratic term of $\sigma$ in Taylor's expansion approximate expression (20) in the vicinity of $\sigma o$ of $f(\sigma)$ gives the following equation:

$$f(\sigma) = f(\sigma o) + f'(\sigma o)(\sigma - \sigma o) + \frac{1}{2} f''(\sigma o)(\sigma o)^2 \tag{25}$$

Let $\sigma = \sigma o$ in Equations (14), (16) and (17) and substitutions of these equations into Equation (25) give:

$$f(\sigma) = \tag{26}$$

$$\left\{ -0.005\sigma o^3 + 0.1\left(\frac{1}{n} + 1\right)L\sigma o^2 - 0.5\left(\frac{1}{2} + \frac{1}{n}\right)L^2\sigma o + \left(\frac{1}{6} + \frac{1}{2n}\right)L^3 \right\} + \left\{ -0.015\sigma o^2 + 0.2\left(\frac{1}{n} + 1\right)L\sigma o - 0.5\left(\frac{1}{2} + \frac{1}{n}\right)L^2 \right\}(\sigma - \sigma o) +$$

$$\frac{1}{2}\left\{ -0.03\sigma o + 0.2\left(\frac{1}{n} + 1\right)L \right\}(\sigma - \sigma o)^2$$

As shown in FIG. 31, in the case where $\sigma o = 1.3L$ and $\sigma o = 1.4L$, a further excellent accuracy was displayed in the simple approximate expression of the minimum positive real root. Therefore, the quadratic approximate expression of the minimum positive real root of these cases is obtained.

When it is arranged, in Equation (26), that $\sigma o = 1.3L$ and $\sigma o = 1.4L$, Equations (27) and (28) are respectively obtained:

$$f(\sigma) = \left\{ -0.010985 + \left(\frac{1}{6} + \frac{1}{2n}\right) \right\}L^3 + \tag{27}$$

$$\left\{ 0.02535 - 0.5\left(\frac{1}{2} + \frac{1}{n}\right) \right\}L^2\sigma +$$

$$\left\{ -0.0195 + 0.1\left(\frac{1}{n} + 1\right) \right\}L\sigma^2$$

$(\sigma o = 1.3L)$ $$f(\sigma) = \left\{ -0.01372 + \left(\frac{1}{6} + \frac{1}{2n}\right) \right\}L^3 + \tag{28}$$

$$\left\{ 0.0294 - 0.5\left(\frac{1}{2} + \frac{1}{n}\right) \right\}L^2\sigma +$$

$$\left\{ -0.021 + 0.1\left(\frac{1}{n} + 1\right) \right\}L\sigma^2$$

$(\sigma o = 1.4L)$

When it is arranged that $f(\sigma)=0$ in Equations (27) and (28), $$\left\{ -0.0195 + 0.1\left(\frac{1}{n} + 1\right) \right\}\sigma^2 + \tag{29}$$

$$\left\{ 0.02535 - 0.5\left(\frac{1}{2} + \frac{1}{n}\right) \right\}L\sigma +$$

$$\left\{ -0.010985 + \left(\frac{1}{6} + \frac{1}{2n}\right) \right\}L^2 = 0 -$$

$(\sigma o = 1.3L)$ $$\left\{ -0.021 + 0.1\left(\frac{1}{n} + 1\right) \right\}\sigma^2 + \tag{30}$$

$$\left\{ 0.0294 - 0.5\left(\frac{1}{2} + \frac{1}{n}\right) \right\}L\sigma +$$

$$\left\{ -0.01372 + \left(\frac{1}{6} + \frac{1}{2n}\right) \right\}L^2 = 0$$

$(\sigma o = 1.4L)$

The root of each of Equations (29) and (30) is given by:

$$\sigma = \frac{1}{-0.039 + 0.2\left(\frac{1}{n} + 1\right)} \times \left[ \left\{ -0.02535 + 0.5\left(\frac{1}{2} + \frac{1}{n}\right) \right\} \pm \right. \tag{31}$$

$$\left. \sqrt{\left\{ 0.02535 - 0.5\left(\frac{1}{2} + \frac{1}{n}\right) \right\}^2 - 4\left( -0.195 + 0.1\left(\frac{1}{n} + 1\right) \right)\left( -0.010985 + \left(\frac{1}{6} + \frac{1}{2n}\right) \right)} \right]L$$

$(\sigma o = 1.3L)$

-continued $$\sigma = \frac{1}{-0.042 + 0.2\left(\frac{1}{n} + 1\right)} \times \left[\left\{-0.0294 + 0.5\left(\frac{1}{2} + \frac{1}{n}\right)\right\} \pm \sqrt{\left\{0.0294 - 0.5\left(\frac{1}{2} + \frac{1}{n}\right)\right\}^2 - 4\left\{-0.021 + 0.1\left(\frac{1}{n} + 1\right)\right\}\left\{-0.01372 + \left(\frac{1}{6} + \frac{1}{2n}\right)\right\}}\right]L \quad (32)$$

$(\sigma o = 1.4L)$

When it is arranged that n=1 and n=5 in Equation (31), the quadratic approximate expression of the minimum positive real root at $\sigma o=1.3L$ can be given by the following equations:

$$\left.\begin{array}{l}\sigma = 1.3773951L \ (n = 1) \\ \sigma = 1.3608288L \ (n = 5)\end{array}\right\}(\sigma o = 1.3L) \quad (33)$$

When it is arranged that n=1 and n=5 in Equation (32), the quadratic approximate expression of the minimum positive real root at $\sigma o=1.4L$ can be given by the following equations:

$$\left.\begin{array}{l}\sigma = 1.3773846L \ (n = 1) \\ \sigma = 1.3608009L \ (n = 5)\end{array}\right\}(\sigma o = 1.4L) \quad (34)$$

In comparison made between the quadratic approximate expression of the minimum positive real root expressed in Equations (33) and (34) and the true value of the minimum positive real root shown in FIG. 31, the accuracy has improved by a digit with respect to the coincidence of the minimum positive real root obtained by the simple approximate expression with the true value in the range of three digits. Furthermore, as is shown from Equations (31) and (32), also the quadratic approximate expression of the minimum positive real root of $f(\sigma)=0$ is expressed by the function of n and the product of L similarly to the simple approximate expression. Therefore, it is apparent that the true value of the minimum positive real root of $f(\sigma)=0$ can be expressed by the function of n and the product of L. The true value of $f(\sigma)=0$ of Equation (14) is obtained by using the formula of the root of a cubic equation. First, the formula of the root of a cubic equation is shown. A general formula of a cubic equation can be expressed as:

$$a\sigma^3 + b\sigma^2 + c\sigma + d = 0 \quad (35).$$

Substitution of $$\sigma = x - \frac{b}{3a}$$

into Equation (35) gives a standard formula of a cubic equation as follows:

$$k^3 + pk + q = 0 \quad (36).$$

The formula of the root (Cardano's Formula) of the cubic equation shown in Equation (36) is given by the following equations:

$$\alpha = \sqrt[3]{u} + \sqrt[3]{v} \quad (37)$$

$$\beta = \omega\sqrt[3]{u} + \omega^2\sqrt[3]{v}$$

$$\gamma = \omega^2\sqrt[3]{u} + \omega\sqrt[3]{v}$$

$$\text{where } u = -\frac{q}{2} + \sqrt{\frac{q^2}{4} + \frac{q^3}{27}} \quad (38)$$

$$v = -\frac{q}{2} - \sqrt{\frac{q^2}{4} + \frac{p^3}{27}} \quad (39)$$

$$\omega = \frac{-1 + i\sqrt{3}}{2} \quad (40)$$

The discriminant D of the root is expressed by:

$$D = a^4(\alpha-\beta)^2(\beta-\gamma)^2(\gamma-\alpha)^2 = -4p^3 - 27q^2 \quad (41).$$

When the coefficient of Equation (35) is a real number, the following relationships are held between the discriminant D of the root and the root:

(a) If D>0, three real roots
(b) If D=0, equal root (at least two real roots overlap)
(c) If D<0, a real root and two conjugate complex numbers Then, the true value of the minimum positive real root of $f(\sigma)=0$ of Equation (14) is obtained by using the formula of the root of a cubic equation.

$$\left.\begin{array}{l}a = -0.005 \\ b = 0.1\left(\frac{1}{n} + 1\right)L \\ c = -0.5\left(\frac{1}{2} + \frac{1}{n}\right)L^2 \\ d = \left(\frac{1}{6} + \frac{1}{2n}\right)L^3\end{array}\right\} \quad (2)$$

In order to convert $f(\sigma)=$ of Equation (14) into a standard formula, substitution of Equation (42) into $$\sigma = k - \frac{b}{3a} \text{ gives} \quad (43)$$

$$\sigma = k - \frac{b}{3a} = k + \frac{20}{3}\left(\frac{1}{n} + 1\right)L$$

Substitution of Equation (43) into Equation (14) and arrangement before arrangement in such a manner that $f(\sigma)=0$ give:

$$k^3 - \frac{50}{3}\left(\frac{8}{n^2} + \frac{10}{n} + 5\right)L^2 k - \tag{44}$$

$$\frac{100}{27}\left(\frac{160}{n^3} + \frac{300}{n^2} + \frac{237}{n} + 79\right)L^3 = 0$$

Comparison made between the coefficient of Equation (36) and that of Equation (44) gives:

$$\left.\begin{array}{l} p = -\frac{50}{3}\left(\frac{8}{n^2} + \frac{10}{n} + 5\right)L^2 \\ q = -\frac{100}{27}\left(\frac{160}{n^3} + \frac{300}{n^2} + \frac{237}{n} + 79\right)L^3 \end{array}\right\} \tag{45}$$

Substitution of Equation (45) into (41) causes the discriminant D of root to become:

$$D = \frac{10000}{27}\left(\frac{2160}{n^4} + \frac{2520}{n^3} + \frac{1431}{n^2} + \frac{54}{n} + 9\right)$$

As is shown from Equation (46), it is apparent that the discriminant $D>0$. Therefore, all of the three roots of $f(\sigma)=0$ of Equation (14) are real roots, so that it coincides with the result obtained from the schematic shape of $f(\sigma)$.

Substitution of Equation (45) into Equations (38) and (39) gives $$u = \frac{50}{27}\left(\frac{160}{n^3} + \frac{300}{n^2} + \frac{237}{n} + 79\right)L^3 + \tag{47}$$

$$i\frac{50}{27}\left(\frac{2160}{n^4} + \frac{2520}{n^3} + \frac{1431}{n^2} + \frac{54}{n} + 9\right)$$

$$v = \frac{50}{27}\left(\frac{160}{n^3} + \frac{300}{n^2} + \frac{237}{n} + 79\right)L^3 - \tag{48}$$

$$i\frac{50}{27}\left(\frac{2160}{n^4} + \frac{2520}{n^3} + \frac{1431}{n^2} + \frac{54}{n} + 9\right)$$

Substitution of Equations (47) and (48) into Equation (37) causes the root of Equation (44) to become:

$$\alpha = \left[\left\{\frac{50}{27}\left(\frac{160}{n^3} + \frac{300}{n^2} + \frac{237}{n} + 79\right) + \right.\right. \tag{49}$$

$$\left.i\frac{50}{27}\left(\frac{2160}{n^4} + \frac{2520}{n^3} + \frac{1431}{n^2} + \frac{54}{n} + 9\right)\right\}^{\frac{1}{3}} +$$

$$\left\{\frac{50}{27}\left(\frac{160}{n^3} + \frac{300}{n^2} + \frac{237}{n} + 79\right) - \right.$$

$$\left.\left.i\frac{50}{27}\left(\frac{2160}{n^4} + \frac{2520}{n^3} + \frac{1431}{n^2} + \frac{54}{n} + 9\right)\right\}^{\frac{1}{3}}\right]L$$

$$\beta = \left[\omega\left\{\frac{50}{27}\left(\frac{160}{n^3} + \frac{300}{n^2} + \frac{237}{n} + 79\right) + \right.\right. \tag{50}$$

$$\left.i\frac{50}{27}\left(\frac{2160}{n^4} + \frac{2520}{n^3} + \frac{1431}{n^2} + \frac{54}{n} + 9\right)\right\}^{\frac{1}{3}} +$$

$$\omega^2\left\{\frac{50}{27}\left(\frac{160}{n^3} + \frac{300}{n^2} + \frac{237}{n} + 79\right) - \right.$$

$$\left.\left.i\frac{50}{27}\left(\frac{2160}{n^4} + \frac{2520}{n^3} + \frac{1431}{n^2} + \frac{54}{n} + 9\right)\right\}^{\frac{1}{3}}\right]L$$

$$\gamma = \left[\omega^2\left\{\frac{50}{27}\left(\frac{160}{n^3} + \frac{300}{n^2} + \frac{237}{n} + 79\right) + \right.\right. \tag{51}$$

$$\left.i\frac{50}{27}\left(\frac{2160}{n^4} + \frac{2520}{n^3} + \frac{1431}{n^2} + \frac{54}{n} + 9\right)\right\}^{\frac{1}{3}} +$$

$$\omega\left\{\frac{50}{27}\left(\frac{160}{n^3} + \frac{300}{n^2} + \frac{237}{n} + 79\right) - \right.$$

$$\left.\left.i\frac{50}{27}\left(\frac{2160}{n^4} + \frac{2520}{n^3} + \frac{1431}{n^2} + \frac{54}{n} + 9\right)\right\}^{\frac{1}{3}}\right]L$$

From Equations (49), (50) and (51), the roots of Equation (44) become:

$$\left.\begin{array}{l} \alpha = g\,\alpha(n) \cdot L \\ \beta = g\,\beta(n) \cdot L \\ \gamma = g\,\gamma(n) \cdot L \end{array}\right\} \tag{52}$$

where all of $g\,\alpha(n)$, $g\,\beta(n)$ and $g\,\gamma(n)$ are the functions of n Substitution of Equation (52) into Equation (43) causes the three roots of $f(\sigma)=0$ of the cubic equation (14) are given by the following equations:

$$\left.\begin{array}{l} \sigma = \left\{g\,\alpha(n) + \frac{20}{3}\left(\frac{1}{n} + 1\right)\right\}L = g'\,\alpha(n) \cdot L \\ \sigma = \left\{g\,\alpha(n) + \frac{20}{3}\left(\frac{1}{n} + 1\right)\right\}L = g'\,\beta(n) \cdot L \\ \sigma = \left\{g\,\gamma(n) + \frac{20}{3}\left(\frac{1}{n} + 1\right)\right\}L = g'\,\gamma(n) \cdot L \end{array}\right\} \tag{53}$$

That is, the three roots of $f(\sigma)=0$ of the cubic equation (14) can be given by the product of function $g'i(n)$ ($i=\alpha, \beta, \gamma$) of n and the dead time L. Therefore, it has been confirmed that the above-made inference is right.

Substitution of $n=1$ in Equations (49), (50) and (51) causes the three roots of the standard cubic equation (44) to become:

$$\left.\begin{array}{l} a = 22.59497L \\ b = -11.955944L \\ \gamma = -10.639026L \end{array}\right\}(n = 1) \quad (54)$$

Substitution of Equation (54) into Equation (53) causes the three roots of $f(\sigma)=0$ of cubic equation (14) to become:

$$\left.\begin{array}{l} \sigma = 35.928303L \\ \sigma = 1.377389L \\ \sigma = 2.694307L \end{array}\right\}(n = 1) \quad (55)$$

From Equation (55), the minimum positive real root of $f(\sigma)=0$ of cubic equation (14) is expressed by the following equation obtained from the second equation of Equation (53):

$$\sigma = 1.377389L \quad (n = 1) \quad (56)$$

Furthermore, substitutions of $n=5$ into Equations (49), (50) and (51) cause the three roots of the standard cubic equation (44) to become:

$$\left.\begin{array}{l} a = 12.750441L \\ \beta = -6.6391907L \\ \gamma = -6.1112504L \end{array}\right\}(n = 5) \quad (57)$$

Substitution of Equation (57) into Equation (54) causes the three roots of $f(\sigma)=0$ of cubic equation (14) to become:

$$\left.\begin{array}{l} \sigma = 20.750441L \\ \sigma = 1.3608093L \\ \sigma = 1.8887496L \end{array}\right\}(n = 5) \quad (58)$$

From Equation (58), the minimum positive real root of $f(\sigma)=0$ of cubic equation (14) is obtained from the second equation of Equation (53) and becomes as follows:

$$\sigma = 1.3608093L \quad (n = 5) \quad (59)$$

In comparison made between Equations (33) and (34) for the minimum positive real root obtained from the quadratic approximate expression and Equations (56) and (59) for the true minimum positive real root, it is apparent that coincidence to 5 digits can be realized. Furthermore, the minimum positive real root obtained by the quadratic approximate expression in the case of $\sigma_0=1.4L$ displays a superior accuracy to that in the case of $\sigma_0=1.3L$ similarly to the case of the simple approximate expression.

As described above, the simple approximate expression and the quadratic approximate expression of the minimum positive real root of the cubic equation $f(\sigma)=0$ of the time scale factor $\sigma$ is expressed by the function of the ratio n $(=L/T)$ of the dead time L and the time constant T and the product of the dead time L. Also the true value of the minimum positive real root of the cubic equation $f(\sigma)=0$ of the time scale factor is expressed by the function of the ratio n $(=L/T)$ of the dead time L and the time constant T and the product of the dead time L. In other words, the simple approximate expression, the quadratic approximate expression and the true value of the minimum positive real root of the cubic equation $f(\sigma)=0$ of the time scale factor are expressed by the ratio n $(=L/T)$ of the dead time L and the time constant T and the function of the dead time L.

The above-described descriptions can be arranged in such a manner that the operating parameter determining system 4 obtains the time scale factor $\sigma$ in accordance with the above-described approximate expression based upon the parameters, gain K, time constant T and dead time L of the transfer function $G_p(S)$ of the process 1 expressed in an approximate manner by primary delay+dead time obtained by the process identifying system 3. It determines the operating parameters, proportional gain $K_p$, integral time $T_1$, derivative time $T_d$ of the PID controller in accordance with Equations (8), (9) and (10) by using the thus obtained $\sigma$. The approximate expression is arranged to be the simple approximate expression {Equation (23) or (24) which has been obtained previously} or the quadratic approximate expression {Equation (31) or (32)}.

The previously-obtained results are evaluated by means of a simulation. It is assumed that the characteristics of the process can be expressed by the secondary delay+dead time. In this case, the secondary delay+the dead time must be approximated by the first delay+the dead time. In this state, the secondary delay is approximated by the primary delay+the dead time, and then the residual dead time is added. Thus, the overall first delay+the dead time is approximated.

The secondary delay+the dead time can be given from the following equation:

$$G_p(s) = \frac{K}{(1 + T_1 s)(1 + T_2 s)} e^{-L's} \quad (60)$$

where T1, T2: time constant, L': dead time.

The secondary delay is taken from Equation (60), the following equation is given:

$$G'_p(s) = \frac{K}{(1 + T_1 s)(1 + T_2 s)} \quad (61)$$

Equation (61) can be transformed as follows:

$$G'_p(s) = \frac{K}{1 + (T_1 + T_2)s + T_1 T_2 s^2} \quad (62)$$

On the other hand, Maclaurin's expansion of the first delay+the dead time system gives $$G'_p(s) = \frac{K}{1 + T} e^{-L's} \quad (63)$$

$$= \frac{K}{1 + (T + T'')s + \left(TL'' + \frac{L''^2}{2}\right)s^2 + \left(\frac{TL''^2}{2!} + \frac{L''^3}{3!}\right)s^3 + \ldots}$$

In order to make the coefficient of the denominators of Equations (62) and (63) coincide with the quadratic term, the following equations must be satisfied:

$$T1 + T2 = T + L'' \quad (64)$$

$$T1 T2 = TL'' + \frac{L'^2}{2} \quad (65)$$

Solving of Equations (64) and (65) in a simultaneously manner, $$\left.\begin{array}{l} T = \sqrt{T1^2 + T2^2} \\ L = (T1 + T2) - \sqrt{T1^2 + T2^2} \end{array}\right\} \quad (66)$$

Therefore, in order to approximate Equation (60) by Equation (1), the following equations must be held:

$$\left.\begin{array}{l} T = \sqrt{T1^2 + T2^2} \\ L = (T1 + T2) - \sqrt{T1^2 + T2^2} + L' \end{array}\right\} \quad (66)$$

Figure 32:
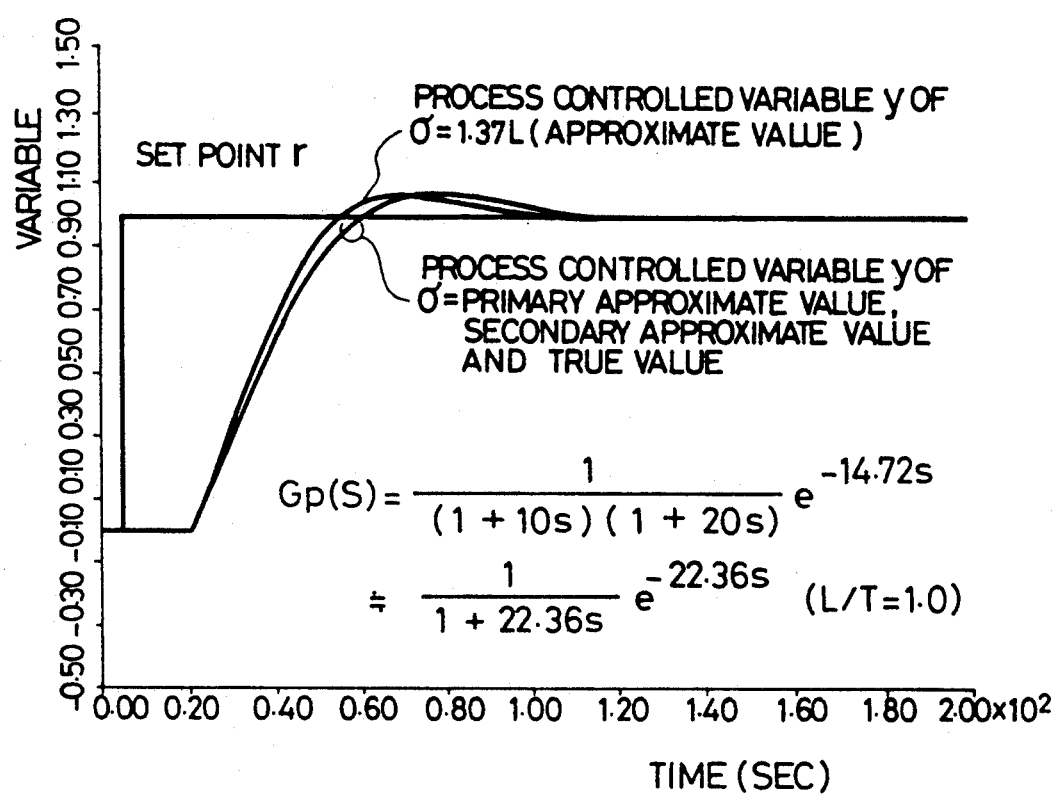
FIGS. 32 and 33 illustrate the results of simulations conducted for the purpose of explaining the effect of the embodiment of the present invention.
Figure 33:
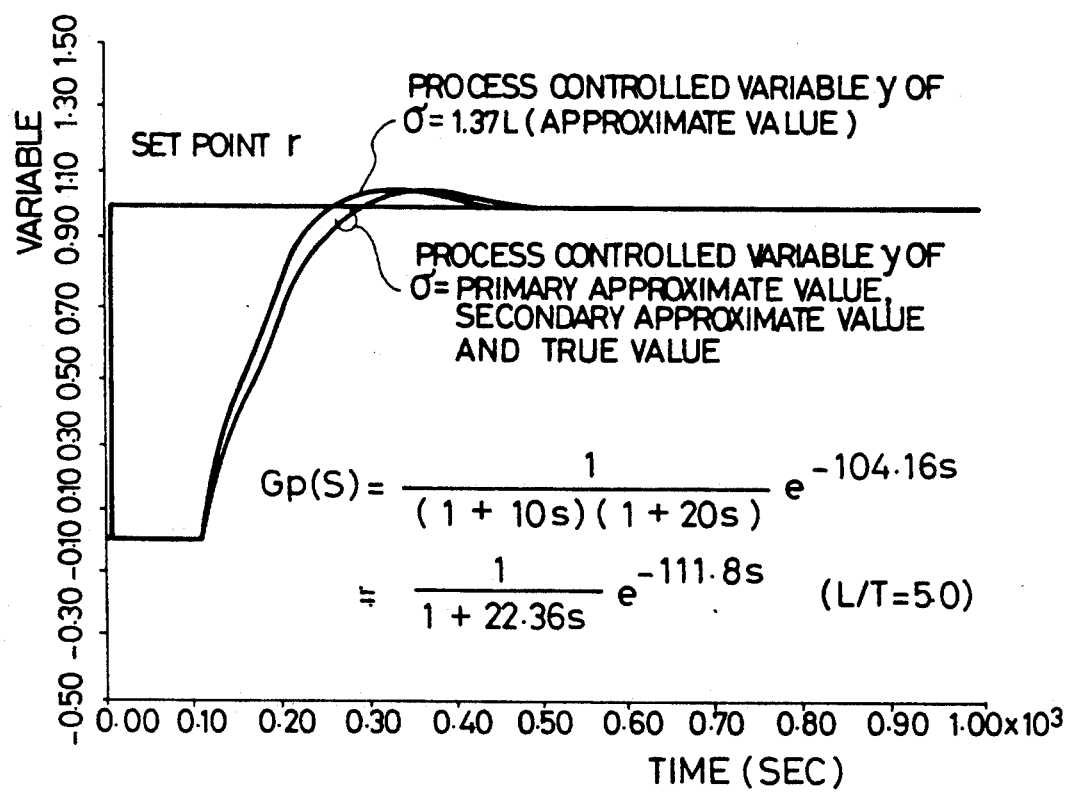

A simulation was performed for the secondary delay+dead time was performed arranging to use the conventional approximate expression $\sigma=1.37L$, the simple approximate express equation (23), the quadratic approximate expression (34) and true values (56) and (59). The results of the simulation are shown in FIGS. 32 and 33. FIG. 33 illustrates the case where n (=L/T)=1, while FIG. 33 illustrates the case where n=5. As is shown from FIGS. 32 and 33, the response obtained from the simple approximate expression (23) and the quadratic approximate expression (34) is substantially the same as that obtained from the true value (56) and Equation (59). However, the case in which the conventional approximate expression $\sigma=1.37L$ displayed insufficient approximate accuracy and the difference in response is involved in comparison to the case where the true value is used.

According to the above-described embodiments, the operating parameter determining system 4 obtains the time scale factor $\sigma$ by means of an approximate expression (a simple approximate expression or a quadratic approximate expression. Another structure may be employed in which the time scale factor $\sigma$ is obtained from the second equation of Equation (53) which is the equation of the true value and the operating parameters, the proportional gain $K_p$, the integral time $T_i$, the derivative time $T_d$ of the PID controller are determined by using the thus obtained $\sigma$ and in accordance with Equations (8), (9) and (10).

According to the above-described embodiments, the approximate expression of the time scale factor s is obtained in such a manner that a specific $\sigma_0$ (for example, $\sigma_0=1.4L$) is substituted into Taylor's expansion approximate expressions {Equations (22) and (26)} in the vicinity of $\sigma_0$ of $f(\sigma)$, and the value with which the obtained approximate expression becomes zero is used as the approximate value of $f(\sigma)=0$. Thus, the time scale factor $\sigma$ can be obtained. In order to further improve the accuracy, another structure may be employed in which the obtained approximate value $\sigma$ is converted into $\sigma_0$ so as to be substituted into Taylor's expansion approximate expression {Equations (22) and (26)} in the vicinity of $\sigma_0$ of $f(\sigma)$, and $\sigma$ with which the obtained approximate expression is made zero is arranged to be the approximate value of $f(\sigma)=0$. Then, the above-described processing is repeated several times so that the time scale factor $\sigma$ is obtained.

Figure 34:
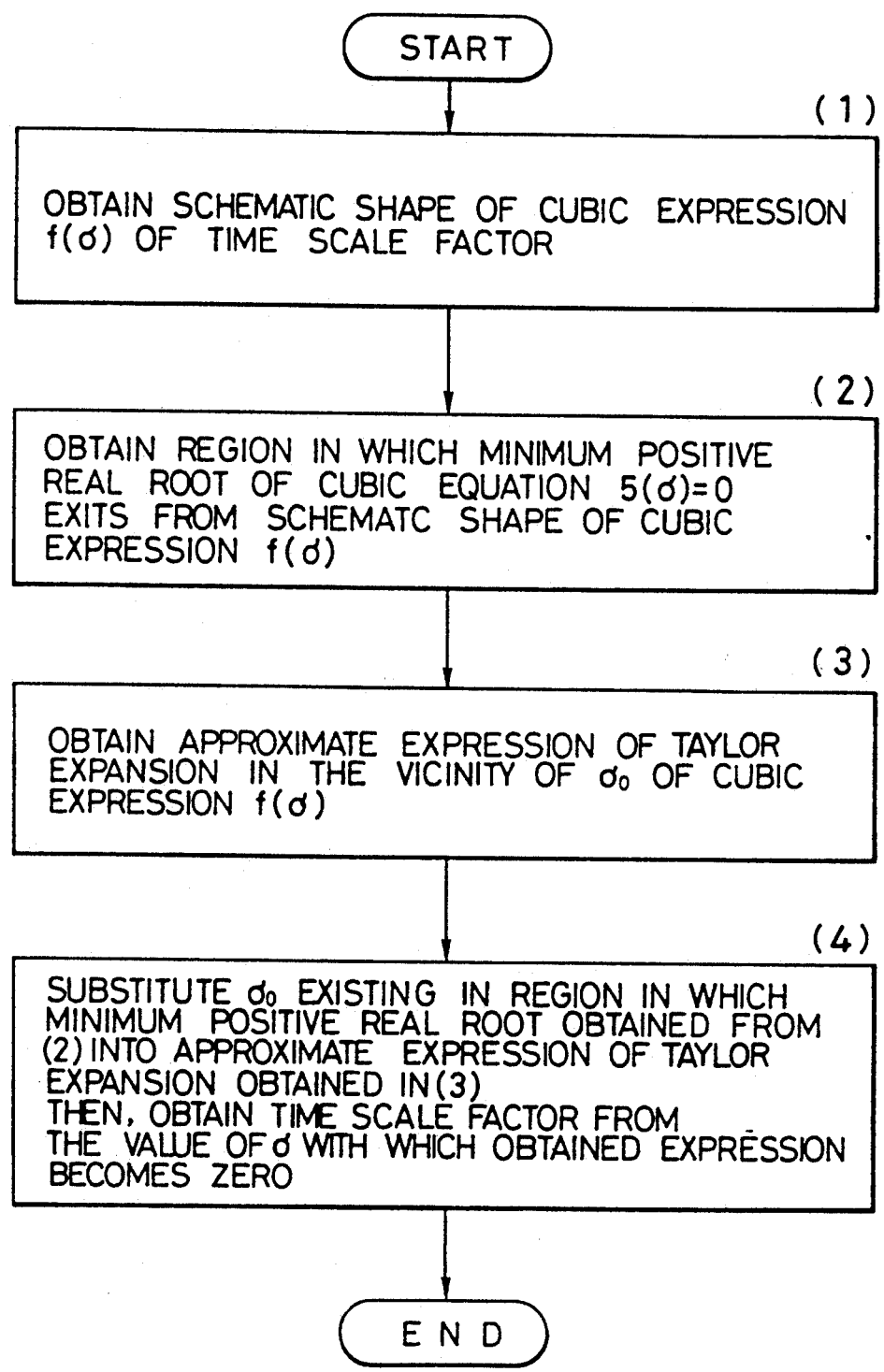
FIG. 34 is a flow chart which illustrates the process for obtaining the approximate expression of the time scale factor $\sigma$ according to an embodiment of the present invention.

According to the above-described embodiments, the operating parameter determining system 304 obtains the time scale factor $\sigma$ by using the approximate expression and determines the operating parameters, the proportional gain $K_p$, the time integral time $T_i$, the derivative time $T_d$ of the PID controller 2 in accordance with Equations (8), (9) and (10) by using the thus obtained time scale factor $\sigma$. However, the processing to obtain the approximate expression is also the critical factor of the present invention. The processings for obtaining the approximate expression can be expressed by a flow chart shown in FIG. 34. That is, (1) the schematic shape of the cubic equation $f(\sigma)$ of the time scale factor $\sigma$ is obtained; (2) a region in which the minimum positive real root of the cubic equation $f(\sigma)=0$ is obtained from the schematic shape of the cubic equation $f(\sigma)$; (3) the approximate Tailor's expansion approximate equation of $\sigma_0$ of the cubic equation $f(\sigma)$ is obtained; and (4) $\sigma_0$ existing in the region in which the minimum positive real root exists and obtained in (2) is substituted into Taylor's expansion approximate expression so that the time scale factor $\sigma$ is obtained from the value of $\sigma$ with which the obtained approximate expression is made zero. According to the above-described embodiments, the region in which the minimum positive real root exists is the region in which the value is smaller than $\sigma$ which gives the minimal value.

As is shown from FIG. 32, in the case where n=1, the conventional approximate expression $\sigma=1.37L$ is smaller than the true value $\sigma=1.377389$, and the response time can be shortened with respect to the true value when the approximate expression $\sigma=1.37L$ is used. As is shown from FIG. 33, in the case where n=5, the conventional approximate expresson $\sigma=1.37L$ is larger than the true value $\sigma=1.3608093L$, and the response time is delayed in the case where the approximate expression $\sigma=1.37L$ is used with respect to the true value. However, as is shown from FIGS. 32 and 33, the overshoot amount is significantly the same in both the case where the approximate expression $\sigma=1.3L$ and in the case of the true value. As a result, it can be considered that there is a possibility that the response rise time can be adjusted without changing the overshoot amount by arranging the time scale factor $\sigma$ to the function of L and by increasing/decreasing the coefficient of the above-described function.

Figure 35:
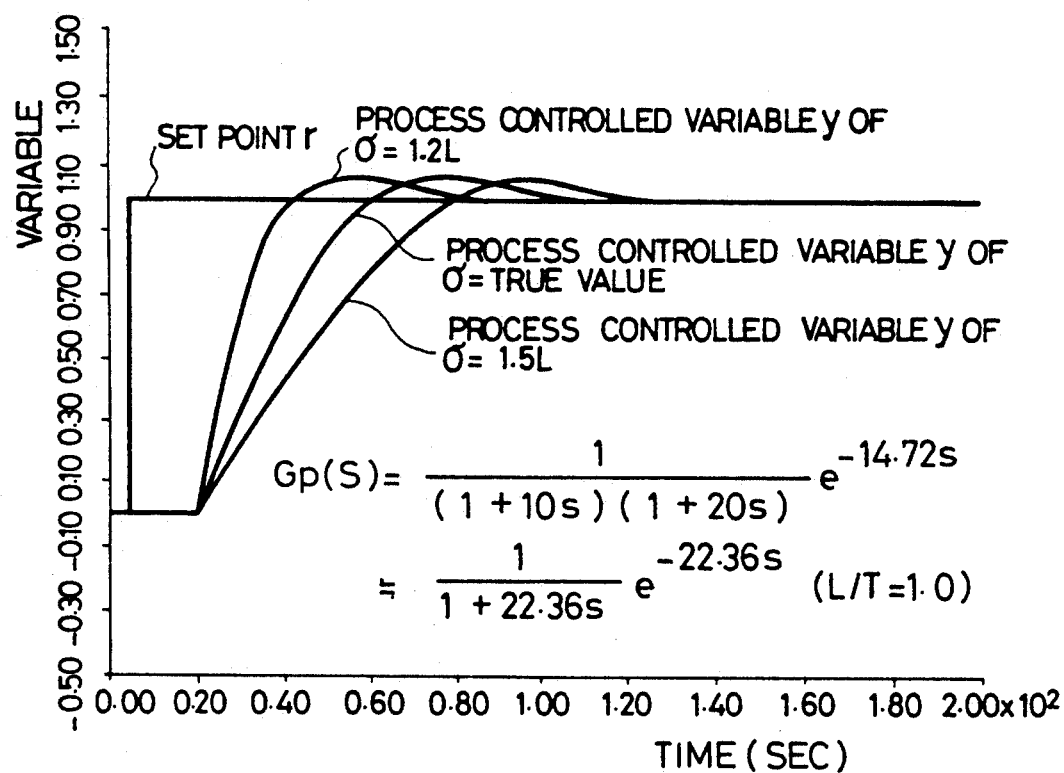
FIGS. 35 and 36 illustrate the results of simulations conducted for the purpose of explaining the effect of another embodiment of the present invention.
Figure 36:
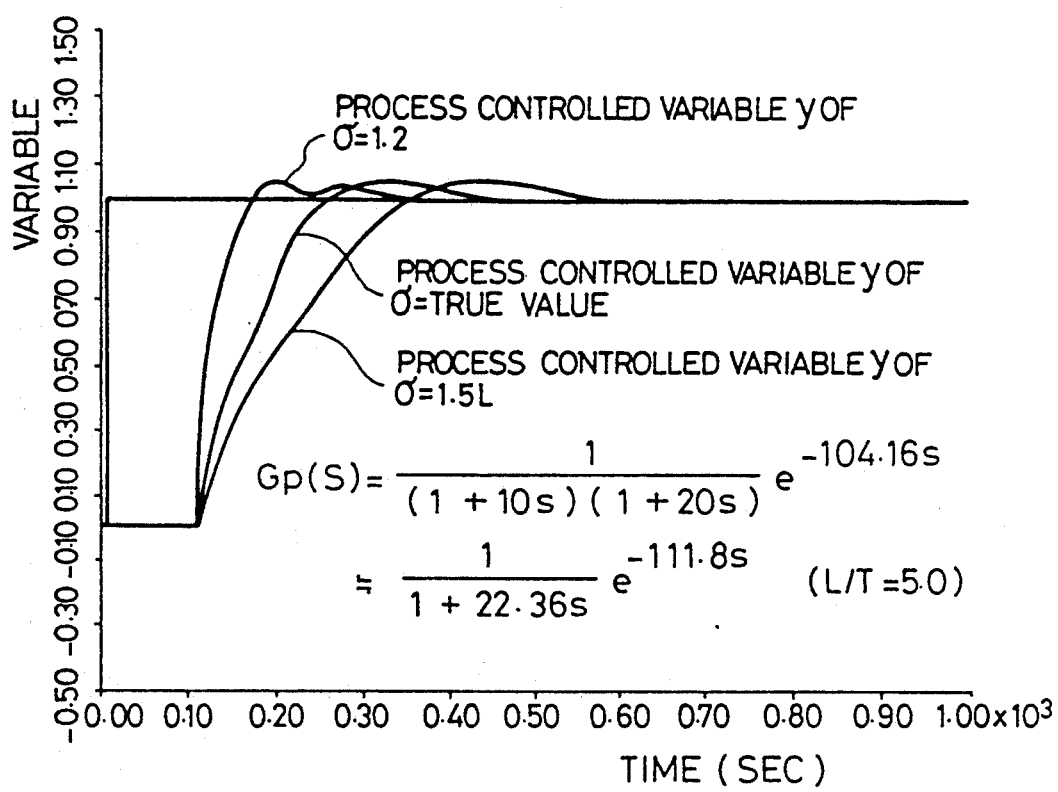

A simulation was performed in which the secondary delay+the dead time was subjected in such a manner that the time scale factor $\sigma$ was arranged to be the function of L so as to be increased/decreased. The results of the simulation are shown in FIGS. 35 and 36. FIG. 35 illustrates the case where n (=L/T)=1, while FIG. 11 illustrates the case where n=5. As is shown from FIGS. 35 and 36, the response rise time can be quickened and delayed by increasing/decreasing the time scale factor centering the true value without changing the overshoot amount.

Since the time scale factor $\sigma$ cannot be made smaller than the dead time L in the process which can be approximated by the first delay+the dead time, the rise time of the control response can be quickened and delayed without changing the overshoot amount by adjusting the time scale factor $\sigma$ in the range shown in the following equation:

$$\sigma = KL \quad (K \geq 1) \qquad (68)$$

The following equation can also be used when the rise time is adjusted:
(in the case where the rise is quickened)

$$\begin{aligned}\sigma &= 1.37L - K1 \cdot L \\ &= (1.37 - K1)L \quad (0 \leq K1 \leq 0.37)\end{aligned} \qquad (69)$$

(in the case where the rise is delayed)

$$\begin{aligned}\sigma &= 1.37L - K2 \cdot L \\ &= (1.37 - K2)L \quad (0 \leq K2)\end{aligned} \qquad (70)$$

Although the conventional approximate expression s=1.37 L is used as the reference for the rise time in Equations (69) and (70), the simple approximate expression, the quadratic approximate expression or the equation for the true value of the minimum positive real root of the cubic equation $f(\sigma)=0$ may be used as the reference of the rise time.

According to the above-described embodiments, the case in which the Kitamori Model ($\alpha_2=0.5$, $\alpha_3=0.15$, $\alpha_4=0.03$, ...) is used as the transfer function $W_r(s)$ of the reference model is described in major. However, the other transfer functions Wr(S) of the reference model, for example, the Betteuoorth model, the ITAE minimum model, the Binonomial model or the like can be employed. In this case, the coefficient value of each of the reference models is substituted into the coefficient $\alpha_i$ of Equation (11).

According to the present invention, in the adjustment of the PID controller using the partial model matching method, the approximate solution of the minimum positive real root of the cubic equation $f(\sigma)=0$ of the time scale factor $\sigma$ is obtained as follows, in the case where the process to be controlled can be approximated by the first delay+the dead time:

(1) it is obtained as the relationship between the ratio L/T of the dead time L and the time constant T and the dead time L;

(2) it is obtained as the product of the function of the ratio n (L/T) of the dead time L and the time constant T and the dead time L;

(3) it is obtained as the value of $\sigma$ with which Taylor's expansion approximate expression of $f(\sigma)$ by determining the schematic shape of f(s) and by specifying the range of the solution of the minimum positive real root from the thus determined schematic shape; or (4) it is obtained by repeating the calculation of the value of $\sigma$.

Therefore, the accuracy of the approximate solution can be improved, and the magnitude of error between the control response of the PID controller and the desired control response can be reduced by using the above-described approximate solution to adjust the operating parameters of the PID controller.

Furthermore, the approximate solution of the minimum positive real root of f(s)=0 is used in such a manner that (5) $\sigma$ is expressed by the function of L/T and L, and $\sigma$ is increased/decreased by increasing/decreasing the coefficient of the above-described function or (6) $\sigma$ is expressed as the function of L, and $\sigma$ is increased/decreased by increasing/decreasing the coefficient of the above-described function.

Therefore, the characteristics of the dead time L and the time constant T are reflected to the operating parameters of the PID controller. As a result, the response rise time can be adjusted with change in the overshoot amount controlled and with a stable control response maintained.

Although the invention has been described in its preferred form with a certain degree of particularly, it is understood that the present disclosure of the preferred embodiments may be changed in the details of construction and variations in the combination and arrangement of parts may be resorted to without departing from the spirit and the scope of the invention as hereinafter claimed.

What is claimed is:

1. A process control apparatus for feedback-controlling a process controlled variable of a process to a set point and performing at least a proportional-integral control operation, said process control apparatus comprising:

computing means for observing the waveform of a control deviation between said set point and said process controlled variable which takes place due to a change in said set point or application of a disturbance and for computing an area value by time-integrating the absolute value of said control deviation at every half cycle; and modification means for adjustably controlling parameters based upon said area value in accordance with a predetermined adjustment rule.

2. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance and for computing an area value by time-integrating the absolute value of said control deviation at every half cycle;

evaluation index computing means for computing an evaluation index from said area value after a control response has been set;

operating parameter modification coefficient inference means for receiving said evaluation index and inferring a modification coefficient of said operating parameters in accordance with an adjustment rule qualitatively expressing a relationship between the degree of said evaluation index and the value of said operating parameter and based upon a fuzzy inference; and operating parameter adjustment value computing means for computing an adjustment value of said operating parameter by means of the product of said modification coefficient and the present value of said operating parameter.

3. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance and for computing an area value by time-integrating the absolute value of said control deviation at every half cycle;

evaluation index computing means for computing a first evaluation index and a second evaluation index from said area value after a control response has been set;

operating parameter modification coefficient inference means for receiving each of said first and second evaluation indexes and for inferring a modification coefficient of said operating parameters in accordance with an adjustment rule qualitatively expressing a relationship between each of the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

4. A process control apparatus according to claim 3, wherein said first evaluation index is an area overshoot amount expressed by the ratio between the second area value of a waveform and the first area value of the same waveform and said second evaluation index is an area damping ratio expressed by the ratio between the third area value of said waveform and said second area value of the same waveform.

5. A process control apparatus according to claim 3, wherein said first evaluation index is an area overshoot amount expressed by the ratio between the second area value of a waveform and the first area value of the same waveform and said second evaluation index is an area damping ratio expressed by the sum of the third area value of said waveform and the fourth area value of the same waveform and the sum of said second area value of the same waveform and said third area value of the same waveform.

6. A process control apparatus according to claim 3, wherein said first evaluation index is an area overshoot amount expressed by the ratio between the second area value of a waveform and the first area value of the same waveform and said second evaluation index is an area damping ratio expressed by the ratio between total sum of the sum of odd area values of the same waveform and the sum of even area values of the same waveform.

7. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance and for computing an area value by time-integrating the absolute value of said control deviation at every half cycle;

evaluation index computing means for computing first, second and third evaluation indexes from said area value after a control response has been set;

operating parameter modification coefficient inference means for receiving any of said first and second evaluation indexes and for inferring a modification coefficient of said operating parameters in accordance with an adjustment rule qualitatively expressing a relationship between each of the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

8. A process control apparatus according to claim 5, wherein said first evaluation index is an area overshoot amount expressed by the ratio between the second area value of a waveform and the first area value of the same waveform, said second evaluation index is an area damping ratio expressed by the third area value of said waveform and said second area value of the same waveform and said third evaluation index is a total area value expressed by the ratio between the previous sum of said area value and the present value of the same waveform.

9. A process control apparatus according to claim 7, wherein said first evaluation index is an area overshoot amount expressed by the ratio between the second area value of a waveform and the first area value of the same waveform and said second evaluation index is an area damping ratio expressed by the ratio between the sum of the third area value of said waveform and the fourth area value of the same waveform and the sum of said second area value of the same waveform and said third area value of the same waveform.

10. A process control apparatus according to claim 7, wherein said first evaluation index is an area overshoot amount expressed by the ratio between the second area value of a waveform and the first area value of the same waveform and said second evaluation index is an area damping ratio expressed by the ratio between sum of the sum of odd area values of the same waveform and the sum of even area values of the same waveform.

11. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to change in said set point or application of disturbance, computing an area value by time-integrating the absolute value of said control deviation at every half cycle and detecting a dead time and a rise time by providing a first threshold and a second threshold for said control deviation;

evaluation index computing means for computing first, second and third evaluation indexes from said area value, said dead time and said rise time after a control response has been set;

operating parameter modification coefficient inference means for receiving any of said first, second and third evaluation indexes and for inferring a modification coefficient of said operating parameters in accordance with an adjustment rule qualitatively expressing a relationship between each of the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

12. A process control apparatus according to claim 11, wherein said first evaluation index is an area overshoot amount expressed by the ratio between the second area value of a waveform and the first are value of the same waveform, said second evaluation index is an area damping ratio expressed by the ratio between the third area value of said waveform and said second area value of the same waveform and said third evaluation index is a rise time ratio expressed by the ratio between an observed rise time and a set point of said rise time obtained by multiplying a value of dead time by a predetermined coefficient.

13. A process control apparatus according to claim 11, wherein said first evaluation index is an area overshoot amount expressed by the ratio between the second area value of a waveform and the first area value of the same waveform, said second evaluation index is an area damping ratio expressed by the radio between the sum of the third area value of said waveform and the fourth area value of the same waveform and the sum of said second area value and said third area value and said third evaluation index is a rise time ratio expressed by the ratio between an observed rise time and a set point of said rise time obtained by multiplying a value of dead time by a predetermined coefficient.

14. A process control apparatus according to claim 11, wherein said first evaluation index is an area overshoot amount expressed by the ratio between the second area value of a waveform and the first area value of the same waveform, said second evaluation index is an area damping ratio expressed by the ratio between the sum of the third area value of said waveform and the fourth area value of the same waveform and the sum of said second area value and said third area value and said third evaluation index is a rise time ratio expressed by the ratio between an observed rise time and a set point of said rise time obtained by multiplying a value of dead time by a predetermined coefficient.

15. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to change in said set point or application of a disturbance, computing an area value by time-integrating the absolute value of said control deviation at every half cycle and detecting a setting time required for said control deviation to reach an allowable range;

evaluation index computing means for computing first, second and third evaluation indexes from said area value, said dead time and said rise time after a control response has been set;

operating parameter modification coefficient inference means for receiving any of said first, second and third evaluation indexes and for inferring a modification coefficient of said operating parameters in accordance with an adjustment rule qualitatively expressing a relationship between each of the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

16. A process control apparatus according to claim 15, wherein said first evaluation index is an area overshoot amount expressed by the ratio between the second area value of a waveform and the first area value of the same waveform, said second evaluation index is an area damping ratio expressed by the ratio between the third area value of said waveform and the second area value of the same waveform and said third evaluation index is a setting time ratio expressed by the ratio between the present setting time and a previous setting time.

17. A process control apparatus for feedback-controlling a process controlled variable of a process to a set point and performing at least a proportional-integral control operation, said process control apparatus comprising:

computing means for observing the waveform of a control deviation between said set point and said process controlled variable which takes place due to a change in said set point or application of a disturbance and for computing an average deviation obtained by dividing the area value obtained by time-integrating the absolute value of said control deviation at every half cycle by time for said half cycle;

modification means for adjusting the operating parameter based upon said average deviation in accordance with a predetermined adjustment rule.

18. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance and for computing an average deviation obtained by dividing the area value obtained by time-integrating the absolute value of said control deviation at every half cycle by time for said half cycle;

evaluation index computing means for computing an evaluation index from said area value after a control response has been set;

operating parameter modification coefficient inference means for receiving said evaluation index and informing a modification coefficient of said operating parameters in accordance with an adjustment rule qualitatively expressing a relationship between the degree of said evaluation index and the value of said operating parameter based upon a fuzzy inference; and operating parameter adjustment value computing means for computing an adjustment value of said operating parameter by means of the product of said modification coefficient and the present value of said operating parameter.

19. A process control apparatus for feedback-controlling a process controlled variable of a process so a set point and performing at least a proportional-integral control operation, said process control apparatus comprising:

control response observation means for observing the waveform of a control deviation between said set point and said process controlled variable which takes place due to a change in said set point or application of a disturbance and for computing an average deviation obtained by dividing the area value obtained by time-integrating the absolute value of said control deviation at every half cycle by time for said half cycle;

evaluation index computing means for computing first and second evaluation indexes from said average deviation after a control response has been set;

operating parameter modification coefficient inference means for receiving an evaluation index and informing a modification coefficient of said operating parameters in accordance with an adjustment rule qualitatively expressing a relationship between the degree of said evaluation index and the value of said operating parameter based upon a fuzzy inference; and operating parameter adjustment value computing means for computing an adjustment value of said operating parameter by means of the product of said modification coefficient and the present value of said operating parameter.

20. A process control apparatus according to claim 19, wherein said first evaluation index is an area overshoot amount expressed by the ratio between the second average deviation of a waveform and the first average deviation of the same waveform and said second evaluation index is an average deviation damping ratio expressed by the ratio between the third average deviation of said waveform and said second average deviation of the same waveform.

21. A process control apparatus according to claim 19, wherein said first evaluation index is an area overshoot amount expressed by the ratio between the second average deviation of a waveform and the first average deviation of the same waveform and said second evaluation index is an average deviation damping ratio expressed by the ratio between the sum of the third average deviation of said waveform and said fourth average deviation of the same waveform and the sum of said second average deviation of said waveform and said third third average deviation of the same waveform.

22. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance and for computing an average deviation obtained by dividing the area value obtained by time-integrating the absolute value of said control deviation at every half cycle by time for said half cycle;

evaluation index computing means for computing first, second and third evaluation indexes from said average deviation after a control response has been set;

operating parameter modification coefficient inference means for receiving any of said first, second and third evaluation indexes and for inferring a modification coefficient of said operating parameters in accordance with an adjustment rule qualitatively expressing a relationship between the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

23. A process control apparatus according to claim 22, wherein said first evaluation index is an area overshoot amount expressed by the ratio between the second average deviation of a waveform and the first average deviation of the same waveform said second evaluation index is an average deviation damping ratio expressed by the ratio between the the third average deviation of said waveform and said second average deviation of the same waveform and said third evaluation index is a total average deviation ratio expressed by the ratio between a previous total value of said average deviations and the present total value of the same average deviations.

24. A process control apparatus according to claim 22, wherein said first evaluation index is an area overshoot amount expressed by the ratio between the second average deviation of a waveform and the first average deviation of the same waveform and said second evaluation index is an average deviation damping ratio expressed by the ratio between the sum of the third average deviation of said waveform and said fourth average deviation of the same waveform and the sum of said second average deviation of said waveform and said third third average deviation of the same waveform.

25. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance, computing an average deviation obtained by dividing an area value obtained by time-integrating the absolute value of said control deviation at every half cycle by time of said half cycle and detecting a dead time and a rise time by providing a first threshold and a second threshold for said control deviation;

evaluation index computing means for computing first, second and third evaluation indexes from said average deviation, said dead time and said rise time after a control response has been set;

operating parameter modification coefficient inference means for receiving any of said first, second and third evaluation indexes and for inferring a modification coefficient of said operating parameters in accordance with an adjustment rule qualitatively expressing a relationship between each of the degrees of said evaluation indexes and the value of said operating parameter based upon a fuzzy inference; and operating parameter adjustment value computing means for computing an adjustment value of said operating parameter by means of the product of said modification coefficient and the present value of said operating parameter.

26. A process control apparatus according to claim 25, wherein said first evaluation index is an area overshoot amount expressed by the ratio between the second average deviation of a waveform and the first average deviation of the same waveform, said second evaluation index is an average deviation damping ratio expressed by the ratio between the third average deviation of said waveform and the second average deviation of the same waveform and said third evaluation index is a rise time ratio expressed by the ratio between an observed rise time and a set point of said rise time obtained by multiplying a value of dead time by a predetermined coefficient.

27. A process control apparatus according to claim 25, wherein said first evaluation index is an area overshoot amount expressed by the ratio between the second average deviation of a waveform and the first average deviation of the same waveform, said second evaluation index is an average deviation damping ratio expressed by the ratio between the sum of the third average deviation of said waveform and the fourth average deviation of the same waveform and the sum of said second average deviation and said third average deviation and said third evaluation index is a rise time ratio expressed by the ratio between an observed rise time and a set point of said rise time obtained by multiplying a value of dead time by a predetermined coefficient.

28. A process control apparatus for feedback-controlling a process controlled variable of a process to a set point and performing at least a proportional-integral control operation, said process control apparatus comprising:

control response observation means for observing the waveform of a control deviation between said set point and said process controlled variable which takes place due to a change in said set point or application of a disturbance, computing an average deviation obtained by dividing an area value obtained by time-integrating the absolute value of said control deviation at every half cycle by time of said half cycle and detecting a setting time required for said control deviation to reach an allowable range;

evaluation index computing means for computing first, second and third evaluation indexes from said average deviation and said setting time after a control response has been set;

operating parameter modification coefficient inference means for receiving any of said first, second and third evaluation indexes and for inferring a modification coefficient of said operating parameters in accordance with an adjustment rule qualitatively expressing a relationship between each of the degrees of said evaluation indexes and the value of said operating parameter and upon a fuzzy inference; and operating parameter adjustment value computing means for computing the adjustment value of said operating parameter by means of the product of said modification coefficient and the present value of said operating parameter.

29. A process control apparatus according to claim 21, wherein said first evaluation index is an area overshoot amount expressed by the ratio between the second average deviation of a waveform and the first average deviation of the same waveform, said second evaluation index is an average deviation damping ratio expressed by the ratio between the third average deviation of said waveform and said second average deviation of the same waveform and said third evaluation index is a setting time ratio expressed by the ratio between the previous setting time and the present setting time.

30. A process control apparatus according to claim 28, wherein said first evaluation index is an area overshoot amount expressed by the ratio between the second average deviation of a waveform and the first average deviation of the same waveform said second evaluation index is an average deviation damping ratio expressed by the ratio between the sum of the third average deviation of said waveform and the fourth average deviation of the same waveform and the sum of said second average deviation and said third average deviation and said third evaluation index is a setting time ratio expressed by the ratio between the previous setting time and the present setting time.

31. A multi-variable processor control system for feedback-controlling a process controlled variable of a process to a set point and structured in such a manner that a plurality of control loops formed by controllers for performing at least a proportional-integral control operation are disposed in a dispersed manner and provided with means for adjusting the operating parameters of said controllers in accordance with the control response shape of said plurality of control loops, said multi-variable processor control system comprising:

response generating factor discriminating means for receiving said set point, said process controlled variable, an output from said controller and a known disturbance added to said output and discriminating that said response generating factor is any of said set point, said known disturbance and an unknown disturbance;

waveform observing means for observing the waveform of a control deviation which is the difference between said set point and said process controlled variable and computing an area value by time-integrating the absolute value of said control deviation at every half cycle when said response generating factor is said set point and said unknown disturbance, said waveform observing means observing said output from said controller and the sum of deviations from the value of said known disturbance before generation of said response and computing said area value by time-integrating the absolute value of said sum of deviations at every half cycle when said response generating factor is said known disturbance; and modifying means for adjusting operating parameters by using said area value in accordance with a predetermined adjustment rule.

32. A multi-variable processor control system for feedback-controlling a process controlled variable of a process to a set point and structured in such a manner that a plurality of control loops formed by controllers for performing at least a proportional-integral control operation are disposed in a dispersed manner and provided with means for adjusting the operating parameters of said controllers in accordance with the control response shape of said plurality of control loops, said multi-variable processor control system comprising:

response generating factor discriminating means for receiving said set point, said process controlled variable, an output from said controller and a known disturbance added to said output and discriminating that said response generating factor is any of said set point, said known disturbance and an unknown disturbance;

waveform observing means for observing the waveform of a control deviation which is the difference between said set point and said process controlled variable and computing an area value by time-integrating the absolute value of said control deviation at every half cycle when said response generating factor is said set point and said unknown disturbance, said waveform observing means observing said output from said controller and the sum of deviations from the value of said known disturbance before generation of said response and computing said area value by time-integrating the absolute value of said set of deviations at every half cycle when said response generating factor is said known disturbance;

evaluating index computing means for computing a plurality of evaluating indexes from said area value after said control deviation or said sum of deviations has been set;

operating parameter modification coefficient inference means for receiving said plurality of evaluation indexes and inferring a modification coefficient of said operating parameters in accordance with an adjustment rule qualitatively expressing a relationship between the degree of each of said evaluation indexes and the value of said operating parameter based upon a fuzzy inference; control performance satisfaction degree evaluating means for receiving said evaluating indexes and inferring a weight coefficient in accordance with a weighting rule qualitatively expressing the relationship between degree of said evaluating index and said weight coefficient based upon a fuzzy inference; and operating parameter adjustment value computing means for determining an adjustment value of said operating parameter by adding the present value of said operating parameter to the product of said weight coefficient and the present value of said operating parameter.

33. A multi-variable process control system according to claim 32, wherein said first evaluating index is an area overshoot amount expressed by the ratio between the second area value of a waveform and the first area value of the same waveform and said second evaluating index is an area damping ratio expressed by the ratio between the third area value of said waveform and the second area value of the same waveform.

34. A multi-variable process control system according to claim 32, wherein said first evaluating index is an area overshoot amount expressed by the ratio between the second area value of a waveform and the first area value of the same waveform and said second evaluating index is an area damping ratio expressed by the ratio of the sum of the third area value of said waveform and the fourth area value of the same waveform and the sum of said second area value of said waveform and said third area value of the same waveform.

35. A multi-variable process control system according to claim 32, wherein said first evaluating index is an area overshoot amount expressed by the ratio between the second area value of a waveform and a first area value of the same waveform and said second evaluating index is an area damping ratio expressed by the odd area values of said waveform and the even area values of the same waveform.

36. A multi-variable process control system according to claim 32, wherein said first evaluating index is an area overshoot amount expressed by the ratio between the second area value of a waveform and a first area value of the same waveform and said second evaluating index is an area damping ratio expressed by the third area value of said waveform and the second area value of the same waveform and said third evaluating index is an area ratio between the previous total area value of said waveform and the present total area value of the same waveform.

37. A multi-variable process control system according to claim 32, wherein said first evaluating index is an area overshoot amount expressed by the ratio between the second area value of a waveform and a first area value of the same waveform and said second evaluating index is an area damping ratio expressed by the sum of the third area value of said waveform and the fourth area value of the same waveform and the sum of said second area value of said waveform and said third area value of the same waveform and said third evaluating index is an area ratio expressed by the previous total area value of said waveform and the present total value of the same.

38. A multi-variable process control system according to claim 32, wherein said first evaluating index is an area overshoot amount expressed by the ratio between the second area value of a waveform and a first area value of the same waveform, said second evaluating index is an area damping ratio expressed by the sum of odd area values of said waveform and the sum of the even area values of the same waveform and said third evaluating index is an area ratio between the previous overall area value and the present overall area value.

39. A multi-variable processor control system for feedback-controlling a process controlled variable of a process to a set point and structured in such a manner that a plurality of control loops formed by controllers for performing at least a proportional-integral control operation are disposed in a dispersed manner and provided with means for adjusting the operating parameters of said controllers in accordance with the control response shape of said plurality of control loops, said multi-variable processor control system comprising:

response generating factor discriminating means for receiving said set point, said process controlled variable, an output from said controller and a known disturbance added to said output and discriminating that said response generating factor is any of said set point, said known disturbance and an unknown disturbance;

waveform observing means for observing the waveform of a control deviation which is the difference between said set point and said process controlled variable and computing an area value by time-integrating the absolute value of said control deviation at every half cycle when said response generating factor is said set point and said unknown disturbance, said waveform observing means observing said output from said controller and the sum of deviations from the value of said known disturbance before generation of said response and computing said area value by time-integrating the absolute value of said sum of deviations at every half cycle when said response generating factor is said known disturbance; and modification means for modifying said operating parameters by using said average deviation in accordance with a predetermined adjustment rule.

40. A multi-variable processor control system for feedback-controlling a process controlled variable of a process to a set point and structured in such a manner that a plurality of control loops formed by controllers for performing at least a proportional-integral control operation are disposed in a dispersed manner and provided with means for adjusting the operating parameters of said controllers in accordance with the control response shape of said plurality of control loops, said multi-variable processor control system comprising:

response generating factor discriminating means for receiving said set point, said process controlled variable, an output from said controller and a known disturbance added to said output and discriminating that said response generating factor is any of said set point, said known disturbance and an unknown disturbance;

waveform observing means for observing the waveform of a control deviation which is the difference between said set point and said process controlled variable, computing an area value by time-integrating the absolute value of said control deviation at every half cycle and detecting setting time taken for said control deviation to reach an allowable range when said response generating factor is said set point and said unknown disturbance, said waveform observing means observing the waveform of said output from said controller and the sum of deviations from the value of said known disturbance before generation of said response, computing said area value by time-integrating the absolute value of said sum of deviations at every half cycle and detecting setting time taken for said control deviation to reach an allowable range when said response generating factor is said known disturbance;

evaluating index computing means for computing a plurality of evaluating indexes from said area value after said control deviation or said sum of deviations has been set;

operating parameter modification coefficient inference means for receiving said plurality of evaluation indexes and inferring a modification coefficient of said operating parameters in accordance with an adjustment rule qualitatively expressing a relationship between the degree of each of said evaluation indexes and the value of said operating parameter based upon fuzzy inference;

control performance satisfaction degree evaluating means for receiving said evaluating indexes and inferring a weight coefficient in accordance with a weighting rule qualitatively expressing a relationship between degree of said evaluating index and said weight coefficient based upon a fuzzy inference; and operating parameter adjustment value computing means for determining an adjustment value of said operating parameter by adding the present value of said operating parameter to the product of said weight coefficient and the present value of said operating parameter.

41. A multi-variable process control system according to claim 40, wherein said first evaluating index is an overshoot amount expressed by the ratio between the second average deviation of a waveform and the first average deviation of the same waveform and said second evaluating index is a damping ratio expressed by the ratio between the third average deviation of said waveform and said second average deviation of the same waveform.

42. A multi-variable process control system according to claim 40, wherein said first evaluation index is an overshoot amount expressed by the ratio between the second average deviation of a waveform and the first average deviation of the same waveform, said second evaluation index is a damping ratio expressed by the ratio between the third average deviation of said waveform and said second average deviation of the same waveform and said third evaluating index is a setting time ratio between the previous setting time and the present setting time.

43. A method of adjusting a PID controller for controlling a process to be controlled in such a manner that a process controlled variable coincides with a set point by each of respective proportional, integral and derivative operations, said method of adjusting a PID controller comprising the steps of:

obtaining characteristics of said process to be controlled through approximation by adding a first delay to a value of dead time;

obtaining a time scale factor $\sigma$ as the ratio n ($=L/T$) between dead time L and a time constant T and said dead time L in accordance with a partial model matching method by using an obtained value of process gain K, said time constant T and said dead time L; and obtaining a value of proportional gain $K_p$ of said PID controller, integral time $T_i$ of the same and derivative time $T_d$ of the same by using the thus obtained time scale factor $\sigma$.

44. A method of adjusting a PID controller according to claim 43, wherein said scale factor $\sigma$ is obtained as a function of a ratio n ($=L/T$) between said dead time L and said time constant T and the product of said dead time L.

45. A method of adjusting a PID controller for controlling a process to be controlled in such a manner that a process controlled variable coincides with a set point by each of respective proportional, integral and derivative operations, said method of adjusting a PID controller comprising the steps of:

obtaining characteristics of said process to be controlled through approximation by adding a first delay to a value of dead time;

determining the schematic shape of $f(\sigma)$ when a time scale factor $\sigma$ is obtained as the minimum positive real root of a cubic equation $f(\sigma)=0$ in a partial model matching method by using an obtained value of process gain K, said time constant T and said dead time L, specifying the range of the solution of said minimum positive real root from said schematic shape, and obtaining a value of $\sigma$ for which a Taylor's expansion approximate expression of said cubic equation f($\sigma$) becomes zero in said specified range; and obtaining a value of proportional gain $K_p$ of said PID controller, integral time $T_i$ of the same and derivative time $T_d$ of the same by using thus obtained time scale factor $\sigma$.

46. A method of adjusting a PID controller according to claim 45, further comprising the steps of:

obtaining a Taylor's expansion approximate expression of said cubic equation f($\sigma$) in the vicinity of a value of s with which said Taylor's expansion approximate expression of said cubic equation f($\sigma$) becomes zero;

obtaining the value of $\sigma$ with which said approximate expression becomes zero;

obtaining said scale factor $\sigma$ by repeating said calculation several times; and obtaining a value of proportional gain $K_p$ of said PID controller, integral time $T_i$ of the same and derivative time $T_d$ of the same by using thus obtained time scale factor $\sigma$.

47. A method of adjusting a PID controller for controlling a process to be controlled in such a manner that a process controlled variable coincides with a set point by each of respective proportional, integral and derivative operations, said method of adjusting a PID controller comprising the steps of:

obtaining characteristics of said process to be controlled through approximation by adding a first delay to a value of dead time;

expressing said time scale factor $\sigma$ as a ratio n L/T) between dead time L and time constant T and the function of said dead time L when operating parameters $K_p$, $T_i$ and $T_d$ are determined by obtaining said time scale factor $\sigma$ in a partial model matching method by using the obtained value of process gain K, said time constant T and said dead time L; and adjusting by quickening and delaying rise time of a control response by increasing/decreasing said time scale factor $\sigma$ by an increase/decrease of the coefficient of said function.

48. A method of adjusting a PID controller according to claim 42, wherein said time scale factor $\sigma$ is expressed by the function of said dead time L whereby rise time of a control response is adjusted by quickening or delaying by increasing/decreasing said time scale factor $\sigma$ by an increase/decrease of the coefficient of said function.

* * * * *

UNITED STATES PATENT AND TRADEMARK OFFICE
CERTIFICATE OF CORRECTION

PATENT NO. : 5,245,528
DATED     : Sep. 14, 1993
INVENTOR(S) : Saito, et al

It is certified that error appears in the above-identified patent and that said Letters Patent is hereby corrected as shown below:

TITLE PAGE:
Please correct the Application No. as follows:

delete [21] Appl. No.: 435,911, and insert --[21] Appl. No.: 495,911--.

Signed and Sealed this

Seventeenth Day of May, 1994

Attest:

BRUCE LEHMAN

Attesting Officer     Commissioner of Patents and Trademarks